US008627281B2

(12) United States Patent
Tatsubori

(10) Patent No.: US 8,627,281 B2
(45) Date of Patent: Jan. 7, 2014

(54) METHOD, COMPUTER PROGRAM AND COMPUTER SYSTEM FOR CONVERTING SOURCE CODE WRITTEN IN DYNAMICALLY TYPED LANGUAGE INTO TARGET CODE WRITTEN IN STATICALLY TYPED LANGUAGE AND EXECUTING TARGET CODE

(75) Inventor: Michiaki Tatsubori, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 12/954,643

(22) Filed: Nov. 25, 2010

(65) Prior Publication Data

US 2011/0131556 A1   Jun. 2, 2011

(30) Foreign Application Priority Data

Nov. 27, 2009   (JP) ................................. 2009-270506

(51) Int. Cl.
G06F 9/44    (2006.01)
G06F 9/45    (2006.01)

(52) U.S. Cl.
USPC ............................ 717/114; 717/110; 717/137

(58) Field of Classification Search
None
See application file for complete search history.

(56) References Cited

U.S. PATENT DOCUMENTS 7,389,498 B2 *   6/2008   Meijer et al. ................... 717/114
7,895,584 B1 *   2/2011   Ma et al. ......................... 717/137
8,060,859 B2 *  11/2011   Meijer et al. ................... 717/114

8,112,740 B2 *   2/2012   Meijer et al. ................... 717/114
8,473,901 B1 *   6/2013   Johnson .......................... 717/110
8,479,156 B2 *   7/2013   Hudson et al. ................. 717/110

(Continued)

FOREIGN PATENT DOCUMENTS

| JP | 63-271532 A | 11/1988 |
| JP | 04-317133 A | 11/1992 |
| JP | 2004-326807 A | 11/2004 |
| WO | WO2009/002683 | 12/2008 |

OTHER PUBLICATIONS

Ortin et al., "including both static and dynamic typing in the same programming language", 2010 The Institution of Engineering and Technology, IET Softw., 2010, vol. 4, Iss. 4, pp. 268-282; <http://ieeexplore.ieee.org/stamp/stamp.jsp?tp=&arnumber=5523694>.*

(Continued)

Primary Examiner — Thuy Dao
Assistant Examiner — Ben C Wang
(74) Attorney, Agent, or Firm — Gail H. Zarick; Otterstedt, Ellenbogen & Kammer, LLP

(57) ABSTRACT

The present invention provides a method for converting source code written in a dynamically typed language into target code written in a statically typed language. The method includes the step of generating in a storage device the target code from the source code, the step of generating the target code including storing in a buffer a signature of a function/method used by a caller in the source code. In this step, generation of an interface class is delayed to a time point immediately before execution of a part of the target code corresponding to the function/method call by the caller, the interface class being needed to generate the caller and serving as an interface in the statically typed language. The method also includes the step of generating in the storage device a consolidated interface class for all signatures stored in the buffer, and loading the generated consolidated interface class from the storage device. In this step, all the signatures in the buffer are deleted upon generation of the consolidated interface class.

11 Claims, 34 Drawing Sheets

(56) References Cited

U.S. PATENT DOCUMENTS

| | | | | |
|---|---|---|---|---|
| 2004/0216132 | A1 | 10/2004 | Messec | |
| 2007/0288892 | A1* | 12/2007 | Foti | 717/114 |
| 2008/0313609 | A1* | 12/2008 | Meijer et al. | 717/114 |
| 2008/0320444 | A1* | 12/2008 | Meijer et al. | 717/110 |
| 2009/0024986 | A1* | 1/2009 | Meijer et al. | 717/137 |
| 2012/0180025 | A1* | 7/2012 | Webb | 717/114 |

OTHER PUBLICATIONS

Saunders et al., "Dynamic, Recursive, Heterogeneous Types in Statically-Typed Languages", 2013 ACM, C++Now Conference 2013, May 13-17, 2013, pp. 1-10; <cppnow.org/files/2013/03/saunders-jeffery.pdf>.*

Ishizaki et al., "Adding Dynamically-Typed Language Support to a Statically-Typed Language Compiler: Performance Evaluation, Analysis, and Tradeoffs", 2012 ACM, VEEE'12, Mar. 3-4, 2012, London, England, UK, pp. 169-180; <http://dl.acm.org/citation.cfm?doid=2365864.2151047>.*

Baars et., "Typing Dynamic Typing", 2002 ACM, ICFP'02, 2002, Pittsburgh, Pennsylvania, USA, pp. 1-10; <http://dl.acm.org/citation.cfm?doid=583852.581494>.*

Ancona et al., "RPython—a Step Towards Reconciling Dynamically and Statically Typed OO Languages", 2007 ACM, DLS'07, Oct. 22, 2007, Montréal, Quebéc, Canada, pp. 1-12; <http://dl.acm.org/citation.cfm?doid=1297081.1297091>.*

Laurence Tratt, "Dynamically Typed Languages", Mar. 13, 2009, Bournemouth University, Poole, Dorset, United Kingdom, pp. 1-33; <eprints.bournemouth.ac.uk/.../1/tratt_dynamically_typed_languages.pdf>.*

Shigeru Chiba et. al., "Implementation Techniques for Faster Reflective Computing", Computer Software, Vol. 21, No. 6, pp. 5-15, Nov. 25, 2004.

Kei Nakahara, "JSR Standard, Script Language Groovy Introduction", WEB+DB PRESS, Gijutsu-Hyohron Co., Ltd., vol. 24, p. 53, Jan. 15, 2005 (English language in JP text).

"The Reflection API", downloaded from http://download.oracle.com/javase/tutorial/reflect/ on Nov. 20, 2010.

"SugerCRM-Commmercial Open Source CRM" downloaded from http://www.sugarcrm.com/crm/ on Nov. 19, 2010.

* cited by examiner

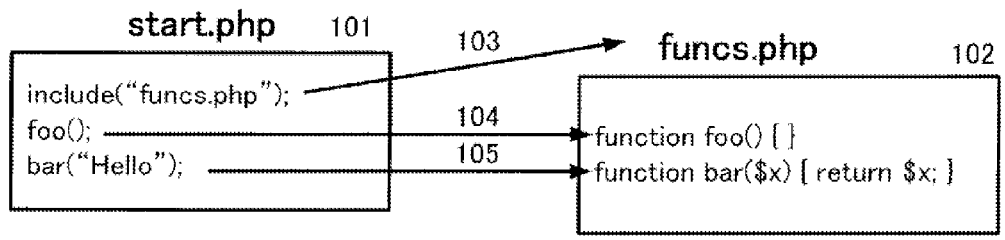

FIG. 1A

111  IMPLEMENTATION CLASS   Bytecode_startphp
(GENERATED THROUGH ONE SCRIPT FILE-TO-ONE CLASS METHOD)

```
A01: public class Bytecode_start_php implements PHPScript {
A02:    public void executeScript() {
A03:       include script "funcs.php"
A04:       invoke foo()
A05:       invoke bar()
A06:    } }
```

FIG. 1B

112  IMPLEMENTATION CLASS   Bytecode_funcs_php
(GENERATED THROUGH ONE SCRIPT FILE-TO-ONE CLASS METHOD)

```
B01: public class Bytecode_funcs_php implements PHPScript {
B02:    public void executeScript() {
B03:       declare function foo()
B04:       declare function bar()
B05:    }
B06:    public void foo() {
B07:    }
B08:    public PHPValue bar(PHPValue x) {
B09:       return x;
B10:    } }
```

FIG. 1C

IMPLEMENTATION CLASS   Bytecode_startphp
(GENERATED THROUGH ONE FUNCTION-TO-ONE CLASS METHOD)

201

```
C01:  public class Bytecode_start_php implements PHPScript {
C02:     public void executeScript() {
C03:        includeScript("funcs.php");
C04:        lookupFunction("foo").invoke();
C05:        lookupFunction("bar").invoke(constant_Hello);
C06:     }
C07:     .... }
```

FIG. 2A

IMPLEMENTATION CLASS   Bytecode_funcs_php
(GENERATED THROUGH ONE FUNCTION-TO-ONE CLASS METHOD)

202

```
D01:  public class Bytecode_funcs_php implements PHPScript {
D02:     public void executeScript() {
D03:        declareFunction("foo", new Bytecode_funcs_php_foo());
D04:        declareFunction("bar", new Bytecode_funcs_php_bar());
D05:     } }
```

IMPLEMENTATION CLASS   Bytecode_funcs_php_foo          203

```
D11:  public class Bytecode_funcs_php_foo extends PHPFunction {
D12:     public PHPValue invoke() {
D13:        return null;
D14:     } }
```

IMPLEMENTATION CLASS   Bytecode_funcs_php_bar          204

```
D21:  public class Bytecode_funcs_php_bar extends PHPFunction {
D22:     public PHPValue invoke(PHPValue x) {
D23:        return x;
D24:     } }
```

FIG. 2B

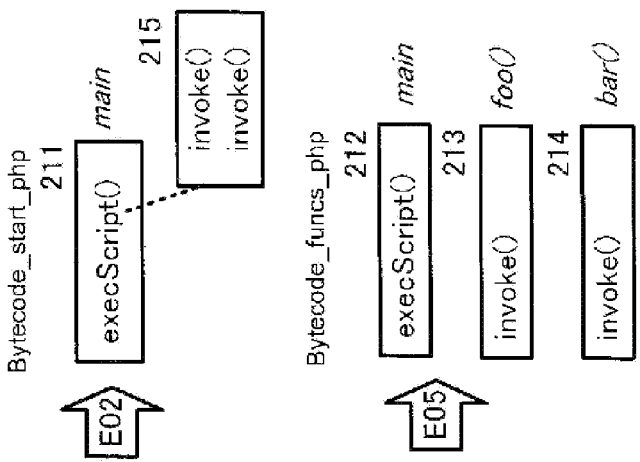

FIG. 2C

IMPLEMENTATION CLASS
(INCLUDING COMMON INTERFACE CLASS)

E01: include start.php
E02: generate&load call-sites (start.php) for foo(), bar()
      through the common interface
E03: execute loaded bytecode for start.php
E04: include funcs.php
E05: generate&load implementations for funcs.php, foo(), bar()
E06: execute bytecode for funcs.php
E07: declare function(s) foo(), bar()
E08:   register foo(), bar() in the function table
E09: invoke foo() => foo()
E10:   execute loaded bytecode for foo()
E11: invoke bar() => bar()
E12:   execute loaded bytecode for bar()

―――― CALLER
―・―・― DECLARATION
―・・―・・― EXECUTION

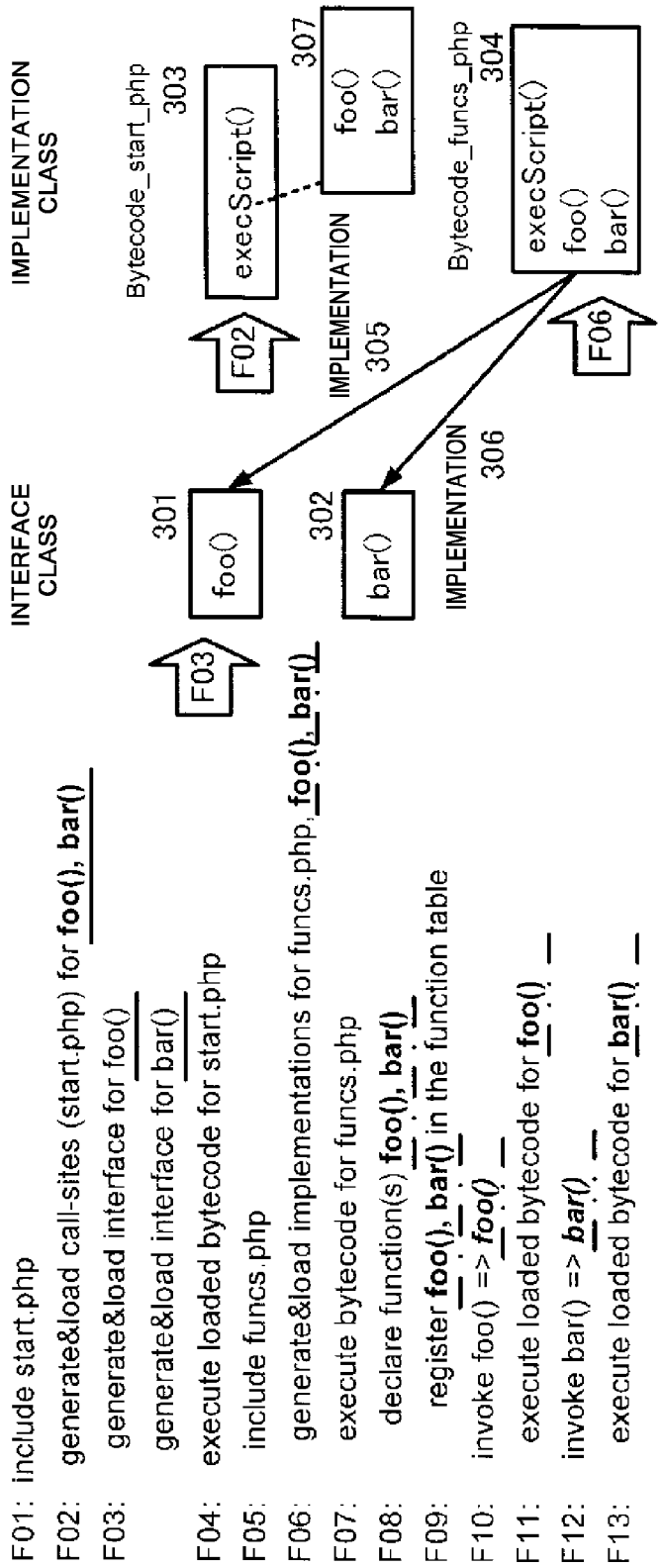

FIG. 3A

F01: include start.php
F02: generate&load call-sites (start.php) for foo(), bar()
F03: generate&load interface for foo()
       generate&load interface for bar()
F04: execute loaded bytecode for start.php
F05: include funcs.php
F06: generate&load implementations for funcs.php, foo(), bar()
F07: execute bytecode for funcs.php
F08: declare function(s) foo(), bar()
F09:   register foo(), bar() in the function table
F10: invoke foo() => foo()
F11: execute loaded bytecode for foo()
F12: invoke bar() => bar()
F13: execute loaded bytecode for bar()

———— CALLER
—·—·— DECLARATION
—··—··— EXECUTION

INTERFACE CLASS FOR foo()
(GENERATED THROUGH ONE FUNCTION-TO-ONE     311
 INTERFACE METHOD)
   G01: public interface Function_foo {
   G02:    void foo();
   G03: }

INTERFACE CLASS FOR bar()
(GENERATED THROUGH ONE FUNCTION-TO-ONE     312
 INTERFACE METHOD)
   G11: public interface Function_bar {
   G12:    PHPValue bar(PHPValue x);
   G13: }

FIG. 3B

IMPLEMENTATION CLASS
(GENERATED THROUGH ONE FUNCTION-TO-ONE     321
 INTERFACE METHOD)
   H01: public class Bytecode_start_php implements PHPScript {
   H02:    public void executeScript() {
   H03:       includeScript("funcs.php");
   H04:       ((Function_foo) lookupFunction("foo")).foo();
   H05:       ((Function_bar) lookupFunction("bar")).bar(constant_Hello);
   H06:    }
   H07:      .... }

FIG. 3C

IMPLEMENTATION CLASS Bytecode_funcs_php
(GENERATED THROUGH ONE FUNCTION-TO-ONE INTERFACE METHOD) 322

```
101: public class Bytecode_funcs_php implements PHPScript, Function_foo, Function_bar {
102:    public void executeScript() {
103:       declareFunction("foo", new Bytecode_funcs_php());
104:       declareFunction("bar", new Bytecode_funcs_php());
105:    }
106:    public void foo() {
107:    }
108:    public PHPValue bar(PHPValue x) {
109:       return x;
110:    } }
```

FIG. 3D

CONSOLIDATED INTERFACE CLASS FOR BOTH foo() AND bar()
(GENERATED THROUGH MULTIPLE FUNCTIONS-TO-ONE      411
INTERFACE METHOD)

K01: public interface Callsite_start_php {
K02:     void foo();
K03:     PHPValue bar(PHPValue x);
K04: }

FIG. 4B

IMPLEMENTATION CLASS   Bytecode_start_php
(GENERATED THROUGH MULTIPLE FUNCTIONS-TO-ONE      421
INTERFACE METHOD)

L01: public class Bytecode_start_php implements PHPScript {
L02:     public void executeScript() {
L03:         includeScript("funcs.php");
L04:         ((Callsite_start_php) lookupFunction("foo")).foo();
L05:         ((Callsite_start_php) lookupFunction("bar")).bar(constant_Hello);
L06:     }
L07: }

FIG. 4C

IMPLEMENTATION CLASS   Bytecode_funcs_php
(GENERATED THROUGH MULTIPLE FUNCTIONS-TO-ONE      422
INTERFACE METHOD)

M01: public class Bytecode_funcs_php implements PHPScript, Callsite_start_php {
M02:     public void executeScript() {
M03:         declareFunction("foo", new Bytecode_funcs_php());
M04:         declareFunction("bar", new Bytecode_funcs_php());
M05:     }
M06:     public void foo() {
M07:     }
M08:     public PHPValue bar(PHPValue x) {
M09:         return x;
M10:     }
M11: }

FIG. 4D

| | 701 |
|---|---|
| SIGNATURE OF PHP FUNCTION | JAVA (TRADEMARK) METHOD AND SIGNATURE {<INTERFACE CLASS NAME>, <SIGNATURE>} |
| foo() | { "Face1", "foo()V" } |
| bar() | { "Face1", "bar()V" } |
| ... | |
| baz() | { "Face1", "baz()V" } |
| ... | |

FIG. 10A index.php  1001
```
require_once('entryPoint.php');
require_once('Application.php');
$app = new Application();
$app->startSession();
$app->execute();
``` entryPoint.php  1002
```
...
require_once('utils.php');
...
``` utils.php  1003
```
function insert_charset_header() {
...
}
```

Application.php  1004
```
require_once('ControllerFactory.php');
...
class Application {
  function Application() { }
  function startSession() { }
  function execute() {
    insert_charset_header();
    $this->controller =
      ControllerFactory::getController(..);
    $this->controller->execute();
  }
}
```

Controller.php  1005
```
class Controller {
  function Controller() { }
  function setup() { }
  function execute() {
    ...
  }
}
```

ControllerFactory.php  1006
```
require_once('Controller.php');
class ControllerFactory {
  function getController($module) {
    if () {
      require_once($module . '/controller.php');
      $controller = new $class();
    } else {
      $controller = new Controller();
    }
    $controller->setup();
    return $controller;
  }
}
```

Employees/controller.php  1007
```
class EmployeesController extends Controller {
  function EmployeesController() {
    parent::Controller();
  }
  function pre_editview() { }
}
```

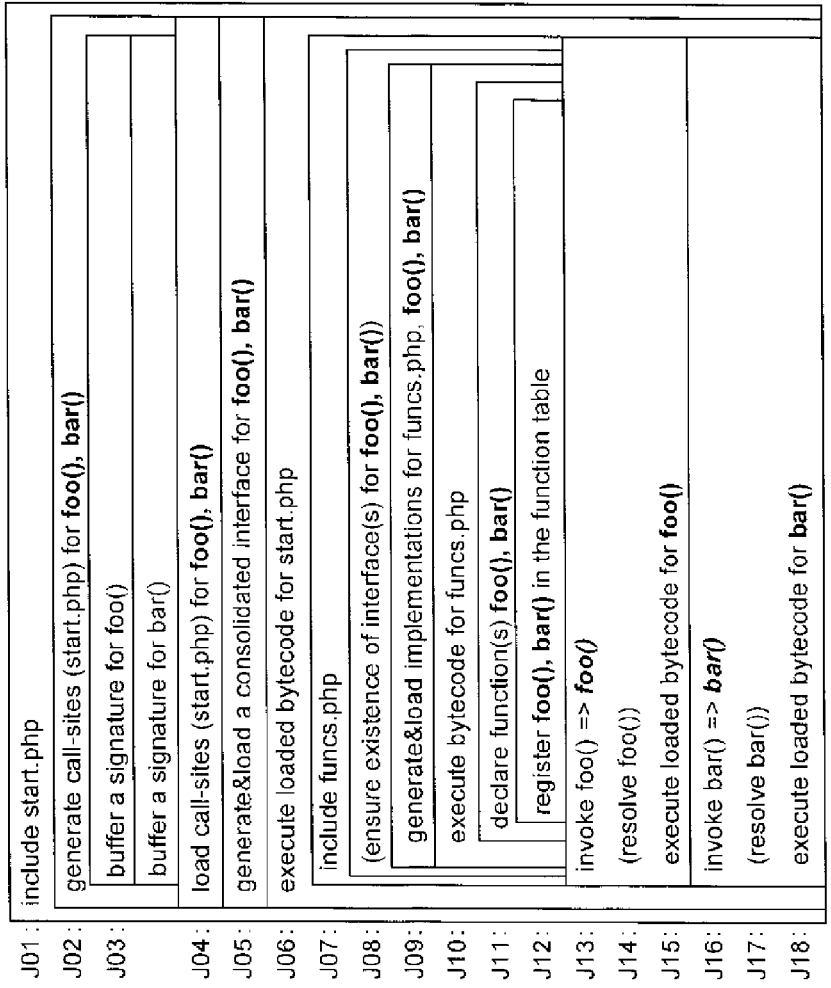

METHOD, COMPUTER PROGRAM AND COMPUTER SYSTEM FOR CONVERTING SOURCE CODE WRITTEN IN DYNAMICALLY TYPED LANGUAGE INTO TARGET CODE WRITTEN IN STATICALLY TYPED LANGUAGE AND EXECUTING TARGET CODE

CROSS-REFERENCE TO RELATED APPLICATION(S)

This application claims foreign priority to Japanese Patent application 2009-270506 filed 27 Nov. 2009, the complete disclosure of which is expressly incorporated herein by reference in its entirety for all purposes.

FIELD OF THE INVENTION

The present invention relates to the electrical and electronic arts, and, more particularly, to the computer arts and the like.

BACKGROUND OF THE INVENTION

Dynamically typed languages such as PHP and Ruby have been widely used these days in web servers and the like. A script written in such a language is often executed by using the interpreter technology. However, some applications require the script to be executed after the conversion into bytecode which runs directly on JAVA Virtual Machine (JAVA VM), for example, in order to achieve a fast execution. In this case, it is difficult to efficiently execute a caller for each method/function while converting source code written in a dynamically typed language into target code written in a statically typed language such as JAVA. In practice, the above script file needs to be compiled during the execution of the source code, and thus a specific concern is in how to efficiently compile the script file. This concern arises mainly for the following two reasons. Firstly, there is no independently defined function in a statically typed language such as JAVA. For this reason, a JAVA class needs to be prepared for each function/method of a dynamically typed language. Secondly, when a caller function/method in a program in a dynamically typed language is converted, the type of its callee cannot be specified in general. The conversion can be made easily by using a reflection mechanism such as JAVA Reflection API. However, the reflection mechanism causes large overhead due to its reflective behavior during runtime.

There is a method for the conversion without using the reflection mechanism, in which a class for implementation is prepared for every entity of functions/methods of a dynamically typed language, and the classes thus prepared can be called as a subclass of a specific class serving as a fixed interface. However, with the method, a lot of classes for respective functions/methods must be prepared for implementations of callee functions/methods. Accordingly, an extra memory is calculated for storing metadata required to describe the above classes themselves. This results in an inconvenience that a large portion of a memory area in an execution system such as JAVA VM is consumed.

Against this background, there is a requirement of a method capable of reducing memory consumption when converting source code written in a dynamically typed language into target code written in a statically typed language to execute the target code.

SUMMARY OF THE INVENTION

In one aspect, one or more embodiments of the invention provide a method for converting source code written in a dynamically typed language into target code written in a statically typed language. The method includes the step, executed by a computer, of generating in a storage device the target code from the source code, the step of generating the target code including storing in a buffer a signature of a function/method used by a caller in the source code, wherein generation of an interface class is delayed to a time point immediately before execution of a part of the target code corresponding to the function/method call by the caller. The interface class is needed to generate the caller and serves as an interface in the statically typed language. An additional step includes generating in the storage device a consolidated interface class for all signatures stored in the buffer, and loading the generated interface class from the storage device, wherein all the signatures in the buffer are deleted upon generation of the consolidated interface class.

In some cases, the method further includes the step, executed by the computer, of generating an implementation class in the storage device and loading the generated implementation class from the storage device when a command to call a function/method in the target code generated from the source code is executed, the implementation class corresponding to the signature of the corresponding function/method used by the caller and being defined for implementation corresponding to the function/method of a callee in the dynamically typed language.

In another aspect, one or more embodiments of the invention provide a computer converting source code written in a dynamically typed language into target code written in a statically typed language. The computer includes a generator which generates in a storage device the target code from the source code, and stores in a buffer a signature of a function/method used by a caller in the source code, wherein generation of an interface class is delayed to a time point immediately before execution of a part of the target code corresponding to the function/method call by the caller. The interface class is needed to generate the caller and serves as an interface in the statically typed language. Also included is a first processor which generates in the storage device a consolidated interface class for all signatures stored in the buffer, and loads the generated consolidated interface class from the storage device, wherein all the signatures in the buffer are deleted upon generation of the consolidated interface class.

In some cases, the computer further includes a second processor which generates an implementation class when a command to call a function/method in the target code generated from the source code is executed, and loads the generated implementation class, the implementation class corresponding to the signature of the corresponding function/method used by the caller and being defined for implementation corresponding to the function/method of a callee in the dynamically typed language.

In some instances, the step of storing a signature in the buffer further includes the step of storing in the buffer not only a signature of a function/method of a caller which appears in a certain conversion unit in the source code, but also a signature of a function/method which appears in a different conversion unit in the source code.

In some instances, the step of generating the target code from the source code includes a process of generating a function/method call corresponding to the caller in the source code.

In some cases, the process of generating a function/method call includes the steps of checking whether an interface class corresponding to the called function/method has already been generated; if the interface class has not been generated yet, adding the signature of the called function/method to a call function list; and generating in the storage device code corresponding to the function/method call for a target object typed with a not-yet-generated interface class, the code having a name associated with the buffer.

In some cases, the process of generating a function/method call further includes the steps of checking whether an interface class corresponding to the called function/method has already been generated; and if the interface class has already been generated, generating in the storage device code of the function/method call for a target object typed with the generated interface class.

In some instances, the step of generating the target code from the source code includes generating a function/method declaration corresponding to the caller in the source code.

In some instances, the generating of the function/method declaration includes the steps of checking whether a signature of a declared function/method is in the buffer, and whether an interface class corresponding to the declared function/method has already been generated; and adding the signature of the declared function/method to a declaration function list in a case where the signature of the declared function/method is not in the buffer and where the interface class corresponding to the declared function/method has not been generated yet.

In some cases, the generating of the function/method declaration includes the steps of checking whether a signature of a declared function/method is in the buffer, and whether an interface class corresponding to the declared function/method has already been generated; and adding a corresponding interface class name to a declaration interface list in either of cases where the signature of the declared function/method is not in the buffer and where the interface class corresponding to the declared function/method has not been generated yet.

In some cases, the generating of the function/method declaration further includes generating in the storage device bytecode of a script for a process of the declared function/method; and generating in the storage device code for associating the generated bytecode with the declared function/method.

In some instances, the step of generating and loading an interface class further includes checking whether the declaration function list is empty; if the declaration function list is not empty, checking whether an interface class name associated with the buffer exists in the declaration interface list; and if the interface class name associated with the buffer exists, adding to the buffer the signature in the declaration function list and a signature in a call function list.

In some instances, the step of generating and loading an interface class further includes the steps of generating in the storage device one interface class from the added signature, and loading the generated interface class from the storage device; and adding a name of the loaded interface class to the declaration interface list.

In some instances, the step of generating and loading an interface class further includes the steps of checking whether the declaration function list is empty; if the declaration function list is not empty, checking whether an interface class name associated with the buffer exists in the declaration interface list; and if no interface class name associated with the buffer exists, generating, from the signature in the declaration function list, the consolidated interface class independent of the buffer, and loading the generated consolidated interface class; and adding a name of the loaded interface class to the declaration interface list.

In some cases, the step of generating and loading an interface class further includes the steps of checking whether the declaration function list is empty; and if the declaration function list is empty, adding to the buffer a signature in a call function list.

In some cases, the step of generating and loading an implementation class further includes the step of preparing in the implementation class a dummy implementation of a function having a signature and not being implemented in a conversion unit in the source code.

In some instances, the computer further includes a processor which executes the target code obtained by the conversion.

In some instances, the execution step further includes the steps of making a request to load the consolidated interface class for all the signatures stored in the buffer if the consolidated interface class is used; and, in response to the request, generating the consolidated interface class from all the signatures in the buffer, and loading the generated consolidated interface class.

The present invention further provides a computer program causing a computer to execute the steps described in any one of the aspects of the method described above.

One or more embodiments of the present invention allows reducing memory consumption when converting source code written in a dynamically typed language into target code written in a statically typed language and executing the target code, and thus allows an efficient system establishment.

BRIEF DESCRIPTION OF THE DRAWINGS

FIG. 1A shows an example of PHP source code files (start.php, funcs.php) which are written in a PHP language and can be source code to be converted.

FIG. 1B shows an outline of a JAVA class (Bytecode_start_php) generated from the PHP source code file (start.php) in FIG. 1A through a one script file-to-one class method.

FIG. 1C shows an outline of a JAVA class (Bytecode_funcs_php) generated from the PHP source code file (funcs.php) in FIG. 1A through the one script File-to-one class method.

FIG. 2A shows an outline of a JAVA implementation class (Bytecode_start_php) generated from the PHP source code file (start.php) in FIG. 1A through a one function-to-one class method.

FIG. 2B shows an outline of a group of JAVA implementation classes (Bytecode_funcs_php, Bytecode_funcs_php_foo, Bytecode_funcs_php_bar) generated from the PHP source code file (funcs.php) in FIG. 1A through the one function-to-one class method.

FIG. 2C shows the implementation classes generated from the PHP source code file (start.php) in FIG. 1A through the one function-to-one class method, and steps of converting source code into target code and executing the target code.

FIG. 3A shows implementation classes and interface classes generated from the PHP source code in FIG. 1A through a one function-to-one interface method, and steps of converting the source code into target code and executing the target code.

FIG. 3B shows an outline of an interface class for a function foo( ) and an interface class for a function bar( ) which are generated from the PHP source code in FIG. 1A through the one function-to-one interface method.

FIG. 3C shows an outline of an implementation class Bytecode_start_php generated from the PHP source code in FIG. 1A through the one function-to-one interface method.

FIG. 3D shows an outline of an implementation class Bytecode_funcs_php generated from the PHP source code in FIG. 1A through the one function-to-one interface method.

FIG. 4B shows an outline of the consolidated interface class for functions foo( ) and bar( ) generated from the PHP source code in FIG. 1A through the multiple functions-to-one interface method.

FIG. 4C shows an outline of the implementation class Bytecode_start_php generated from the PHP source code in FIG. 1A through the multiple functions-to-one interface method.

FIG. 4D shows an outline of the implementation class Bytecode_funcs_php generated from the PHP source code in FIG. 1A through the multiple functions-to-one interface method.

FIG. 10A shows an example of effects seen from reduction in the number of interface classes in a CRM (Customer Relationship Management) application.

FIG. 10C also shows the generation, declaration, call/execution of each function/method in chronological order.

FIG. 13C shows inclusion relations among the processes in the steps of conversion and execution in FIG. 4A.

DETAILED DESCRIPTION OF PREFERRED EMBODIMENTS

Figure 4A:
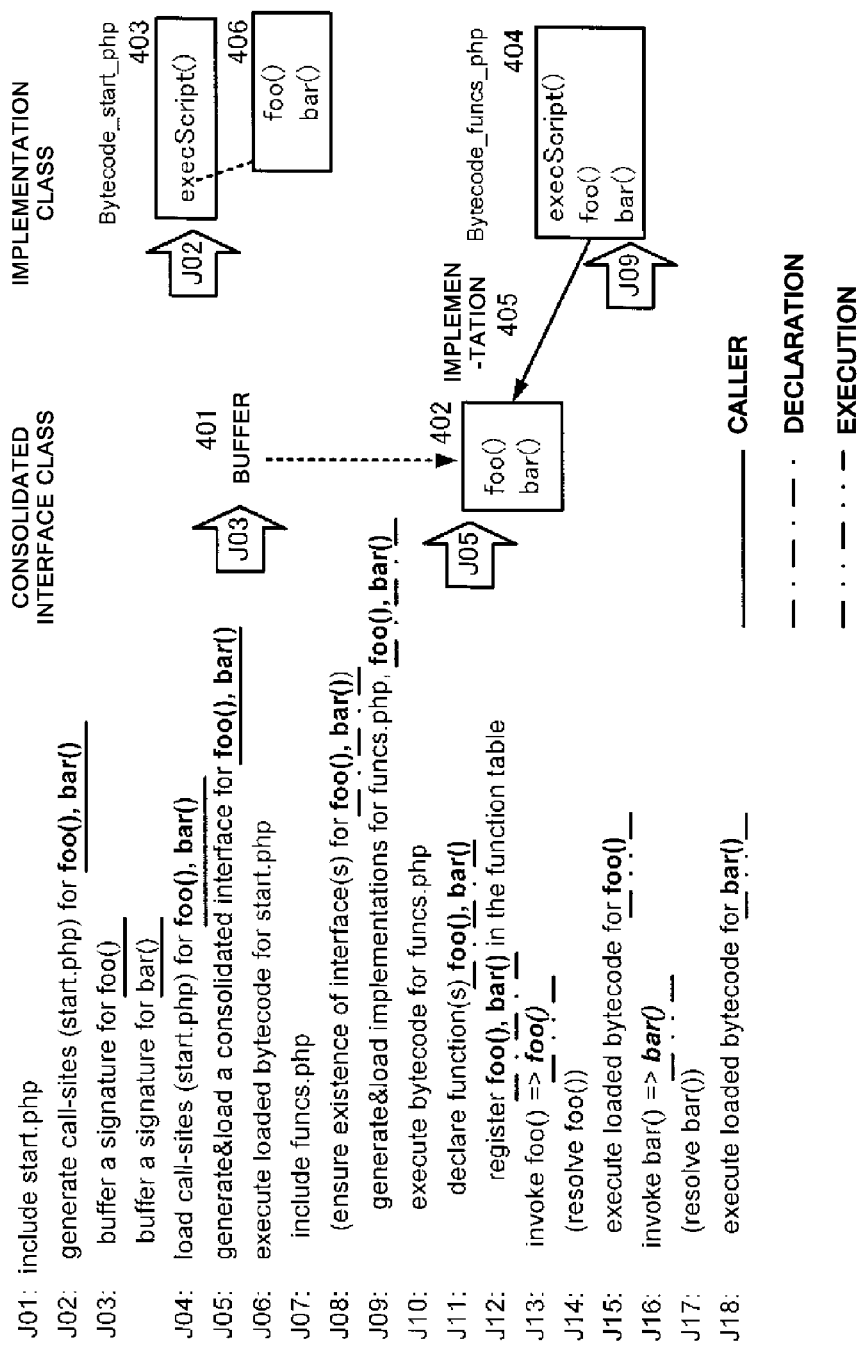
FIG. 4A shows implementation classes and an interface class generated from the PHP source code in FIG. 1A through a multiple functions-to-one interface method, and steps of converting the source code into target code and executing the target code.

One or more embodiments relate to a method, a computer program and a computer system for converting source code written in a dynamically typed language into target code written in a statically typed language and executing the target code.

Hereinafter, terms used in the claims and the specification are described.

In an embodiment of the invention, the term "dynamically typed language" denotes a language in which the type of a variable is determined not at programming-time or compile-time but at runtime. A dynamically typed language is written by a script, for example. A dynamically typed language includes PHP, Ruby, JAVASCRIPT, Python, and VISUAL BASIC, for example, but is not limited thereto.

In an embodiment of the invention, the term "source code" denotes program code written in a dynamically typed language, and code which is to be converted. Source code may be written by a script.

In an embodiment of the invention, the term "statically typed language" denotes a language in which the type of a variable is determined at programming-time or compile-time. A statically typed language includes .NET, JAVA, and C++, for example, but is not limited thereto.

In an embodiment of the invention, the term "target code" denotes objective code obtained by converting source code. Target code includes intermediate code and machine language. In the case of JAVA, for example, intermediate code indicates bytecode.

In an embodiment of the invention, for the term "function/method," the definition of a function/method in a dynamically typed language which is a conversion source or in a statically typed language which is a conversion target is applied as it is, although the definition thereof somewhat differs from one language to another. For example, according to the object orientation, a function is defined as implementation of a method, and a method is defined as means to process a message sent to an object.

In an embodiment of the invention, the term "caller" denotes a component which calls a function/method.

In an embodiment of the invention, the term "callee" denotes a component whose function/method is called.

In an embodiment of the invention, the term "signature" denotes a signature for specifying a function/method in a caller which is to be converted, and indicates the name of and the number of arguments (parameters) of a function/method. Since this is a signature in a dynamically typed language, the type of a variable is not required. A signature may include the type of a variable in a language having a feature of a statically typed language as an option.

In an embodiment of the invention, the term "class serving as an interface" (interface class) denotes a class which is needed to generate a caller in source code and serves as an interface in a statically typed language. In an interface class, a function/method is only defined and code for realizing its specific operation is not implemented. For example, an interface in JAVA corresponds to an interface class. In an embodiment of the invention, the generation of an interlace class is not performed until a command to call a function/method by a caller in source code is executed, i.e., the generation is delayed to a time point immediately before the execution of a part of target code corresponding to the call for the function/method by the caller in the source code. In other words, an interlace class is generated at the time point immediately before the execution of the part of the target code corresponding to the call for the function/method, or at a time point prior to the time point. The time point prior to the execution of the part of the target code corresponding to the call depends on how a virtual machine is implemented in the case of JAVA, for example. The part of the target code corresponding to the call indicates code including a caller, and is the main body of a method in the case of JAVA, for example.

In an embodiment of the invention, the term "class for implementation" (implementation class) denotes a class which corresponds to the signature of a function/method included in source code and used by a caller, and which is defined for implementation corresponding to a callee function/method in a dynamically typed language. In addition, code for realizing the operations of a function/method and its variable is implemented in an implementation class. In the case of JAVA, for example, an implementation class corresponds to a class which implements all functions/methods defined not in the corresponding abstract class but in the corresponding interface. An instance necessary for execution of a program is generated by an implementation class, and thus the program is executed. In an embodiment of the invention, an implementation class is generated upon execution of a command to call a function/method in target code corresponding to source code.

In an embodiment of the invention, the term "conversion and execution" denotes converting source code written in a dynamically typed language into target code written in a statically typed language, and executing the converted target code. In an embodiment of the invention, this "conversion" is also called compilation. In the execution, an interface class and an implementation class are used.

Hereinafter, an embodiment of the invention is described in accordance with the drawings. It should be understood that this embodiment is provided to illustrate a preferred embodiment of the invention, and not intended to limit the scope of the invention to a scope described herein. Further, the same reference numeral denotes the same object throughout the drawings, unless otherwise noted.

PHP is taken as an example of a dynamically typed language and JAVA is taken as an example of a statically typed language below. However, the invention is not limited thereto.

FIG. 1A shows an example of PHP source code files (start.php, funcs.php) which are written in a PHP language which can be source code to be converted.

The PHP source code tiles include two source code files, i.e., start.php (101) and funcs.php (102). The arrow 103 indicates a correlation between an inclusion command include in the source code of the file start.php (101) and the file funcs.php (102) specified by the inclusion command. The arrow 104 indicates a correlation between a caller function foo( ) and the corresponding callee function declared and defined. Likewise, the arrow 105 indicates a correlation between a caller function bar( ) and the corresponding callee function declared and defined. Note that, these files are sometimes called script files meaning that they are written in a dynamically typed language.

Next, a description is given of problems of conventional techniques observed when PHP source code is converted into bytecode, by using the PHP source code files (start.php, funcs.php) in FIG. 1A.

The difference in behavior of a symbol table between a dynamically typed language and a statically typed language poses a problem when source code written in a dynamically typed language such as PHP is converted into bytecode of a statically typed language such as JAVA, and the bytecode is executed. Here, a symbol denotes a character string for specifying the name of a variable, a class, a method, or a function. A symbol table is a table which stores therein a correlation between a symbol and an entity of a variable, a class, or the like indicated by the symbol. Consider in particular a case where implementations of multiple functions/methods written in PHP are brought together into a single JAVA class, which is a compilation unit, in order to reduce the number of classes in JAVA which is a language of a conversion target. In this case, a method of efficiently implementing the functions/methods into the class is unclear.

For example, consider an example where the two PHP source code files (101, 102) in FIG. 1A are compiled to correspond respectively to JAVA classes.

First consider a method where one function/method in PHP source code is assigned one JAVA class. This method is hereinafter called a one function-to-one class method. The one function-to-one class method will be described in detail by using FIGS. 2A to 2C. The one function-to-one class method involves the generation of numerous classes and the loading of the classes. For this reason, this method causes a problem of an increase in memory footprint or of overhead in the management of classes.

Meanwhile, consider a method where one script file in PHP source code is assigned one JAVA class. This method is hereinafter called a one script file-to-one class method. In the one script file-to-one class method, two JAVA implementation classes, i.e., Bytecode_start_php (111, FIG. 1B) and Bytecode_funcs_php (112, FIG. 1C) are generated to correspond respectively to the PHP source code files (start.php (101) and funcs.php (102)), as shown in FIGS. 1B and 1C. Here, the above names of the JAVA classes are given at random.

FIG. 1B shows an outline of the JAVA class (Bytecode_start_php) (111) generated from the PHP source code file (start.php) in FIG. 1A through the one script file-to-one class method.

FIG. 1C shows an outline of the JAVA class (Bytecode_funcs_php) (112) generated from the PHP source code file (funcs.php) in FIG. 1A through the one script file-to-one class method.

In FIGS. 1B and 1C, the JAVA classes (Bytecode_start_php, Bytecode_funcs_php) (111, 112) are shown by using JAVA source code for the sake of readability. However, the JAVA classes (Bytecode_start_php, Bytecode_funcs_php) (111, 112) are actually written in JAVA bytecode equivalent to JAVA source code.

Execution starts from a call for a method executeScript( ) of the JAVA class Bytecode_start_php (111) in FIG. 1B (A02). An include command in line 3 of FIG. 1B (A03) is a command to specify and include the file funcs.php (102). The JAVA class Bytecode_funcs_php (112) in FIG. 1C corresponds to the file funcs.php (102) shown in FIG. 1A. The include command (A03) calls a method executeScript( ) in line 2 of the JAVA class Bytecode_funcs_php (112) in FIG. 1C (B02). Here, the term "PHPValue" in line 8 of FIG. 1C (B08) denotes a class for holding values used in a PHP program.

What presents a problem in FIG. 1B is how functions foo( ) and bar( ) called in line 4 (A04) and line 5 (A05) are implemented. In a PHP program, it is not until a script including the declaration of a function/method is executed (in lines 3 and 4 of FIG. 1C) that how the function/method called by the declared name is implemented is fixed. Accordingly, it is generally not possible to implement each function as a static method, and to call the functions foo( ) and bar( ) in FIG. 1B simply through a static method call (invokestatic command, for example). This is because what kind of function/method is actually to be called varies depending on the past execution status. If code for a call is generated assuming a specific callee, it is impossible to cope with a case where a different function is declared in a process of a request to call a callee other than the assumed callee, for example. Further, in the case of the above example and the like, a callee often remains unknown until the implementation class (111) corresponding to the caller script file start.php (101) is actually run, in other words, until the included file funcs.php is read and run. The above problems can be resolved by using the JAVA reflection mechanism, or by performing class loading for every declaration. These workarounds, however, incur enormous overhead during runtime.

These problems occur essentially due to a difference in ways of resolving symbols between a script language such as PHP or Ruby and JAVA language. In JAVA, the location of the definition for an entity of a class or method corresponding to a certain symbol is implicitly fixed to a specific class file through classpath. Moreover, in JAVA, a program of a typical server-side application such as Servlet is written on the assumption that a correlation between a symbol and an entity of a class or method is the same throughout multiple request processes. Since a language such as PHP or Ruby, on the other hand, is designed in a way to include a step of causing an entity to correspond to a certain symbol for every request process, a program of an application using the language is also written in the same way. Here, the step of causing an entity to correspond to a certain symbol is equivalent to the process of declare function in the above example.

FIGS. 2A to 2C show an application example of the one function-to-one class method.

A typical way of solving the above problems without using the JAVA reflection mechanism is to use a JAVA method call mechanism. In the way of using the method call mechanism: a fixed interface (or an abstract class) such as PHPFunction is set as a class serving as an interface; one implementation class which implements the interface is generated for each PHP function; and a function/method is always called through the corresponding interface, as shown in FIG. 2A. However, in bytecode generated by the one function-to-one class method, a lot of implementation classes are consequently generated from the single script file funcs.php, as shown in FIG. 2B.

FIGS. 2A to 2C show an example where the one function-to-one class method is applied to the PHP source code files (start.php, funcs.php) shown in FIG. 1A.

FIG. 2A shows an outline of a JAVA implementation class (Bytecode_start_php) generated from the PHP source code file (start.php) in FIG. 1A through the one function-to-one class method. The name of the class is given at random. In addition, the implementation class is shown by using JAVA source code for the sake of readability. However, the JAVA implementation class (Bytecode_start_php) (201) is actually written in JAVA bytecode equivalent to JAVA source code.

The implementation class (Bytecode_start_php) (201) is generated in bytecode to correspond to the PHP file start.php (101).

The term constant_Hello in line 5 (C05) of FIG. 2A is a constant representing a character string literal corresponding to "Hello" in the original PHP program before conversion (see 101 in FIG. 1A), and is implemented as a class variable. Values of various types can be taken as an argument of the function bar( ) which is implementation of a function call, in accordance with the original PHP program (101). Moreover, the return value for this function can be used in various ways. However, these have no direct relation with the invention, and thus will not be described herein.

FIG. 2B shows an outline of a group of JAVA implementation classes (Bytecode_funcs_php, Bytecode_funcs_php_foo, Bytecode_funcs_php_bar) generated from the PHP source code file (funcs.php) in FIG. 1A through the one function-to-one class method. These implementation classes are written in separate class files. The above names of the classes are given at random. Moreover, the implementation classes are shown by using JAVA source code for the sake of readability. However, the JAVA implementation classes (202, 203, 204) are actually written in JAVA bytecode equivalent to JAVA source code.

With the conversion through the one function-to-one class method, the three JAVA implementation classes, i.e., Bytecode_funcs_php (202), Bytecode_funcs_php_foo (203), and Bytecode_funcs_php_bar (204) are generated from the single PHP file funcs.php (102), as shown in FIG. 2B. In other words, multiple implementation classes are generated from a single script file. A large amount of memory is required to generate and load multiple implementation classes. For this reason, the generation and loading of multiple implementation classes cause a problem of an increase in memory footprint or of overhead in the management of classes.

FIG. 2C shows the implementation classes generated from the PHP source code file (start.php) in FIG. 1A through the one function-to-one class method, and steps of converting source code into target code and executing the target code.

In FIG. 2C, the left-hand side shows the steps of conversion and execution (E01 to E12). The right-hand side shows implementation classes (211, 212, 213, and 214) generated through the one function-to-one class method. As shown in FIG. 2C, in the one function-to-one class method, one class is prepared per function in source code. The right-hand side also shows how a function executeScript( ) of the implementation class (211) calls, as its implementation contents, invoke( ) through a fixed interface (215). The implementation classes are shown with boxes (211, 212, 213, 214, and 215). The numbers (E02 and E05) in arrows given on the left-hand side of the implementation classes correspond respectively to the step numbers of the above steps.

The implementation classes in FIG. 2C each extend (extends) or implement (implements) a class serving as a common interface. The common interface denotes an interface previously prepared in a language system and can be used in common (PHPFunction in line 11 (D11) and line 21 (D21) of FIG. 2B, and the common interface in line 2 (E02) of FIG. 2C).

Hereinafter, the steps of conversion and execution are described.

In line 1 (E01), a command include to include the PHP file start.php (101) is directed. The steps in lines 2 to 12 (E02 to E12) are executed as sub-steps of E01.

In line 2 (F02), the generation and loading of the implementation class corresponding to a caller of the functions foo( ) and bar( ) in the PHP file start.php (101 in FIG. 1A) are directed. According to the directions, the implementation class Bytecode_start_php (211) corresponding to the file start.php is generated with a method call for a target object typed with the common interface, as shown by the arrow (E02). Code for the class Bytecode_start_php is shown in FIG. 2A. In lines 4 (C04) and 5 (C05), the common interface PHPFunction is specified in bytecode as an interface provided with a method invoke( ) although not shown in source code.

In line 3 (E03), the execution of the loaded class Bytecode_start_php (211) is directed. Specifically, the steps C02 to C06 of the implementation class Bytecode_start_php (201) shown in FIG. 2A are executed. First, a command executeScript( ) of step C02 is executed.

In line 4 (E04), an inclusion command include of step C03 in FIG. 2A is executed, and thus the specified file funcs.php (102 in FIG. 1A) is included.

In line 5 (E05), the generation and loading of an implementation class corresponding to the specified file funcs.php are directed. According to the directions, the implementation class Bytecode_funcs_php (212) corresponding to the file funcs.php is generated and loaded, as shown by the arrow (E05).

In line 6 (E06), the execution of the implementation class Bytecode_funcs_php (212) is directed. Specifically, a command executeScript( ) in line 2 (D02) of the class Bytecode_funcs_php (202) shown in FIG. 2B is executed.

In line 7 (E07), functions foo( ) and bar( ) in lines 3 (D03) and 4 (D04) in FIG. 2B are subsequently declared. With this declaration, function names foo and bar of these functions are associated with function objects (entities) respectively created from the implementation classes Bytecode_funcs_php_foo (203) and Bytecode_funcs_php_bar (204) corresponding to the functions.

In line 8 (E08), the registration of the function objects to a function table is directed. In the function table, a correlation between the signature of a function and an object of an entity for the function (object of an implementation class, for example) is recorded. Thereby, a function call is associated with a function object (entity) actually performing a process, and the execution of the class Bytecode_funcs_php (202) ends. Then, the process returns to step C04 of the implementation class Bytecode_start_php (201).

In line 9 (E09), the execution of step C04 of the class Bytecode_start_ php (201), i.e., a call for the function foo( ) by the function name foo is directed.

In line 10 (E10), the function foo( ) registered in the function table in E08 is executed in response to the call for the function foo( ).

In lines 11 (E11) and 12 (F12), the same processes as in lines 9 (E09) and 10 (E10) are executed for the function bar( ).

FIGS. 3A to 3C show how the number of interface classes generated through a method of preparing one interface for each function (hereinafter called a one function-to-one interface method) is increased.

In the one function-to-one interface method, an interface class is prepared per caller of one function/method. This allows consolidating implementations of multiple functions/methods into one JAVA class in target code. In the one function-to-one interface method, the implementation class of PHP functions/methods implements all interface classes corresponding to required functions/methods (see 301 and 302 of FIG. 3A). In addition, a call part of a PHP function/method makes a call through the corresponding interface class (see 304 of FIG. 3A). A call through an interface class is made through invoke interface, for example. Invoke interface is an example to be used in a case where 304 in FIG. 3A is represented in actual bytecode.

FIG. 3A shows implementation classes and interface classes generated from the PHP source code in FIG. 1A through the one function-to-one interface method, and steps of converting the source code into target code and executing the target code.

In FIG. 3A, the left-hand side shows the steps of conversion and execution (F01 to F13). The right-hand side shows implementation classes (303 and 304) and interface classes (301 and 302) generated through the one function-to-one interface method. The right-hand side also shows how the implementation class (303) calls, as its implementation contents functions foo( ) and bar( ) through the interface classes (307). As shown in FIG. 3A, in the one function-to-one interface method, the interface classes (301, 302) are prepared for respective caller functions/methods, and the implementation classes (303, 304) are generated to correspond to the interface classes (301, 302). The numbers (F02, F03, and F06) in arrows given on the left-hand side of the implementation classes and interface classes correspond respectively to the step numbers of the above steps.

Arrows (305 and 306) indicate that the implementation class (304) implements the two interface classes (301 and 302).

FIG. 3B shows an outline of the interface class for the function foo( ) and the interface class for the function bar( ) which are generated from the PHP source code in FIG. 1A through the one function-to-one interface method.

The outline of the interface class (301) in FIG. 3A is shown as the interface class (311). Likewise, the outline of the interface class (302) in FIG. 3A is shown as the interface class (312).

The interface class (311) is an interface class for the function foo( ), whereas the interface class (312) is an interface class for the function bar( ). The interface classes (311 and 312) are shown by using JAVA source code for the sake of readability.

FIG. 3C shows an outline of an implementation class generated from the PEW source code in FIG. 1A through the one function-to-one interface method.

The outline of the implementation class (303) in FIG. 3A is shown as the implementation class (321). The implementation class (321) corresponds to the PHP source code file (start.php) (101). The implementation class (321) is shown by using JAVA source code for the sake of readability.

FIG. 3D shows an outline of an implementation class generated from the PHP source code in FIG. 1A through the one function-to-one interface method.

The outline of the implementation class (304) in FIG. 3A is shown as the implementation class (322). The implementation class (322) corresponds to the PHP source code file (funcs.php) (102). The implementation class (322) is shown by using JAVA source code for the sake of readability.

Hereinafter, the steps of conversion and execution shown in FIG. 3A are described.

In line 1 (F01), a command include to include the script file start.php (101) which is a PHP source code file is directed. The steps in lines 2 to 13 (F02 to F13) are executed as sub-steps of F01.

In line 2 (F02), the generation and loading of an implementation class corresponding to a caller of the functions boo( ) and bar( ) in the PHP file start.php (101) are directed. According to the directions, the implementation class Bytecode_start_php (303) corresponding to the file start.php (101) is generated, as shown by the arrow (F02). Code for the class Bytecode_start_php (303) is shown in 321 of FIG. 3C.

In line 3 (F03), the generation and loading of the interface classes for use in the calls for the respective functions foo( ) and bar( ) are directed. According to the directions, the two interface classes (301 and 302) are generated and loaded, as shown by the arrow (F03). Here, code for the interface classes (301 and 302) is shown in 311 and 312 of FIG. 3B.

In line 4 (F04), the execution of the caller implementation class (303) thus loaded is directed. Thereby, a script execution command executeScript( ) of step H02 of the implementation class is executed, as shown in the code (321) of the implementation class in FIG. 3C.

In line 5 (F05), the inclusion command include in step H03 is executed with the execution of the script execution command executeScript( ) of step H02, and thus the specified file funcs.php is included. At this point, the implementation class Bytecode_start_php (303) corresponding to the file start.php (101), which is being executed, is suspended, and the process moves to the generation and loading of an implementation class (304) corresponding to the newly included PHP file funcs.php (102).

In line 6 (F06), the generation and loading of bytecode for the implementation class Bytecode_funcs_php (304) corresponding to the included file funcs.php are directed. According to the directions, the implementation class (304) corresponding to the file funcs.php is generated and loaded, as shown by the arrow (F06). Here, code for the implementation class (304) is shown in 322 of FIG. 31). The implementation class (304) is generated while implementing the interface classes Function_foo and Function_bar.

In line 7 (F07), the execution of the implementation class (304, 322 of FIG. 3D) corresponding to the file funcs.php is directed, and a script execution command executeScript of step (102) shown in FIG. 3D is executed. Hereinbelow, the execution of the implementation class (304) continues till line 9 (F09).

In line 8 (F08), function declaration commands declareFunction in steps (103 and 104) are executed followed by the execution of the script execution command execute-Script. By the execution of the function declaration commands declareFunction, instances for executing calls for the functions foo( ) and bar( ) are created by the implementation class (304, 322 of FIG. 3D) itself.

In line 9 (F09), the functions foo( ) and bar( ) are registered in execution contexts (declareFunction( )). Specifically, the created instances and function names foo and bar of the called functions foo( ) and bar( ) are registered in association with each other in a function table. This registration is made in order to search, upon function call, the function table for the corresponding instance, and to process the function call by use of methods foo( ) and bar( ) included in the instance thus searched out. With the above processes, the execution of the implementation class Bytecode_funcs_php (304) is completed. The process thereafter returns to the execution of the suspended implementation class Bytecode_start_php (303).

In line 10 (F10), the function foo( ) is called by using JAVA bytecode obtained by conversion. Specifically, as shown in step H04 of the implementation class Bytecode_start_php (303) (321 of FIG. 3C) having been suspended, the function table is searched by the called function name foo, and the associated instance is thus found.

In line 11 (F11), the function foo( ) is executed. Specifically, the function foo( ) is executed by calling and executing a method foo( ) (corresponding to the function foo( ) included in the found instance. In this event, the instance is cast so as to have its type adaptable to the type defined in the interface class Function_foo (301, 311 of FIG. 3B).

In line 12 (F12), the function bar( ) is called by using JAVA bytecode obtained by conversion. Specifically, as shown in step H05 of the implementation class Bytecode_start_php (303) (321 of FIG. 3C) having been suspended, the function table is searched by the called function name bar, and the associated instance is thus found.

In line 13 (F13), the function bar( ) is executed. Specifically, the function bar( ) is executed by calling and executing a method bar( ) (corresponding to the function bar( )) included in the found instance. In this event, the instance is cast so as to have its type adaptable to the type defined in the interface class Function_bar (302, 312 of FIG. 3B).

Note that, in addition to the above, some consideration actually needs to be made to deal with various numbers of parameters. However, this has no direct relation with the invention, and thus will not be described herein.

As described above, in the one function-to-one interface method, an interface class needs to be generated and loaded for every function/method to be called. Thus, the one function-to-one interface method eliminates the need for preparing an implementation class for every function/method unlike the one function-to-one class method. In the meantime, the one function-to-one interface method causes the need for preparing an interface class for every function/method. As a consequence, a lot of interface classes need to be generated as a whole. An interface class basically has the same feature as a class, and is of large volume. With all of these taken into account, it can be said that the one function-to-one interface method has no noticeable difference from the one function-to-one class method.

With FIGS. 4A to 4D, a description is given of a method of consolidating multiple functions/methods to be called into one interface class (hereinafter called a multiple functions-to-one interface method) according to an embodiment of the invention. In the multiple functions-to-one interface method, generated and loaded interface classes are consolidated into one interface class on a per-compilation basis (on a file basis, for example). This allows reducing the number of interface classes, and thus contributes to a reduction in the amount of memory consumption. The above interface class thus consolidated is hereinafter called a consolidated interface class.

In the multiple functions-to-one interface method, while implementations of multiple functions/methods in source code are consolidated into one implementation class, interface classes are speculatively collected irrespective of the implementation class. Here, the expression "speculatively" denotes "at every time of encounter with a function call in source code," and depends on the source code in this respect. The speculative collection of interface classes allows reducing the number of interface classes required for target code generation.

One or more embodiments of the invention cause a caller function/method in a dynamically typed language to correspond to an interface class (abstract class) in a statically typed language, instead of causing the function/method to correspond directly to a class in the statically typed language as in the one function-to-one class method. This allows generating bytecode corresponding to a caller efficiently even in a case where a callee implementation class is not fixed or changes during runtime.

FIG. 4A shows implementation classes and a consolidated interface class generated from the PHP source code in FIG. 1A through the multiple functions-to-one interface method, and steps of converting the source code into target code and executing the target code.

In FIG. 4A, the left-hand side shows the steps of conversion and execution (J01 to J18). The right-hand side shows implementation classes (403 and 404) and a consolidated interface class (402) generated through the multiple functions-to-one interface method. As shown in FIG. 4A, in the multiple functions-to-one interface method, the one consolidated interface class (402) is generated for the caller of multiple functions/methods, and the implementation class (404) implementing the consolidated interface class (402) is generated. The right-hand side also shows how the implementation class (403) calls, as its implementation contents, functions foo( ) and bar( ) through the consolidated interface (406). The numbers (J02, J03, J05, and J09) in arrows given on the left-hand side of the implementation classes (403 and 404) and consolidated interface class (402) correspond respectively to the step numbers of the above steps.

A buffer (401) is a storage used for storing temporality the signature of each caller function/method. One consolidated interface class is generated by using at least one signature stored in the buffer. In other words, a consolidated interface class is generated not for each caller but on a per-compilation basis (on a script file basis, for example). The buffer (401) may be included in a bytecode generator (1106) which will be described with FIG. 11A, or in a memory of another JAVA VM. In an embodiment of the invention, the buffer (401) is employed for using a consolidated interface class.

In the multiple functions-to-one interface method, a consolidated interface class is not immediately generated from multiple caller functions/methods. Instead, signatures of the respective multiple functions/methods are first just stored in the buffer (401). The name of a consolidated interface class is determined to correspond to the buffer, and signatures of functions/methods are stored in the buffer on a compilation basis. For example, it is possible to store, in the buffer, not only the signature of a function/method which appears in a certain compilation unit (in a source code file, or the like) and is used by a caller, but also the signature of a function/method which appears in a different compilation unit obtained by parsing such as a process of including a script. For example, the signature of a function/method other than the function/methods foo( ) and bar( ) may be stored in the buffer. It is not until the caller implementation class (403) is executed that one consolidated interface class (402) for all the signatures stored in the buffer (401) is generated in a storage device. Then, the implementation class (404) implementing the one consolidated interface class (402) is generated when a call for any of the corresponding function/methods is executed.

FIG. 4B shows an outline of the consolidated interface class for the functions foo( ) and bar( ) generated from the PHP source code in FIG. 1A through the multiple functions-to-one interface method.

The outline of the consolidated interface class (402) in FIG. 4A is shown as a consolidated interface class (411). The consolidated interface class (411) is an interface class for both of the functions foo( ) and bar( ). The consolidated interface class (411) is shown by using JAVA source code for the sake of readability.

FIG. 4C shows an outline of the implementation class Bytecode_start_php generated from the PHP source code in FIG. 1A through the multiple functions-to-one interface method.

The outline of the implementation class (403) in FIG. 4A is shown as the implementation class (421). The implementation class (421) corresponds to the PHP source code (start.php) (101). The implementation class (421) is shown by using JAVA source code for the sake of readability.

FIG. 4D shows an outline of the implementation class Bytecode_funcs_php generated from the PHP source code in FIG. 1A through the multiple functions-to-one interface method.

The outline of the implementation class (404) in FIG. 4A is shown as the implementation class (422). The implementation class (422) corresponds to the PHP source code (funcs.php) (102). The implementation class (422) is shown by using JAVA source code for the sake of readability.

Hereinafter, the steps of conversion and execution shown in FIG. 4A are described.

In line 1 (J01), a command include to include the script file start.php (101 in FIG. 1A) which is a PHP source code file is directed. The steps in lines 2 to 18 (J02 to J18) are executed as sub-steps of J01.

In line 2 (J02), the generation of an implementation class corresponding to a caller of the functions foo( ) and bar( ) in the PHP file start.php (101 in FIG. 1A) is directed. According to the directions, the implementation class Bytecode_start_php (403) corresponding to the file start.php (101 in FIG. 1A) is generated, as shown by the arrow (J02). Bytecode for the class Bytecode_start_php (403) is shown in 421 of FIG. 4C.

In line 3 (J03), the storing of signatures of the respective called functions foo( ) and bar( ) in the buffer (401) is directed. According to the directions, the signatures thereof are stored in the buffer (401), as shown by the arrow (J03). The storing of the signatures is made in order to delay the generation and loading of an interface class to a phase where implementation code corresponding to a caller is actually executed.

In line 4 (J04), the implementation class Bytecode_start_php (403) is loaded into a JAVA VM.

In line 5 (J05), the taking out of the buffer (401) of signatures of the respective called functions foo( ) and bar( ), and the generation and loading of the consolidated interface class (402) are directed. According to the directions, the consolidated interface class (402) is generated as shown by the arrow (J05). Here, code for the consolidated interface class (402) is shown in 411 of FIG. 4B.

In this way, the loading of the class (interface) is requested, through a class loader (1107 of FIG. 11A), not at a timing when implementation code corresponding to a caller is generated (in line 2 (J02)) but at a timing when the implementation code is loaded (in line 4 (J04)) or, more preferably, executed. Thus, it is not until the timing when the implementation code is loaded or executed that the interface class including all methods corresponding to the signatures pooled in the buffer is generated and loaded. If the interface class already exists, the loading thereof is simply performed.

In line 6 (J06), the execution of the caller implementation class (403) thus loaded is directed. Thereby, a script execution command executeScript( ) of step L02 of the implementation class is executed, as shown in the code (421) of the implementation class in FIG. 4C.

In line 7 (J07), the execution of an inclusion command include of step L03 is directed followed by step L02, and thus the specified file funcs.php (102) is included. At this point, the implementation class Bytecode_start_php (403) corresponding to the file start.php (101), which is being executed, is suspended, and the process moves to the generation, loading, and execution of the implementation class (404) corresponding to the newly included PHP file funcs.php (102).

In line 8 (J08), it is checked whether there is an interface class or consolidated interface class (402) corresponding to calls for the functions foo( ) and bar( ) which are defined in the file funcs.php (102). A consolidated interface including the calls for the functions foo( ) and bar( ) is newly generated and loaded if no corresponding interface class exists; however, this is not the case.

In line 9 (J09), the generation and loading of bytecode for the implementation class (404, 422 of FIG. 4D) corresponding to the included file funcs.php (102 of FIG. 1A) are directed. According to the directions, the implementation class (404) corresponding to the file funcs.php (102 of FIG. 1A) is generated and loaded, as shown by the arrow (J09). Here, code for the implementation class (404) is shown in 422 of FIG. 4D. The implementation class (404) is generated with declaration that it implements the consolidated interface class Callsite_start_php (411).

In this respect, the loading of an implementation class for functions in a source language is delayed until the execution of the functions is required. It should be noted here that, in a case where all the code in a script needs to be generated, loaded, and executed to interpret and execute the script, such delay does not mean anything since the code such as executeScript( ) needs to be executed immediately in this case; however, in a case where the interpretation and execution of a script involves the execution of the compiled code in the script using the interpreter technology, it is also possible to first register functions defined in the file funcs.php only without generating the code such as executeScript( ), for example. The reason why the loading of the implementation class is delayed is that the loading of the implementation class requires the loading of an interface class implemented by this implementation class, and that the more the loading of the interface class is delayed, the larger number of signatures the interface class can collect and thus the more beneficial the interface class can be. When the implementation class is loaded, the signature of a function/method which has not been defined in any other interface yet is added to the buffer for signatures (such a request is found if there is a class referenced by the implementation class when the class loader loads the implementation class, and if the class loader tries to solve this problem). Here, if the implementation involves neither the implementation nor use of functions corresponding to signatures in the buffer, a signature list may be separately prepared. If a function not yet used (i.e., implementation of the function) is defined in the implementation class, a consolidated interface class including the signature of the function is prepared, and then generated and loaded.

In line 10 (J10), the execution of the implementation class (404) corresponding to the file funcs.php is directed, and a script execution command executeScript of step (M02) shown in FIG. 4D is executed.

In line 11 (J11), a function declaration command declareFunction is executed in steps (M03 and M04) followed by step (M02). By the execution of the function declaration command declareFunction, instances for executing calls for the functions foo( ) and bar( ) are created by the implementation class (404, 422 of FIG. 4D) itself.

In line 12 (J12), the created instances and function names foo and bar for the called functions foo( ) and bar( ) are registered in association with each other in a function table. This registration is made in order to search, upon function call, the function table for the corresponding instance, and to process the function call by use of methods foo( ) and bar( ) included in the instance thus searched out. With the above processes, the execution of the implementation class (404) ends. The process thereafter moves to steps (L04 and L05) next to branched step (L03) of the implementation class (402, 421 of FIG. 4C).

In line 13 (J13), a call for the function foo( ) (invoke foo( )) is executed by step described above (L04).

In line 14 (J14), as a preparation phase of step (L04), the function table is searched by the called function name foo, and the associated instance is thus found.

In line 15 (J15), the function foo( ) is executed by calling and executing a method foo( ) (corresponding to the function foo( )) included in the found instance. In this event, the instance is cast so as to have its type adaptable to the type defined in the consolidated interface class Callsite_start_php (402, 411 of FIG. 4B).

In line 16 (J16), a call for the function bar( ) (invoke bar( )) is executed by step described above (L05).

In line 17 (J17), as a preparation phase of step (L05), the function table is searched by the called function name bar, and the associated instance is thus found.

In line 18 (J18), the function bar( ) is executed by calling and executing a method bar( ) (corresponding to the function bar( )) included in the found instance. In this event, the instance is cast so as to have its type adaptable to the type defined in the consolidated interface class Callsite_start_php (402, 411 of FIG. 4B).

With the above processes, the steps of converting a PHP script into JAVA bytecode and executing the bytecode end.

Figure 5:
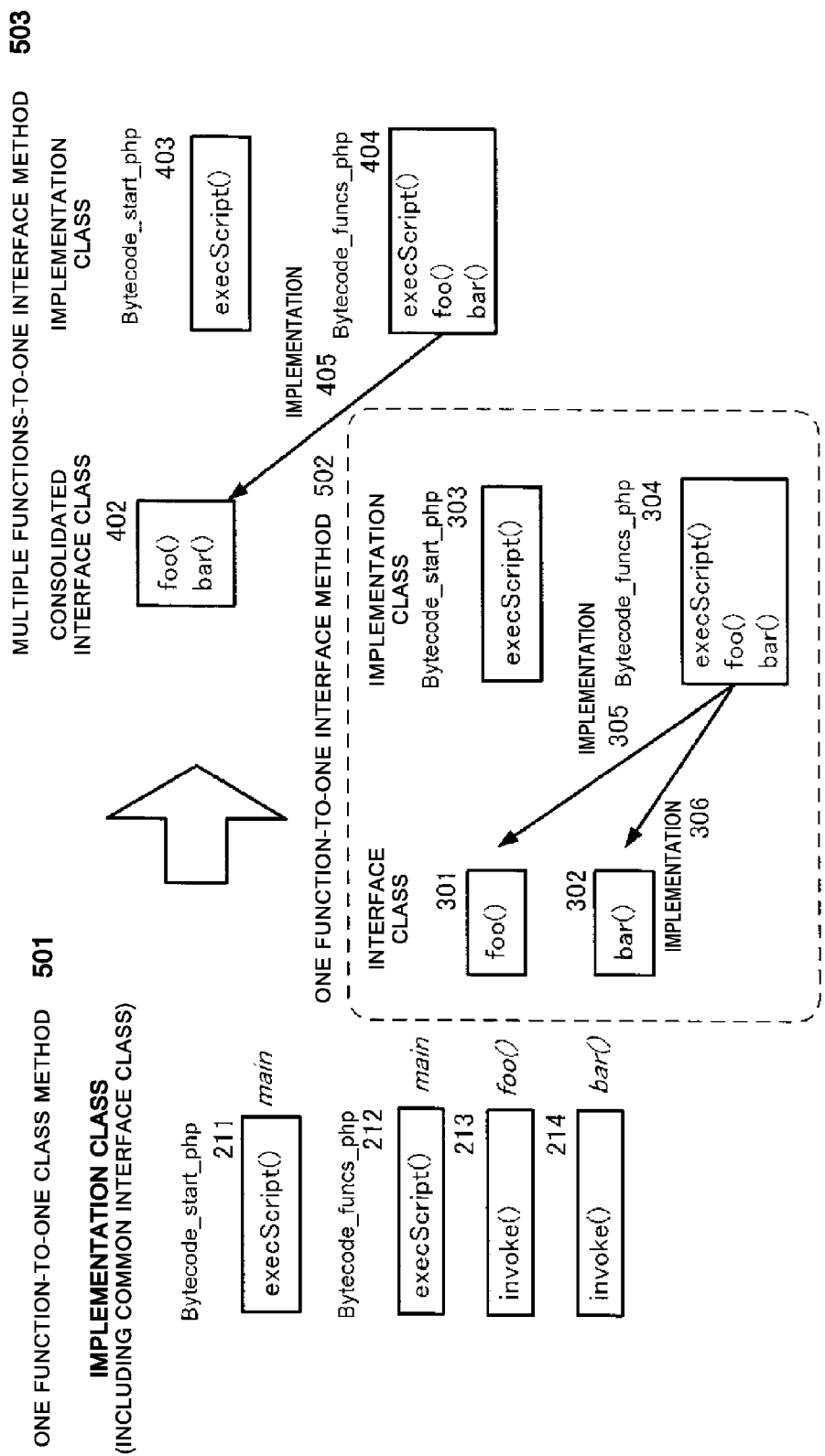
FIG. 5 shows differences of interface classes generated through the one function-to-one class method (FIGS. 2A to 2C), the one function-to-one interface method (FIGS. 3A to 3D), and the multiple functions-to-one interface method (FIGS. 4A to 4D).

FIG. 5 shows differences of interface classes generated through the one function-to-one class method (FIGS. 2A to 2C), the one function-to-one interface method (FIGS. 3A to 3D), and the multiple functions-to-one interface method (FIGS. 4A to 4D).

Reference numeral 501 indicates the implementation classes (211, 212, 213, and 214) generated through the one function-to-one class method (FIGS. 2A to 2C).

Reference numeral 502 indicates the interface classes (301, 302) and the class (304) for the implementations (305, 306) of the interface classes (301, 302), which are generated through the one function-to-one interface method (FIGS. 3A to 3D).

Reference numeral 503 indicates the consolidated interface class (402) and the class (404) for the implementation (405) of the consolidated interface class (402), which are generated through the multiple functions-to-one interface method (FIGS. 4A to 4D).

The number of interface classes generated through the one function-to-one interface method is two. On the other hand, the number of consolidated interface classes generated through the multiple functions-to-one interface method is one.

Note that, in the above example, a description is given of an example where the consolidated interface class includes two functions/methods. However, the multiple functions-to-one interface method can also be employed for a case of more than two functions/methods actually. Accordingly, only one interface class is needed by application of the multiple functions-to-one interface method, thereby allowing a reduction in the number of JAVA interface classes to be generated and loaded.

Figure 6A:
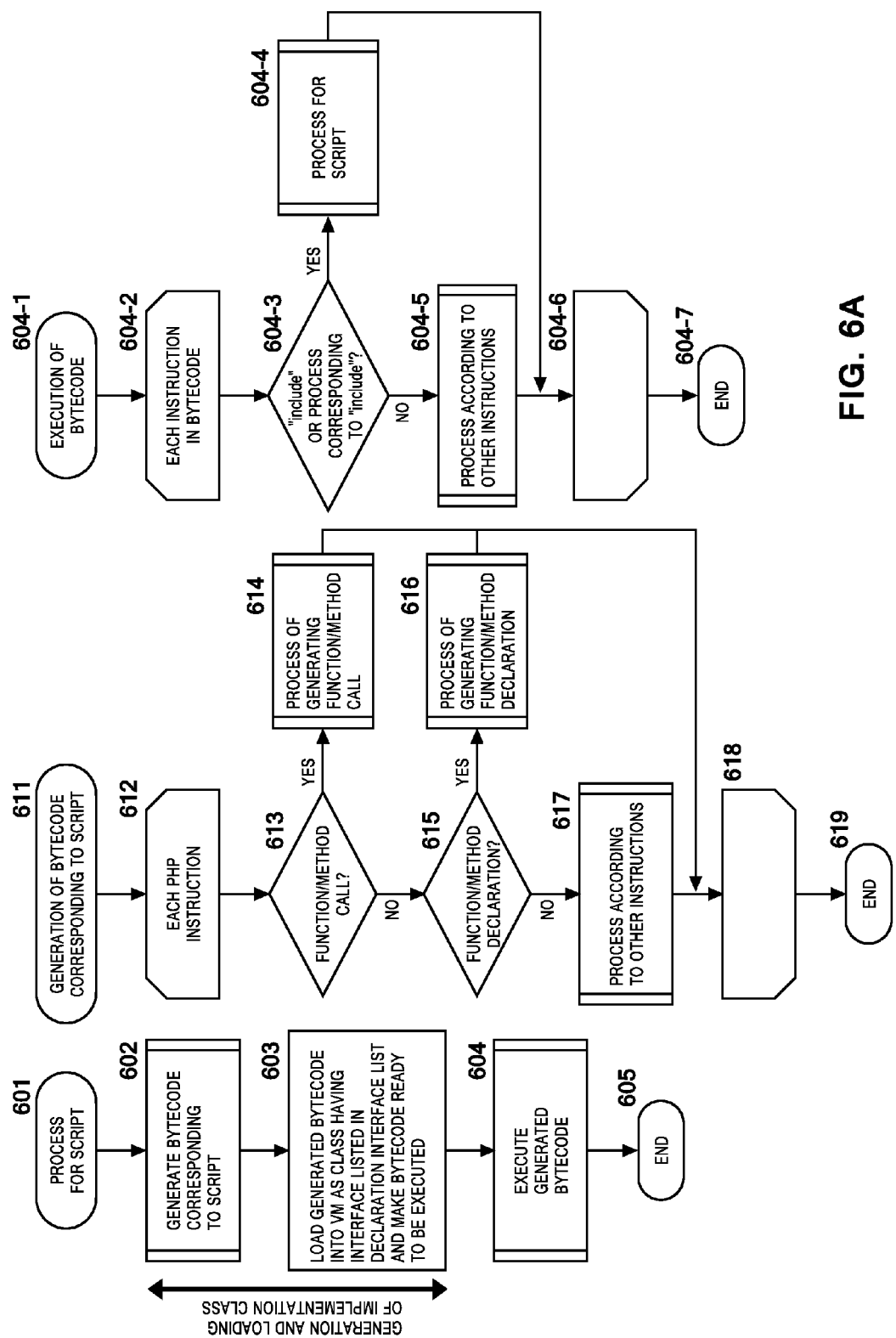
FIG. 6A shows flowcharts of a bytecode generation process according to the one function-to-one interface method.
Figure 6B:
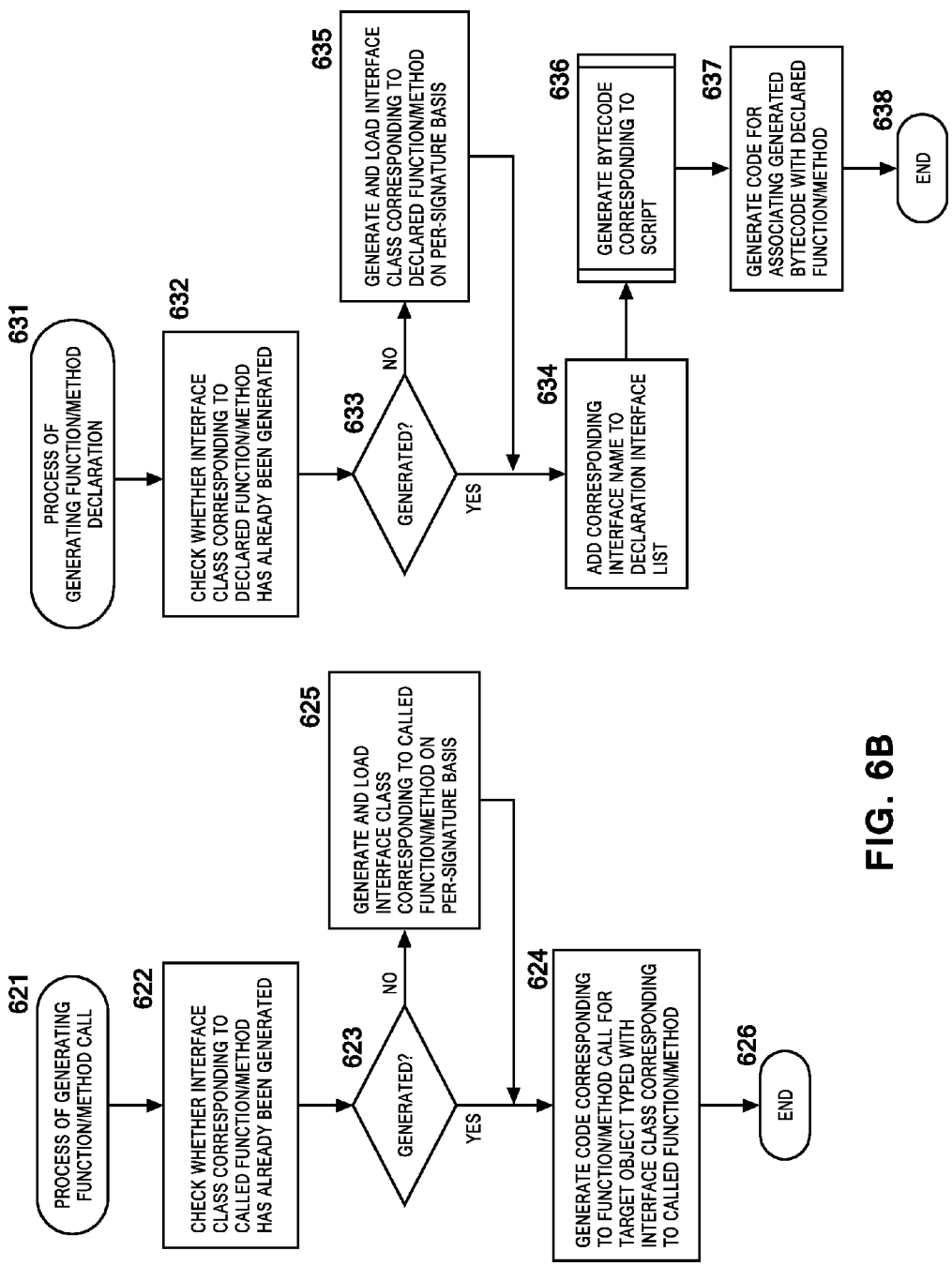
FIG. 6B shows detailed flowcharts of a process of generating a function/method call (step 614) and a process of generating a function/method declaration (step 616) which are shown in FIG. 6A.
Figure 6C:
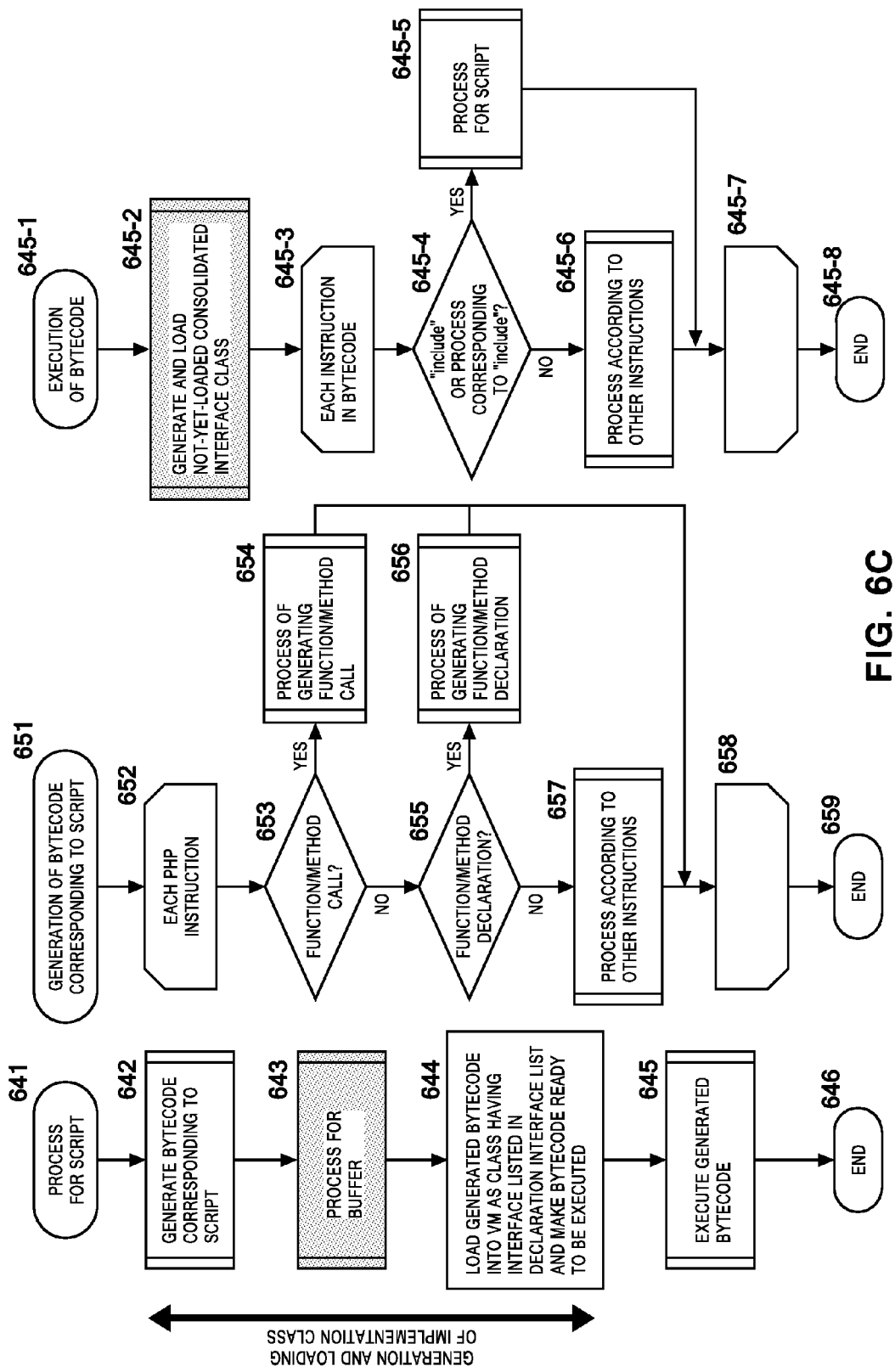
FIG. 6C shows flowcharts of a bytecode generation process according to the multiple functions-to-one interface method.
Figure 6D:
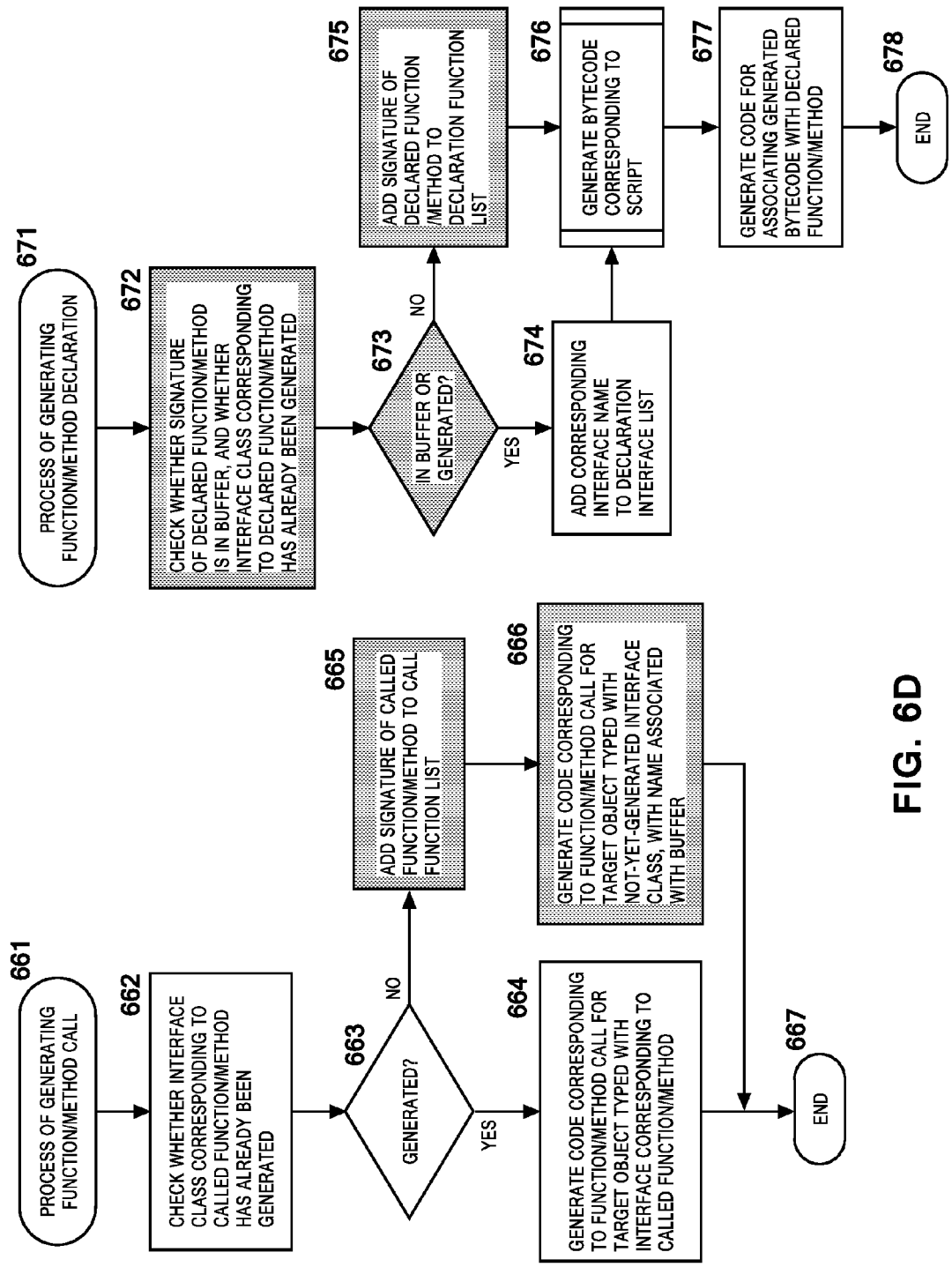
FIG. 6D shows detailed flowcharts of a process of generating a function/method call (step 654) and a process of generating a function/method declaration (step 656) which are shown in FIG. 6C.
Figure 6E:
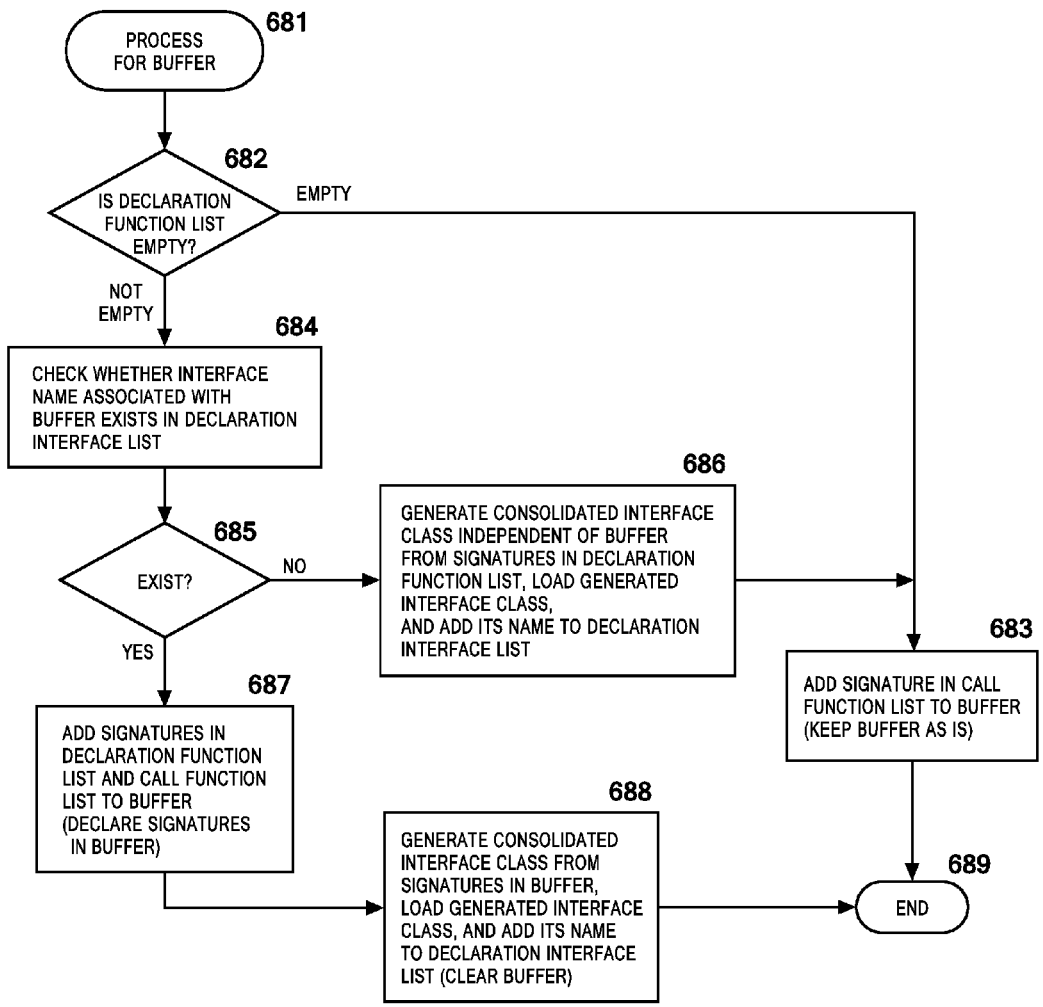
FIG. 6E shows a detailed flowchart of a buffer process in step 643 of FIG. 6C.

FIGS. 6A and 6B show flowcharts of a bytecode generation process according to the one function-to-one interface method, and FIGS. 6C, 6D, and 6E show flowcharts of a bytecode generation process according to the multiple functions-to-one interface method.

FIGS. 6A and 6B show the flowcharts of the bytecode generation process according to the one function-to-one interface method (FIGS. 3A to 3D).

The process flow on the left-hand side of FIG. 6A (steps 601 to 605) is a main flow showing the following process. Specifically, the process is to generate bytecode written in JAVA of a statically typed language out of source code written in a dynamically typed language according to the one function-to-one interface method in a state where none of data is cached yet, and to cache the generated bytecode. The bytecode is generated by the bytecode generator (1106) shown in FIG. 11A.

In step 601, the bytecode generator starts a process of converting source code written in a dynamically typed language to target code written in a statically typed language. Hereinafter, the description is given by taking a PHP language as an example of a dynamically typed language and a JAVA language as an example of a statically typed language. However, the invention is not limited to these languages. The source code is a script written in a PHP language in the case of a PHP language, and the target code is bytecode in the case of a JAVA language.

In step 602, the bytecode generator generates bytecode corresponding to the above script, and stores the generated bytecode into the storage device. The detailed processes of step 602 will be described later in steps 611 to 619, steps 621 to 626, and steps 631 to 638.

Figure 11A:
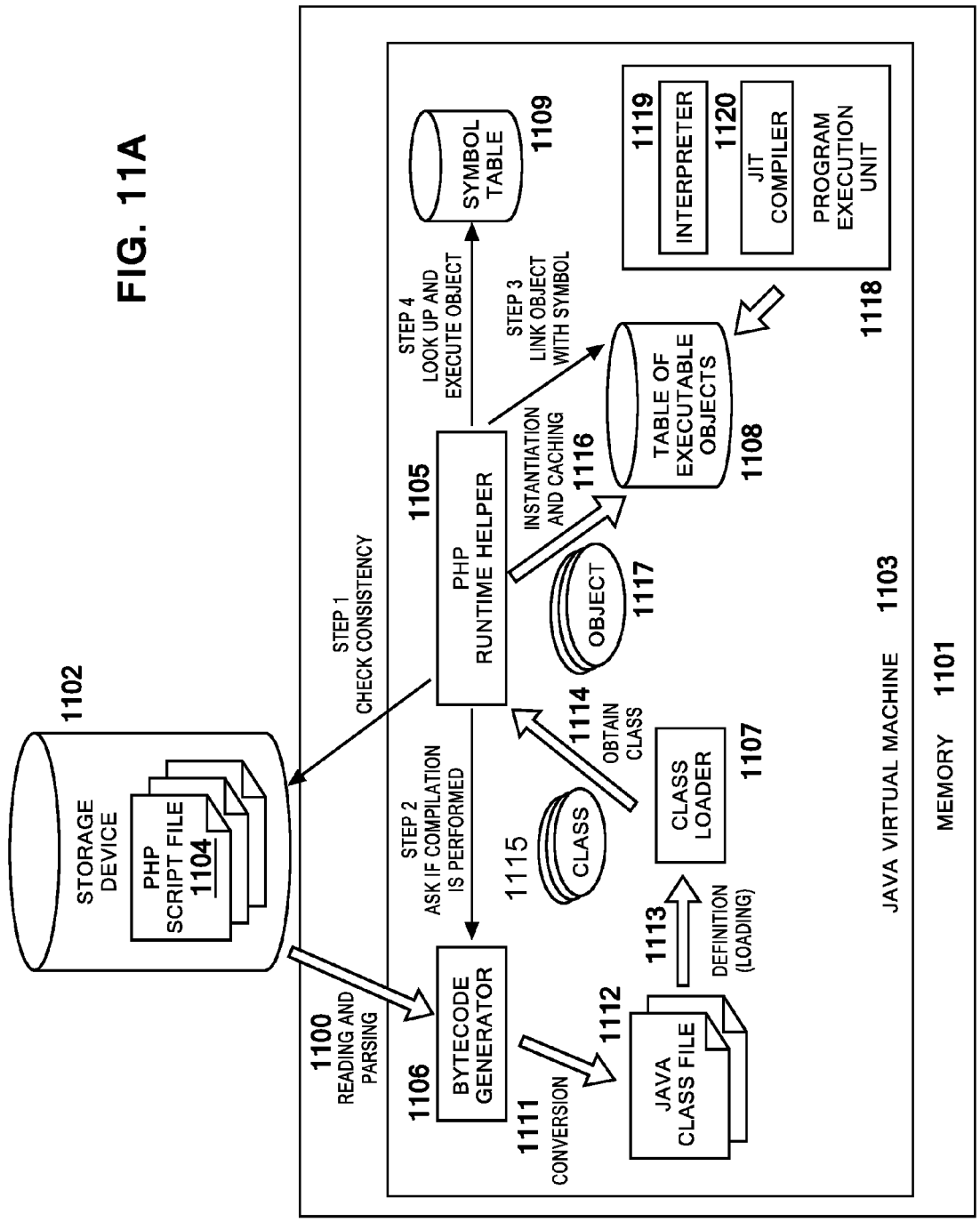
FIG. 11A is a diagram showing a system for converting source code written in a dynamically typed language into target code written in a statically typed language, according to an embodiment of the invention.
Figure 11B:
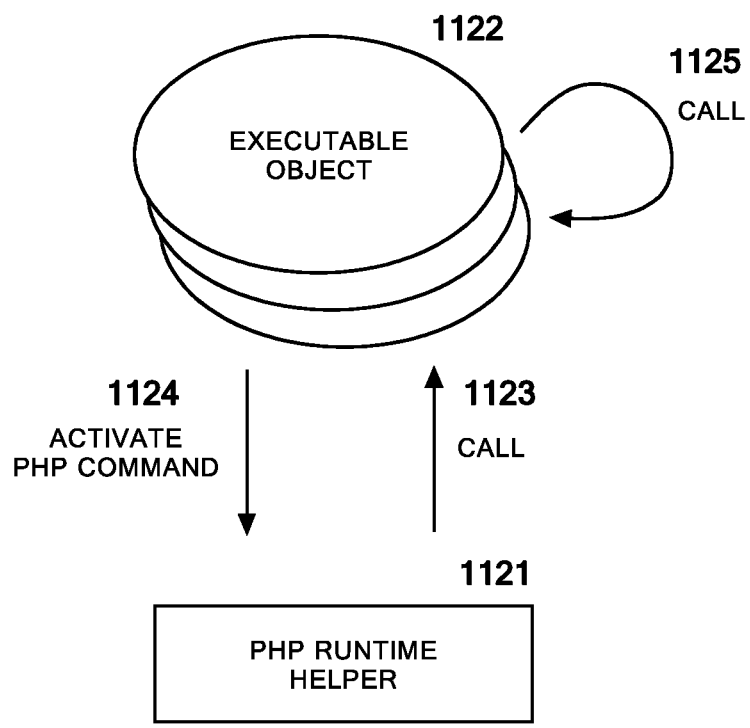
FIG. 11B is a diagram showing a relation between an executable object created as a result of conversion and an execution helper, according to an embodiment of the invention.
Figure 11C:
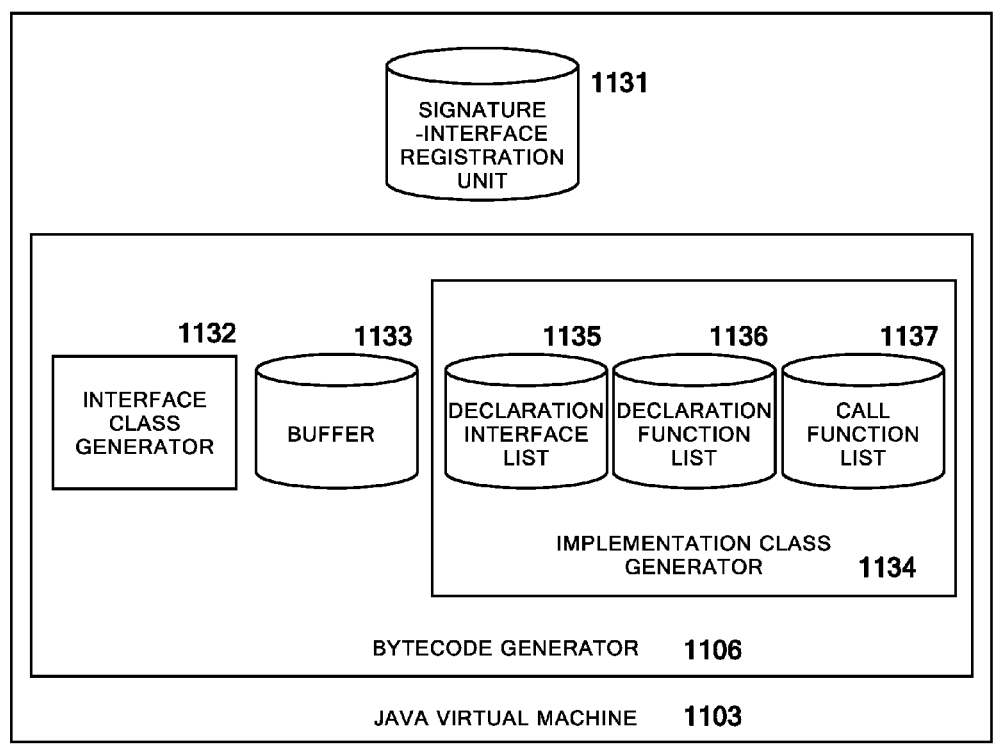
FIG. 11C is a diagram showing the bytecode generator and the signature-interface registration unit, according to an embodiment of the invention.

In step 603, the bytecode generator executes the loading, into a JAVA VM, of a part of the generated bytecode as an implementation class having an interface listed in a declaration interface list (1135 of FIG. 11C). Here, the declaration interface list (1135) is a list of interface class names, and is a list to which an interface class name is added in step 634 of FIG. 6B. Note that, as will be described later, the declaration interface list (1135) is used also in the multiple functions-to-one interface method which is an embodiment of the invention; however, a declaration function list (1136 of FIG. 11C) and a call function list (1137 of FIG. 11C) used in the multiple functions-to-one interface method are not used in the one function-to-one interface method.

Note that, an implementation class is generated and loaded in steps 602 and 603. In these steps, the implementation class is generated when a script file is loaded into a memory and converted into bytecode.

In step 604, a JAVA program execution unit (hereinafter called program execution unit) (1118 of FIG. 11A) executes the generated bytecode. The detailed processes of step 604 will be described later in steps 604-1 to 604-7.

In step 605, the program execution unit (or a PHP runtime helper (1105 of FIG. 11A)) terminates the process of the script.

The detailed processes of step 602 in FIG. 6A are described in accordance with a process flow shown in the middle of FIG. 6A (steps 611 to 619).

In step 611, the bytecode generator starts the process of generating bytecode corresponding to the script (602).

In step 612, the bytecode generator recognizes each command in the PHP script, and iterates a determination process in step 613, or in each of steps 613 and 615 which will be described below.

In step 613, the bytecode generator determines whether or not the recognized command is a function/method call. If the command is a function/method call (YES), the process moves to step 614. On the other hand, if the command is not a function/method call (NO), the process moves to step 615.

In step 614, the bytecode generator executes a process of generating a function/method call. Upon completion of this generation process, the process moves to step 618. The detailed processes of step 614 will be described later in steps 621 to 626.

If determining that the recognized command is not a function/method call, the bytecode generator determines whether or not the command is a function/method declaration in step 615. If the command is a function/method declaration (YES), the process moves to step 616. On the other hand, if the command is not a function/method declaration (NO), the process moves to step 617.

In step 616, the bytecode generator executes a process of generating a function/method declaration. Upon completion of this generation process, the process moves to step 618. The detailed processes of step 616 will be described later in steps 631 to 638.

If determining that the recognized command is neither function/method call nor function/method declaration, the bytecode generator executes a process of generating bytecode corresponding to the command in step 617. The detailed bytecode generation process has no direct relation with an embodiment of the invention, and thus will not be described in detail herein.

In step 618, the bytecode generator determines whether or not there is any command to be processed. If there is any command to be processed, the process returns to step 612 and iterates the above determinations. If there is no more command to be processed, the process moves to step 619.

In step 619, the bytecode generator completes the process of generating bytecode corresponding to the script (611), and the process returns to step 602 from which the flow branches.

The detailed processes of step 604 in FIG. 6A are shown in a process flow on the right-hand side of FIG. 6A (steps 604-1 to 604-7). For the sake of convenience of description, steps 604-1 to 604-7 will be described after a description of FIG. 6B.

FIG. 6B shows detailed flowcharts of the process of generating a function/method call (step 614) and the process of generating a function/method declaration (step 616) which are shown in FIG. 6A.

The detailed processes of step 614 are described in accordance with a process flow shown on the left-hand side of FIG. 6B (steps 621 to 626).

In step 621, the bytecode generator starts the process of generating a function/method call by a caller in source code.

In step 622, the bytecode generator checks whether or not an interface class corresponding to the called function/method has already been generated. Whether or not the interface class has already been generated is determined by using a data structure in which signatures and interface classes are registered. Note that, the data structure is basically the same as that shown in FIG. 7 except that registered interface class names are different from one row to another.

In step 623, if the bytecode generator determines that the interface class corresponding to the called function/method has not been generated yet (NO), the process moves to step 625. On the other hand, the process moves to step 624 if the bytecode generator determines that the interface class corresponding to the called function/method has already been generated (YES).

In step 625, since the interface class corresponding to the called function/method has not been generated yet, the bytecode generator generates the interface class by an appropriate name which is unique so that the interface class can be loaded into the JAVA VM as needed. Here, the interface class is named to be unique by numbering, for example. In this event, a set of the signature of the called function/method and the interface name is registered in the data structure of FIG. 7. Once the loading is completed, the process moves to step 624.

In step 624, the bytecode generator generates code corresponding to a function/method call through the interface class corresponding to the called function/method. The code thus generated is bytecode to be executed in steps 604-1 to 604-7. Once the code corresponding to the function/method call is generated, the process moves to step 626. Note that, step 624 corresponds to the lines H04 and H05 in FIG. 3C, and is executed immediately after the line F03 as a part of the line F02 of FIG. 3A.

In step 626, the bytecode generator completes the process of generating the function/method call (621), and the process returns to step 614 from which the flow branches.

Next, the detailed processes of step 616 are described in accordance with a process flow shown on the right-hand side of FIG. 6B.

In step 631, the bytecode generator starts the process of generating a declaration of a function/method in source code (616).

In step 632, the bytecode generator checks whether or not an interface class corresponding to the declared function/method has already been generated. This check is made on the basis of whether or not there is the signature of the corresponding function in the data structure in FIG. 7 in which signatures and interface classes are registered. Here, a signature is defined for each function in the data structure.

In step 633, if the bytecode generator determines that the interface class corresponding to the declared function/method has not been generated yet (NO), the process moves to step 635. On the other hand, the process moves to step 634 if the bytecode generator determines that the interface class has already been generated (YES).

In step 635, the bytecode generator generates the interface class corresponding to the declared function/method by an appropriate name which is named to be unique (by numbering, for example), and loads the generated interface class. In this event, a set of the signature of the declared function/method and the interface name is registered in the data structure of FIG. 7. Once the loading is completed, the process moves to step 634.

In step 634, the bytecode generator adds the interface name of the generated interface class to the declaration interface list. Here, the declaration interface list indicates a data structure in which the name of a caller interface (interface class name) corresponding to the declared function/method is held in a list format.

In step 636, the bytecode generator generates, in a memory (1101 of FIG. 11A), bytecode corresponding to a script for a process of the declared function/method (i.e., the contents of the function/method). The bytecode thus generated is bytecode to be executed in steps 604-1 to 604-7. The detailed bytecode generation process is equivalent to the recursion of step 611 of FIG. 6A described above.

In step 637, the bytecode generator generates, in the memory (1101), code for associating the generated bytecode with the declared function/method. The code thus generated is bytecode to be executed in steps 604-1 to 604-7. The code generated in step 637 is code to be registered in a symbol table (1109 of FIG. 11A). This code is referenced by, for example, the function lookupFunction( ) shown in the lines H04 and 1105 of FIG. 3C. In other words, the code generated in step 637 is code for associating the implementation of each function in the bytecode generated in step 636 with the name of the function.

In step 638, the bytecode generator completes the process of generating the function/method declaration (631), and the process returns to step 616 from which the flow branches.

The detailed processes of step 604 in FIG. 6A are described in accordance with the process flow on the right-hand side of FIG. 6A (steps 604-1 to 604-7).

In step 604-1, the JAVA program execution unit (hereinafter called program execution unit) starts the execution of the bytecode generated in each of steps 624, 636, and 637 as a part of step 602, and loaded into the JAVA VM in step 603.

In step 604-2, the program execution unit reads each instruction in the generated bytecode.

In step 604-3, the program execution unit determines whether or not the read instruction represents "include" or a process corresponding to "include."

If the read instruction represents "include" or a process corresponding to "include," the program execution unit executes a process for the script in step 604-4.

If the read instruction represents neither "include" nor a process corresponding to "include," the program execution unit executes a process according to other instructions in step 604-5. The process according to other instructions is not the essence of the invention, and thus will not be described herein.

In step 604-6, the process returns to step 604-2 until the reading of all the instructions in the bytecode is completed.

In step 604-7, the execution of the bytecode is completed, and the process returns to step 604 from which the flow branches.

FIGS. 6C, 6D, and 6E show flowcharts of a bytecode generation process according to the multiple functions-to-one interface method (FIGS. 4A to 4D).

The process flow on the left-hand side of FIG. 6C (steps 641 to 646) is a main flow showing the following process. Specifically, the process is to generate bytecode written in JAVA of a statically typed language out of source code written in a dynamically typed language according to the multiple functions-to-one interface method in a state where none of data is cached yet, and to cache the generated bytecode. The bytecode is generated by the bytecode generator (1106) shown in FIG. 11A.

Note that, among steps in FIG. 6C, the steps which are each either different from or added to those in the one function-to-one interface method of FIG. 6A are shown in a hatched manner (steps 643 and 645-2).

In step 641, the bytecode generator starts a process of converting source code written in a dynamically typed language to target code written in a statically typed language. Hereinafter, the description is given by taking a PHP language as an example of a dynamically typed language and a JAVA language as an example of a statically typed language. However, the invention is not limited to these languages. The source code is a script written in a PHP language in the case of a PIP language, and the target code is bytecode in the case of a JAVA language.

In step 642, the bytecode generator generates bytecode from the above script, and stores the generated bytecode into the storage device. The detailed processes of step 642 will be described later in steps 651 to 659, steps 661 to 667, and steps 671 to 678.

In step 643, the bytecode generator executes a process for the buffer. This buffer process is a process of clearing the buffer, only in a case where the generated implementation class includes a declaration of a function corresponding to any one of signatures in the buffer. The declaration function list (1136 of FIG. 11C) and the call function list (1137 of FIG. 11C) are provided for use in this process. In the buffer process, according to conditions, any one of the following three processes is executed with reference to the declaration function list and the call function list. The three processes include: the process where a consolidated interface class is generated from signatures in the buffer (1133 of FIG. 11C), and is loaded (688 of FIG. 6E); the process where an interface class is generated from signatures in the declaration function list (1136), and is loaded (686 of FIG. 6E); and the process where no interface class is generated (path from 682 to 683 of FIG. 6E). The detailed processes of the buffer process will be shown later in steps 681 to 689 below. Step 643 is peculiar to the multiple functions-to-one interface method, and is not provided in the one function-to-one interface method shown in FIG. 6A.

In step 644, the bytecode generator loads, into the JAVA VM, and executes the generated bytecode as a class having an interface listed in the declaration interface list. Here, the declaration interface list includes a list of signatures as similar to the buffer. The declaration interface list is a signature list separately prepared according to the above sentence "if the implementation involves neither the implementation nor use of functions corresponding to signatures in the buffer, a signature list may be separately prepared."

Note that, an implementation class is generated and loaded in steps 642 to 644, and is generated when a script file is loaded into a memory and converted into bytecode. An implementation class is generated for every source code script file.

In step 645, the program execution unit (1118 of FIG. 11A) executes the generated bytecode. The detailed processes of step 645 will be shown later in steps 645-1 to 645-8 below.

In step 646, the program execution unit (or PHP runtime helper (1105 of FIG. 11A)) terminates the process for the script.

The detailed processes of step 642 are described in accordance with a process flow in the middle of FIG. 6C (steps 651 to 659). The process flow (steps 651 to 659) is basically the same as the process flow described in FIG. 6A (steps 611 to 619) except for the detailed processes of the process of generating a function/method call (step 654) and the detailed processes of the process of generating a function/method declaration (step 656).

In step 651, the bytecode generator starts the process of generating bytecode corresponding to the script (642).

In step 652, the bytecode generator recognizes each command in the PHP script, and iterates a determination process in step 653, or in each of steps 653 and 655 which will be described below.

In step 653, the bytecode generator determines whether or not the recognized command is a function/method call. If the command is a function/method call (YES), the process moves to step 654. On the other hand, if the command is not a function/method call (NO), the process moves to step 655.

In step 654, the bytecode generator executes a process of generating a function/method call. Upon completion of this generation process, the process moves to step 658. The detailed processes of step 654 will be described later in steps 661 to 667.

If determining that the recognized command is not a function/method call, the bytecode generator determines whether or not the command is a function/method declaration in step 655. If the command is a function/method declaration (YES), the process moves to step 656. On the other hand, if the command is not a function/method declaration (NO), the process moves to step 657.

In step 656, the bytecode generator executes a process of generating a function/method declaration. Upon completion of this generation process, the process moves to step 658. The detailed processes of step 656 will be described later in steps 671 to 678.

If determining that the recognized command is neither function/method call nor function/method declaration, the bytecode generator executes a process of generating bytecode corresponding to the command in step 657. The detailed bytecode generation process has no direct relation with an embodiment of the invention, and thus will not be described in detail herein.

In step 658, the bytecode generator determines whether or not there is any command to be processed. If there is any command to be processed, the process returns to step 652 and iterates the above determinations. If there is no more process to be processed, the process moves to step 659.

In step 659, the bytecode generator completes the process of generating bytecode corresponding to the script (651), and the process returns to step 642 from which the flow branches.

The detailed processes of step 645 in FIG. 6C are shown in a process flow on the right-hand side of FIG. 6C (steps 645-1 to 645-8). For the sake of convenience of description, steps 645-1 to 645-8 will be described after a description of FIG. 6E.

FIG. 6D shows detailed flowcharts of the process of generating a function/method call (step 654) and the process of generating a function/method declaration (step 656) which are shown in FIG. 6C.

Note that, among steps in FIG. 6D, the steps which are each either different from or added to those in the one function-to-one interface method of FIG. 6B are shown in a hatched manner (steps 665, 666, 672, 673, and 675).

The detailed processes of step 654 are described in accordance with a process flow shown on the left-hand side of FIG. 6D (steps 661 to 667).

In step 661, the bytecode generator starts the process of generating a function/method call by a caller in source code.

In step 662, the bytecode generator checks whether or not an interface class corresponding to the called function/method has already been generated. Whether or not the interface class has already been generated is determined by using the data structure in FIG. 7 in which signatures and interface classes are registered.

In step 663, if the bytecode generator determines that the interface class corresponding to the called function/method has not been generated yet (NO), the process moves to step 665. On the other hand, the process moves to step 664 if the bytecode generator determines that the interface class corresponding to the called function/method has already been generated (YES).

In step 665, the bytecode generator adds the signature of the called function/method to the call function list (1137 of FIG. 11C). Here, the call function list indicates a data structure in which the signature of a function which appears in a caller (which is to be called) is held in a list format. The call function list (1137) is implemented as a part of the bytecode generator.

In step 666, the bytecode generator generates code corresponding to a function/method call for a target object typed with a not-yet-generated interface class, with a name associated with the buffer. The generation of the code corresponding to the function/method call uses the name of the interface class only, and thus the interface class does not need to actually exist at this point. An actual consolidated interface class is generated from all signatures stored in the buffer at a timing when the class loader (1107 of FIG. 11A) solves symbol names of an interface and the like during the execution of the code. Once the code corresponding to the function/method call is generated, the process moves to step 667.

In step 664, the bytecode generator generates code corresponding to a function/method call made through the interface class corresponding to the called function/method. The code thus generated is bytecode to be executed in steps 645-1 to 645-8. Once the code corresponding to the function/method call is generated, the process moves to step 667. Note that, the code generated in step 664 corresponds to the lines L04 and L05 in FIG. 4C, and is executed in parallel with or before/after the line J03 as a part of the line J02 of FIG. 4A.

In step 667, the bytecode generator completes the process of generating the function/method call (661), and the process returns to step 654 from which the flow branches.

The detailed processes of step 656 in FIG. 6C are described in accordance with a process flow shown on the right-hand side of FIG. 6D.

In step 671, the bytecode generator starts the process of generating a declaration of a function/method in source code (656).

In step 672, the bytecode generator checks whether the signature of the declared function/method is in the buffer, and whether an interface class corresponding to the declared function/method has already been generated. The check on whether or not the interface class has already been generated is made on the basis of whether or not there is the signature of the corresponding function in the data structure in FIG. 7 in which signatures and interface classes are registered. Here, a signature is defined for every function in the data structure.

In step 673, if the bytecode generator determines that the signature has not appeared yet, that is, determines that the signature of the declared function/method is not in the buffer and that the interface class corresponding to the declared function/method has not been generated yet (NO), the process moves to step 675. On the other hand, the process moves to step 674 if the bytecode generator determines that the signature has appeared already, that is, determines that the signature is in the buffer or that the interface class has been generated already (YES).

In step 675, the bytecode generator adds the signature of the declared function/method to the declaration function list. Upon completion of this addition, the process moves to step 676.

In step 674, the bytecode generator adds the corresponding interface class name to the declaration interface list (1135 of FIG. 11C). The corresponding interface class name is obtained from the name associated with the buffer (when the signature is in the buffer), or from the interface class name obtained by referring to the correspondence table in FIG. 7 (when the interface class has already been generated). Here, the declaration interface list (1135) indicates a data structure in which the name of a caller interface class corresponding to the declared function/method is held in a list format.

In step 676, the bytecode generator generates, in the memory (1101 of FIG. 11A), bytecode corresponding to a script for a process of the declared function/method (i.e., the contents of the function/method). The bytecode thus generated is bytecode to be executed in steps 645-1 to 645-8. The detailed bytecode generation process is equivalent to the recursion of step 651 of FIG. 6C described above (the generation of bytecode corresponding to the script).

In step 677, the bytecode generator generates, in the memory (1101), code for associating the generated bytecode with the declared function/method. The code thus generated is bytecode to be executed in steps 645-1 to 645-8. The code generated in step 677 is code to be registered in the symbol table (1109 of FIG. 11A). This code is referenced by, for example, the function lookupFunction( ) shown in the lines L04 and L05 of FIG. 4C. In other words, the code generated in step 677 is code for associating the implementation of each function in the bytecode generated in step 676 with the name of the function.

In step 678, the bytecode generator completes the process of generating the function/method declaration (671), and the process returns to step 656 from which the flow branches.

FIG. 6E shows a detailed flowchart of the buffer process in step 643 of FIG. 6C.

In step 681, the bytecode generator starts the buffer process.

In step 682, the bytecode generator determines whether or not the declaration function list is empty.

The process moves to step 683 if the declaration function list is empty. On the other hand, the process moves to step 684 if the declaration function list is not empty.

In step 683, the bytecode generator adds, to the buffer, a signature included in the call function list, and preferably, the signature of a function/method which appears in another compilation unit obtained by static parsing such as an include process. Once the addition of the signature is over, the process moves to step 689 without clearing the buffer (while keeping the buffer as is).

If the declaration function list is not empty, the process moves to step 684.

In step 684, the bytecode generator checks whether or not an interface class name associated with the buffer exists in the declaration interface list.

The process moves to step 686 if no interface class name associated with the buffer exists in step 685. On the other hand, the process moves to step 687 if an interface class name associated with the buffer exists in step 685.

If determining that no interface class name associated with the buffer exists, the bytecode generator generates, from signatures in the declaration function list, an interface class which is different from an interface class generated from signatures in the buffer and independent of the buffer, and loads the generated interface class in step 686. The process of generating and loading an interface class independent of the buffer is an optional step; however, it is often preferable to include this step since a less number of dummies needs to be implemented with a consolidated interface class having signatures of a set of functions/methods which is the same as the declared set of functions/methods. For this reason, a consolidated interface class consisting only of signatures of declared functions/methods is generated separately from the consolidated interface class generated from signatures in the buffer, only in a case where the signatures in the buffer can be kept as is. When a consolidated interface class independent of the buffer is generated, a set of each of the signatures and the name of the consolidated interface class generated independent of the buffer is registered in the data structure in FIG. 7.

Moreover, the name of the loaded consolidated interface class independent of the buffer is added to the declaration interface list. Once the addition is over, the process moves to step 683.

If determining that an interface class name associated with the buffer exists, the bytecode generator adds signatures in the declaration function list and the call function list to the buffer in step 687.

In step 688, the bytecode generator generates one consolidated interface class from signatures in the buffer, and loads the generated interface class. Here, the buffer stores therein signatures of respective caller functions/methods which appear in one script tile unit. When the consolidated interface class is generated, a set of each of the signatures and the name of the consolidated interface class is registered in the data structure in FIG. 7. Moreover, the name of the loaded consolidated interface class is added to the declaration interface list. The bytecode generator clears the buffer after generating the consolidated interface class. In other words, the bytecode generator deletes the signatures in the buffer. Once the clearing operation is over, the process moves to step 689. Note that, in the buffer operation, the process sometimes passes through step 688, which is a step of generating a consolidated interface class from signatures in the buffer, without passing through step 686.

In step 689, the bytecode generator completes the buffer process (681), and the process returns to step 643 (FIG. 6C) from which the flow branches.

The detailed processes of step 645 in FIG. 6C are described in accordance with the process flow on the right-hand side of FIG. 6C (steps 645-1 to 645-8).

In step 645-1, the JAVA program execution unit (hereinafter called program execution unit) (1118 of FIG. 11A) starts the execution of the bytecode generated in each of steps 664, 676, and 677.

In step 645-2, the program execution unit generates a not-yet-loaded consolidated interface class, and loads the consolidated interface class thus generated. The detailed processes of step 645-2 will be shown later in steps 691 to 694 below.

In step 645-3, the program execution unit reads each instruction in the generated bytecode.

In step 645-4, the program execution unit determines whether or not the read instruction represents "include" or a process corresponding to "include."

If the read instruction represents "include" or a process corresponding to "include," the program execution unit executes a process for the script in step 645-5. The execution of the process for the script means returning to the process for the script which is described in step 641.

If the read instruction represents neither "include" nor a process corresponding to "include," the program execution unit executes a process according to other instructions in step 645-6. The process according to other instructions is not the essence of the invention, and thus will not be described herein.

In step 645-7, the process returns to step 645-3 until the reading of all the instructions in the bytecode is completed.

In step 645-8, the execution of the bytecode is completed, and the process returns to step 645 from which the flow branches.

Figure 6F:
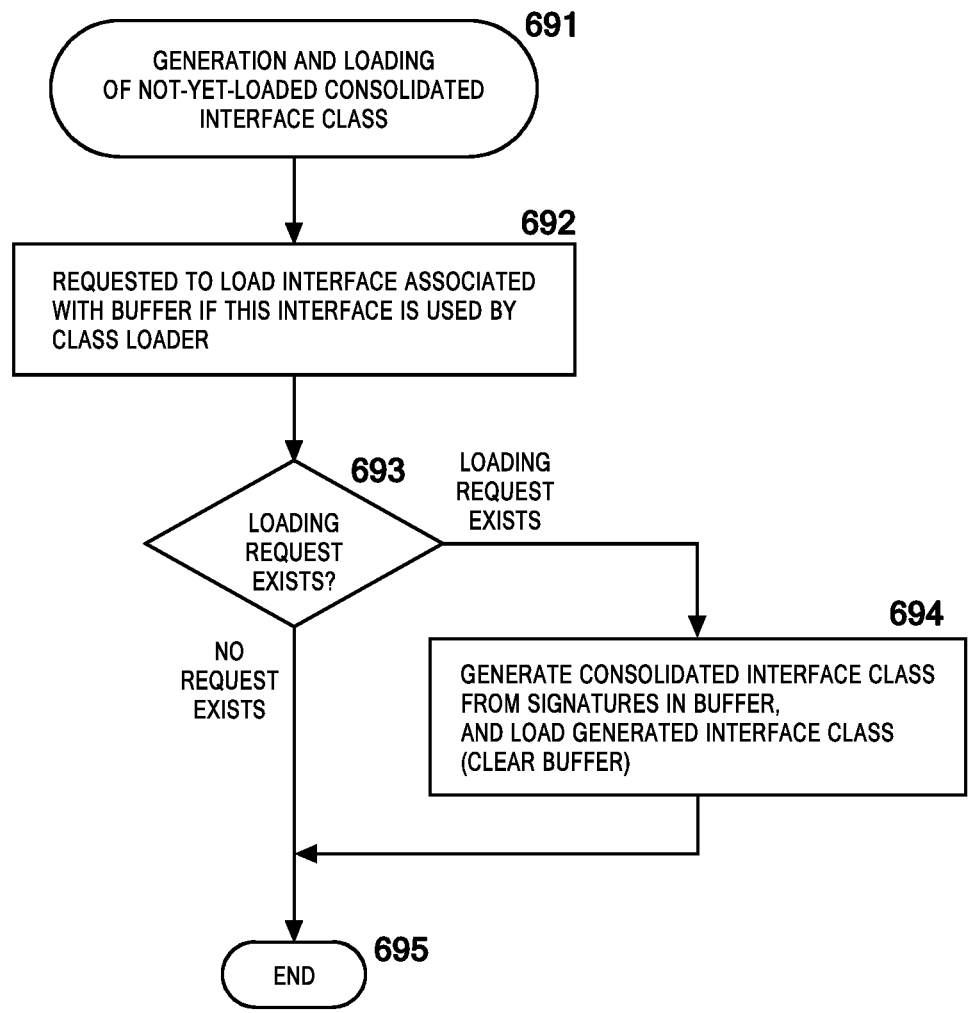
FIG. 6F shows a detailed process flow for the generation and loading of a not-yet-loaded consolidated interface class, which is described in step 645-2 of FIG. 6C.

FIG. 6F shows a detailed process flow for the generation and loading of a not-yet-loaded consolidated interface class, which is described in step 645-2 of FIG. 6C.

In step 691, the generation and loading of a not-yet-loaded consolidated interface class are started.

In step 692, an interface class generator (1132 of FIG. 11C) is requested to load a consolidated interface class for all the signatures in the buffer if the consolidated interface class is used by the class loader.

In step 693, the process moves to step 694 if the interface class generator is requested to perform the loading operation. On the other hand, the process moves to step 695 if the interface class generator is not requested to perform the loading operation.

In step 694, upon loading request, the interface class generator generates one consolidated interface class from all the signatures in the buffer, and loads the generated interface class. The interface class generator clears the buffer after generating the interface class. In other words, the interface class generator deletes the signatures in the buffer. Once the clearing operation is over, the process moves to step 695.

In step 695, the interface class generator completes the generation and loading of a not-yet-loaded consolidated interface class, and the process returns to step 645-2 from which the flow branches.

A description is given below of an example where the process flows according to an embodiment of the invention (steps 641 to 695) are applied to the source code written in a PHP language shown in FIG. 1A.

Assume that the process starts from the script file start.php (101).

First, the "process for the script" (641) is performed for the script file start.php (101). Then, during the process (645) of executing the script file start.php (101), the "process for the script" (645-5) is performed for the file func.php.

A. The Process for the Script File start.php (101)

An implementation class required for executing the script file start.php (101) is generated in bytecode (step 642). The bytecode thus generated is as shown in FIG. 4C, for example.

No function is declared in the script file start.php (101). Hence, in the implementation class Bytecode_start_php (421) corresponding to the file start.php (101), there is no declaration for the implementation of any interface class except for the interface PHPScript which is used for the execution of the script itself. In the implementation class Bytecode_start_php (421) which is a caller, code corresponding to a call for a consolidated interface class is written by using an interface class name Callsite_start_php. The consolidated interface class name Callsite_start_php is named at random, and is also the name of the consolidated interface class to include methods corresponding to signatures currently stored in the buffer. At this phase, the above consolidated interface class itself is neither generated nor loaded. Instead, "foo(0)" and "bar(1)," which are signatures of functions/methods, are stored in the buffer for signatures. Here, in the description of an embodiment, the name of and the number of arguments of a function/method are only used for a signature for the sake of simplicity.

B. The Execution of the File start.php

The script file start.php is executed by calling the method executeScript( ) in the generated and loaded implementation class Bytecode_start_php (421 of FIG. 4C) corresponding to the file start.php (step 645). This execution of the script file start.php leads to the execution of the script file funcs.php (102 of FIG. 1A) because the auxiliary function includeScript( ) (L03 of FIG. 4C) corresponding to the function "include" in the original file is called by this execution of the script file start.php, and the argument passed by this function is "funcs.php." Since an implementation class corresponding to the file funcs.php (102) has neither been generated nor loaded, the process for the script file funcs.php (102) is required.

C. The Process for the Script File funcs.php

The process of generating bytecode corresponding to the script file funcs.php (102) is executed in order to generate and load an implementation class required for executing this script file (step 642). The bytecode obtained by this process is as shown in FIG. 4D (422). Since there is no declaration, in the file funcs.php (102), of a function whose signature has not appeared yet, no more signatures is newly added to the buffer. Functions are declared in the file funcs.php (102), and signatures corresponding to the functions are still in the buffer. Thus, the declaration is executed so that the implementation class may implement the interface class Callsite_start_php corresponding to these functions.

Figures 7, 8A:
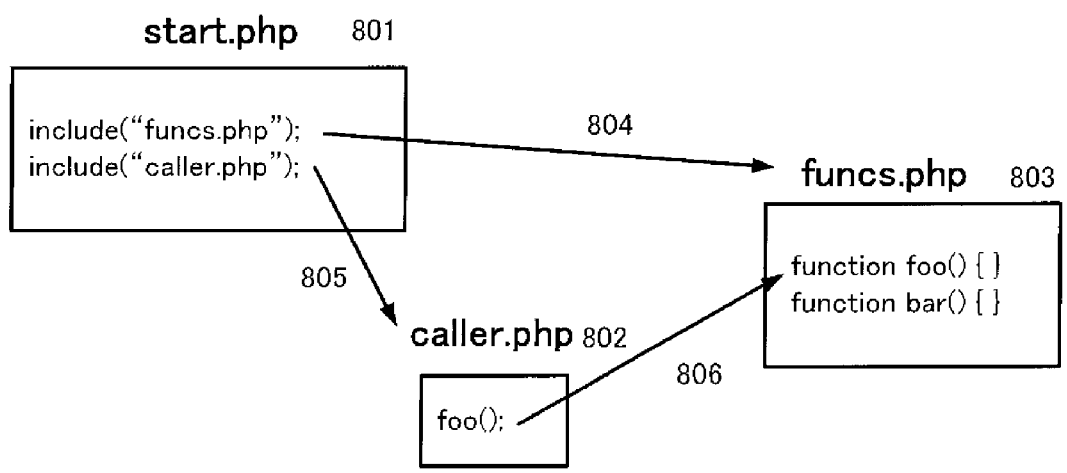
FIG. 7 shows a data structure in which signatures and interface classes are registered, according to an embodiment of the invention.
FIG. 8A shows an example where there are three PHP source code files (start.php, caller.php, and funcs.php) which are written in a PHP language and can be a target for conversion, and where a function/method declaration is performed before a function/method call is performed.

FIG. 7 shows a data structure in which signatures and interface classes are registered, according to an embodiment of the invention.

A table (701) is a data structure for registering PHP functions/methods as loaded functions/methods. The data structure is stored in a signature-interface registration unit (1131 of FIG. 11C). The table (701) includes signatures of PHP functions/methods and respective sets of a JAVA method and signature. Each set includes the name of an interface class that the corresponding method belongs and the signature of the corresponding method. Note that, in an embodiment of the invention, source code is written in a dynamically typed language in which variables and the like are not previously typed. Hence, only the name of and the number of arguments of a function are required for the signature of the function.

Data which needs to be stored in the buffer in step 683 of FIG. 6E is any one of the signature of a PHP function/method, and the JAVA method and signature corresponding to the function/method. This is because the use of the data structure allows searching for a JAVA method and signature by using the signature of a PHP function/method corresponding thereto, and searching for the signature of a PHP function/method by using the JAVA method and signature corresponding thereto.

Figure 8B:
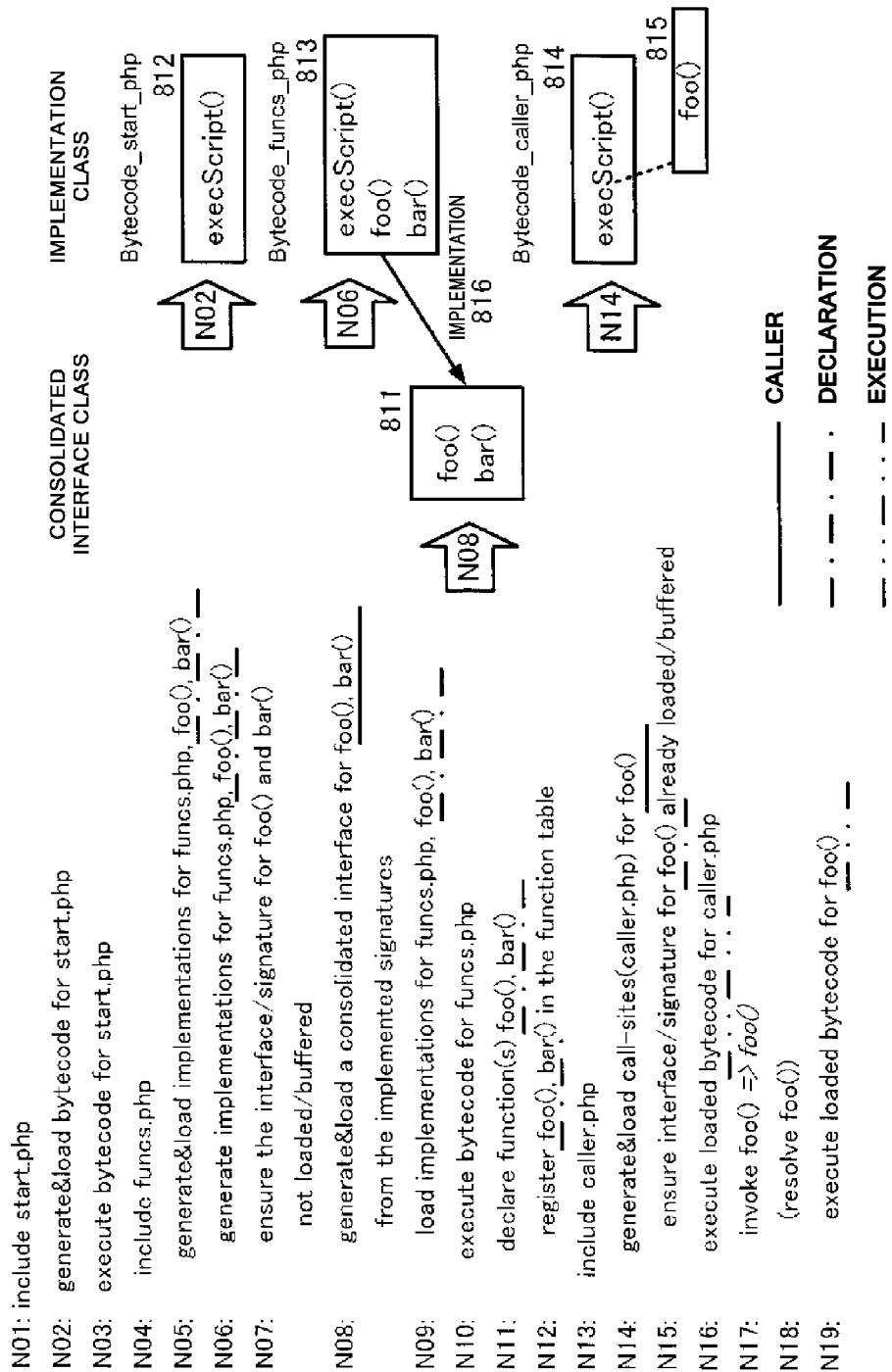
FIG. 8B shows implementation classes and an interface class generated from the source code shown in FIG. 8A through the multiple functions-to-one interface method, and steps of converting the source code into target code and executing the target code.

FIGS. 8A and 8B show an example where a function/method declaration is made prior to a function/method call.

FIG. 8A shows an example where there are three PHP source code files (start.php, caller.php, and funcs.php) which are written in a PHP language and can be source code to be converted, and where a process of a function/method declaration (funcs.php) is performed before a process of a function/method call (caller.php) is performed.

The PHP source code files include three source code files, i.e., start.php (801). funcs.php (803), and caller.php (802).

The relation among the three files is as follows. Specifically, an inclusion command include ("funcs.php") in the file start.php (801) specifies the file funcs.php (803) as a file to be included by the file start.php (801) (arrow 804). Further, an inclusion command include ("caller.php") in the file start.php (801) specifies the file caller.php (802) as a file to be included by the file start.php (801) (arrow 805). Furthermore, a function/method foo( ) in the file caller.php (802) corresponds to a declaration and definition function foo( ){ } in the file funcs.php (803) (arrow 806).

In another mode of an embodiment of the invention, unlike that described in FIGS. 4A to 4D, a process for a function/method declaration in the file funcs.php (803) is executed earlier than a process of the PHP function call file caller.php (802), i.e., than the generation of an interface class for a call for a function foo( ). In a case where the process of the declaration file funcs.php (803) is executed earlier than the process of the function call file caller.php (802), a consolidated interface class is generated and loaded at a time point where the file funcs.php (803) is executed, the consolidated interface class having functions which correspond to PHP functions and whose signatures are pooled in the buffer as of this time point and functions corresponding to the declared PHP functions. Then, a JAVA class for implementation of the declaration file (funcs.php) is generated and loaded in such a way as to implement (implements) this consolidated interface class. In this way, as shown in FIG. 8B, methods corresponding to multiple functions are consolidated into one consolidated interface class even in a case where code including a PHP function declaration is executed earlier.

FIG. 8B shows implementation classes and an interface class generated from the source code in FIG. 8A through the multiple functions-to-one interface method, and steps of converting the source code into target code and executing the target code.

In FIG. 8B, the left-hand side shows the steps of conversion and execution (N01 to N19). The right-hand side shows implementation classes (812, 813, and 814) and a consolidated interface class (811) generated through the multiple functions-to-one interface method. As shown in FIG. 8B, in the multiple functions-to-one interface method, the one consolidated interface class (811) is prepared for the caller of multiple functions/methods, and the implementation class (813) is generated to correspond to the consolidated interface class (811). The right-hand side also shows how the implementation class (814) calls, as its implementation contents, a function foo( ) through the consolidated interface class (811) (815). The numbers (N02, N06, N08, and N14) in arrows given on the left-hand side of the implementation classes (812, 813, and 814) and consolidated interface class (811) correspond respectively to the step numbers of the above steps.

Hereinafter, the steps of conversion and execution shown in FIG. 8B are described.

In line 1 (N01), a command include to include the script file start.php (801 in FIG. 8A) which is a PHP source code file is directed. The steps in lines 2 to 19 (N02 to N19) are executed as sub-steps of N01.

In line 2 (N02), the implementation class (812) corresponding to the PHP script file start.php (801 of FIG. 8A) is generated and loaded. The arrow (N02) indicates the generation of the implementation class (812).

In line 3 (N03), bytecode for the loaded implementation class (812) is executed.

In line 4 (N04), the file funcs.php is included by the execution of the implementation class (812), the inclusion of the file funcs.php being directed by a part of the bytecode corresponding to a first command include in the script file start.php (801 of FIG. 8A). At this point, the implementation class Bytecode_start_php (812) corresponding to the file start.php (801), which is being executed, is suspended, and the process moves to the generation and loading of the implementation class Bytecode_funcs_php (813) corresponding to the newly included PHP file funcs.php (803).

In lines 5 (N05) to 9 (N09), the implementation class Bytecode_funcs_php (813) corresponding to the file funcs.php (803) is generated and loaded.

In line 6 (N06), the implementation class Bytecode_funcs_php (813) corresponding to the file funcs.php (803) is generated. The arrow (N06) indicates the generation of the implementation class Bytecode_funcs_php (813). At this phase, a consolidated interface class has not been generated yet, and thus the implementation class Bytecode_funcs_php (813) is not loaded.

In line 7 (N07), it is checked whether there is an interface class or signature corresponding to calls for the functions foo( ) and bar( ) which have neither been loaded nor buffered.

In line 8 (N08), one consolidated interface class (811) is generated by using signatures of the respective declared functions foo( ) and bar( ). The arrow (N08) indicates the generation of the consolidated interface class (811). In this mode of the embodiment, the process of the declaration file funcs.php (803 of FIG. 8A) is executed earlier than the process of the function call file caller.php (802 of FIG. 8A). Thus, one consolidated interface class (811) is generated and loaded from the signature of a caller function pooled in the buffer as of this time point (0 signature in this mode of the embodiment) and signatures of the respective declared functions.

In line 9 (N09), the implementation class (813) which is generated in step (N06) and corresponds to the file funcs.php is loaded. Here, the functions defined in the interface class (811) have already been implemented (816) in the implementation class (813), as can be understood from the method of generating the interface class (811) described in step (N08). In this way, in a case where code including a PHP function declaration is executed earlier, one consolidated interface class corresponding to multiple function/method calls is generated by use of the declared PHP function and of a PHP function corresponding to a signature pooled in the buffer as of a time point of generation and loading of an implementation class corresponding to a script file in which a PHP function is declared. At this time, the PHP functions are preferably brought together selectively on the basis of presence or absence of duplication.

In line 10 (N10), the implementation class (813) corresponding to the file funcs.php is executed.

In line 11 (N11), functions foo( ) and bar( ) are declared with the execution of the implementation class (813). This step is basically the same as step J11 of FIG. 4A, for example.

In line 12 (N12), entities of the functions foo( ) and bar( ) are registered in a function table, which is basically the same as step J12 of FIG. 4A.

In line 13 (N13), the control returns to the implementation class (812) corresponding to the script file start.php (801 of FIG. 8A), and the file caller.php (802 of FIG. 8A) directed by a second inclusion command include is included.

In line 14 (N14), a function of the implementation class (814) corresponding to the file caller.php (802 of FIG. 8A) is generated and loaded. The arrow (N14) indicates the generation of the function of the implementation class (814).

In line 15 (N15), it is checked whether an interface class for the caller function foo( ) has already been loaded, and whether the signature of the caller function foo( ) is stored in the buffer.

In line 16 (N16), the implementation class (814) corresponding to the file caller.php is executed.

In line 17 (N17), a call (invoke) of the function foo( ) is executed in bytecode with the execution of step (N16).

In line 18 (N18), the function table is searched by the called function name foo, and the corresponding instance is thus found.

In line 19 (N19), the function foo( ) is executed by calling and executing a method foo( ) (corresponding to the function foo( ) included in the found instance. In this event, the instance is cast so as to have its type adaptable to the type defined in the consolidated interface class (811).

In the example shown in FIG. 8B, the functions in only one script file (funcs.php) are consolidated into one consolidated interface class. However, in a case where another function is also called in the file funcs.php for example, such a called function as well as the above functions are altogether consolidated into the single consolidated interlace class. Note here that if there is neither function declaration nor call for a new function/method in a script which is being compiled, no interface class is generated at this time since not needed. An interface class is to be generated when a function declaration or a call for a new function/method is found in a script to be compiled.

Figure 9A:
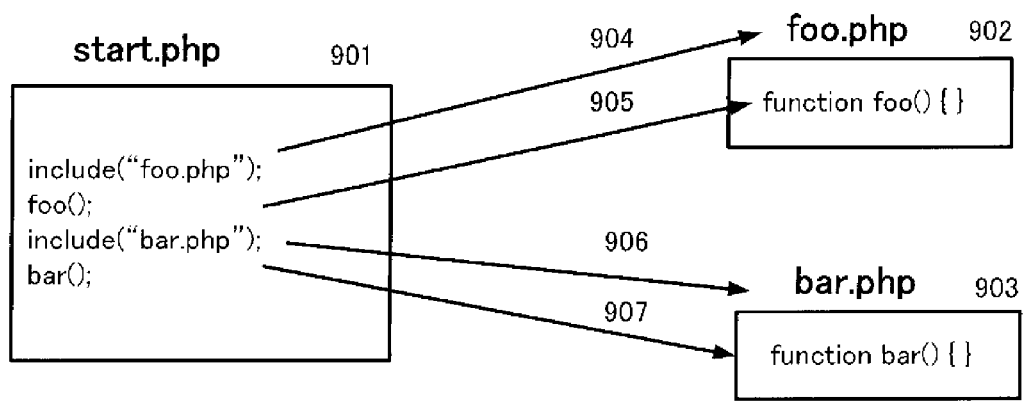
FIG. 9A shows an example where there are three PHP source code files (start.php, foo.php, and bar.php) which are written in a PHP language and can be source code to be converted, and where a not-yet-defined function appears.
Figure 9B:
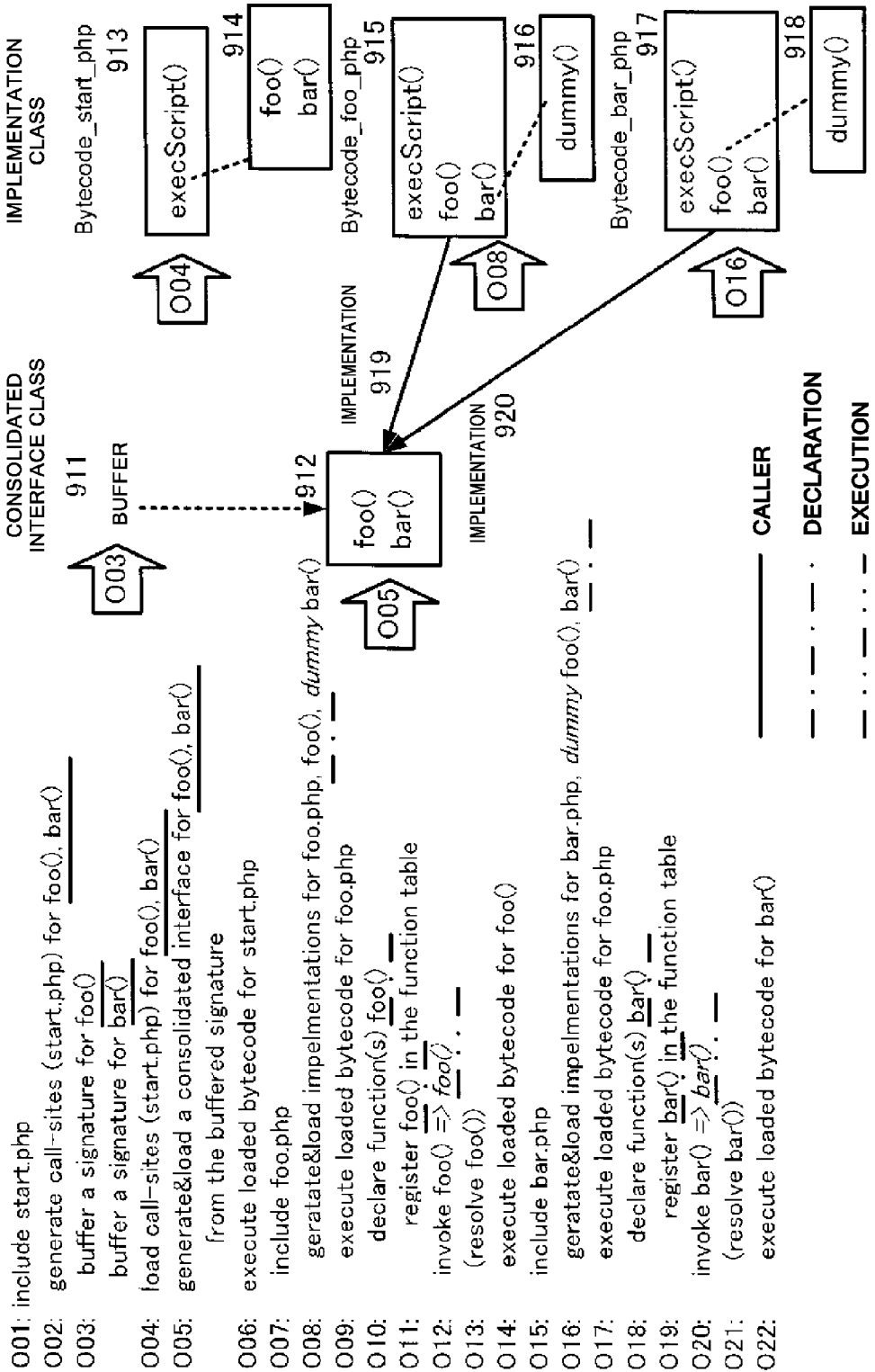
FIG. 9B shows implementation classes and an interface class generated from the source code in FIG. 9A through the multiple functions-to-one interface method, and steps of converting the source code into target code and executing the target code.

FIGS. 9A and 9B show an example where functions in a certain interface class are not covered by a PHP function declared in a certain script.

FIG. 9A shows an example where there are three PHP source code files (start.php, foo.php, and bar.php) which are written in a PHP language which can be source code to be converted, and where a not-yet-defined function appears.

The PHP source code files include three source code files, i.e., script files of start.php (901), foo.php (902), and bar.php (903).

The relation among the three files is as follows. Specifically, an inclusion command include ("foo.php") in the file start.php (901) specifies the file foo.php (902) as a file to be included by the file start.php (901) (arrow 904). In addition, an inclusion command include ("bar.php") in the file start.php (901) specifies the file bar.php (903) as a file to be included by the file start.php (901) (arrow 906). Further, a caller function/method foo( ) in the file start.php (901) corresponds to a declaration and definition function foo( ){ } in the file foo.php (902) (arrow 905). Furthermore, a function/method bar( ) in the file start.php (901) corresponds to a declaration and definition function bar( ){ } in the file bar.php (903) (arrow 907).

In an embodiment of the invention, interfaces are speculatively brought together to generate an interface class. For this reason, both of the functions foo( ) and bar( ) are defined in an interface class which is generated to correspond to calls for the functions foo( ) and bar( ) in the file start.php (901) as shown in FIG. 9A, for example. On the other hand, a case is observed in which: a declaration for the function boo( ) exists but no declaration for the function bar( ) exists in the included file foo.php (902), for example; and a declaration for the function bar( ) exists but no declaration for the function foo( ) exists in the included file bar.php (903), for example. To cope with such a case, this embodiment causes an implementation class for each script file to have a dummy implementation, with almost no contents, of a non-declared function. In this way, in this embodiment, an interface class, which includes the signature of a function/method included in an implementation class of a certain compilation unit, declares functions/methods including the above function/method on the assumption that the implementation class implements all the functions/methods, and a dummy implementation of the function/method having a signature and not being implemented in the original compilation unit, is prepared in the implementation class.

FIG. 9B shows implementation classes and an interface class generated from the source code in FIG. 9A through the multiple functions-to-one interface method, and steps of converting the source code into target code and executing the target code.

In FIG. 9B, the left-hand side shows the steps of conversion and execution (O01 to O22). The right-hand side shows implementation classes (913, 915, and 917) and a consolidated interface class (912) generated through the multiple functions-to-one interface method. As shown in FIG. 9B, in the multiple functions-to-one interface method, the one consolidated interface class (912) is prepared for the caller of multiple functions/methods, and the implementation classes (915 and 917) are generated to correspond to the consolidated interface class (912). The right-hand side also shows how the implementation class (913) calls, as its implementation contents, functions foo( ) and bar( ) through the interface class (914). Likewise, the right-hand side also shows how the implementation class (915) calls, as its implementation contents, a function dummy( ) through the interface class (916). The right-hand side also shows how the implementation class (917) calls, as its implementation contents, a function dummy( ) through the interface class (918). The numbers (O03, O04, O05, O08, and O16) in arrows given on the left-hand side of the implementation classes (913, 915, and 917), the consolidated interface class (912), and the buffer correspond respectively to the step numbers of the above steps.

Hereinafter, the steps of conversion and execution shown in FIG. 9B are described.

In line 1 (O01), a command include to include the script file start.php (901) which is a PHP source code file is directed. The steps in lines 2 to 22 (O02 to O22) are executed as sub-steps of O01.

In line 2 (O02), the generation of an implementation class corresponding to a caller of the functions foo( ) and bar( ) in the PHP file start.php (901 in FIG. 9A) is directed. According to the directions, the implementation class Bytecode_start_php (913) corresponding to the file start.php (901 in FIG. 9A) is generated, as shown by the arrow (O04).

In line 3 (O03), the storing in the buffer (911) of signatures of the respective called functions foo( ) and bar( ) is directed. According to the directions, the signatures thereof are stored in the buffer (911), as shown by the arrow (O03).

In line 4 (O04), the implementation class Bytecode_start_php (913) is loaded into a JAVA VM.

In line 5 (O05), the taking out of the buffer (911) of the signatures of the respective called functions foo( ) and bar( ) and the generation and loading of the consolidated interface class (912) are directed. According to the directions, the consolidated interface class (912) is generated as shown by the arrow (O05).

In this way, the loading of the class (interface) is requested, through the class loader (1107 of FIG. 11A), not at a timing when implementation code for a caller is generated (in line 2 (O02)) but at a timing when the implementation code is loaded (in line 4 (O04)) or, more preferably, executed. Thus, it is not till the timing when the implementation code is loaded or executed that the interface class is generated and loaded, the interface class including all methods corresponding to the signatures pooled in the buffer as of this time point. If the interface class already exists, the loading thereof is simply performed.

In line 6 (O06), the execution of the caller implementation class (913) thus loaded is directed.

In line 7 (O07), the execution of an inclusion command include is directed with the execution of the implementation class (913), and thus the specified file foo.php (902 of FIG. 9A) is included.

In line 8 (O08), the generation and loading of bytecode for the implementation class (915) corresponding to the included file foo.php (902 of FIG. 9A) are directed. According to the directions, the implementation class (915) corresponding to the file foo.php (902) is generated and loaded, as shown by the arrow (O08). The implementation class (915) needs to be generated while implementing the consolidated interface class (912) (implementation 919). The reason is that, according to the JAVA rule, the functions foo( ) and bar( ) defined in the consolidated interface class (912) must be implemented in the implementation class (915). However, only the function foo( ) is declared and the function bar( ) is not declared in the file foo.php (902) corresponding to the implementation class (915). To deal with this problem, this embodiment causes the implementation class (915) to have a function dummy( ) (916) which is a dummy implementation, with almost no contents, of a function bar( ).

In line 9 (O09), the execution of the implementation class (915) corresponding to the file foo.php is directed.

In line 10 (O10), a function declaration command declareFunction is executed with the execution of the implementation class (915). By the execution of the function declaration command declareFunction, an instance for executing a call for the function foo( ) is created by the implementation class itself.

In line 11 (O11), the created instance and a function name foo of the called function foo( ) are registered in association with each other in a function table. This registration is made in order to search, upon function call, the function table for the corresponding instance, and to process the function call by use of methods foo( ) and bar( ) included in the instance thus searched out. With the above processes, the execution of the implementation class (915) ends, and the control returns to the implementation class (913).

In line 12 (O12), a call for the function foo( ) (invoke foo( ) is executed with the execution of the implementation class (913).

In line 13 (O13), with the execution of the above call, the function table is searched by the called function name foo, and the corresponding instance is thus found.

In line 14 (O14), a method foo( ) (corresponding to the function foo( ) included in the found instance is called and executed.

In line 15 (O15), a command include to include the script file bar.php (903 of FIG. 9A) is executed upon completion of the above execution.

In line 16 (O16), the generation and loading of bytecode for the implementation class (917) corresponding to the included file bar.php (903 of FIG. 9A) are directed. According to the directions, the implementation class (917) corresponding to the file bar.php (903) is generated and loaded, as shown by the arrow (O16). The implementation class (917) needs to be generated while implementing the consolidated interface class (912) (implementation 920). The reason is that, according to the JAVA rule, the functions foo( ) and bar( ) defined in the consolidated interface class (912) must be implemented in the implementation class (917). However, only the function bar( ) is declared and the function foo( ) is not declared in the file bar.php (903) corresponding to the implementation class (917). To deal with this problem, this embodiment causes the implementation class (917) to have a function dummy( ) (918) which is a dummy implementation, with almost no contents, of a function foo( ).

In line 17 (O17), the execution of the implementation class (917) corresponding to the file bar.php is directed.

In line 18 (O18), a function declaration command declareFunction is executed with the execution of the implementation class (917). By the execution of the function declaration command declareFunction, an instance for executing a call for the function bar( ) is created by the implementation class itself.

In line 19 (O19), the created instance and a function name bar for the called function bar( ) are registered in association with each other in the function table. This registration is made in order to search, upon function call, the function table for the corresponding instance, and to process the function call by use of methods foo( ) and bar( ) included in the instance thus searched out. With the above processes, the execution of the implementation class (917) ends, and the control returns to the implementation class (913).

In line 20 (O20), a call for the function bar( ) (invoke bar( )) is executed with the execution of the implementation class (913).

In line 21 (O21), with the execution of the above call, the function table is searched by the called function name bar, and the corresponding instance is thus found.

In line 22 (O22), a method bar( ) (corresponding to the function bar( )) included in the found instance is called and executed.

With the above processes, the steps of converting a PHP script into JAVA bytecode and executing the bytecode end.

FIGS. 10A to 10E show an example of effects seen from reduction in the number of interface classes in a CRM (Customer Relationship Management) application.

This example shows how JAVA bytecode is generated from code excerpted from the actual PHP application, by employing both the existing technique and the technique according to an embodiment of the invention.

FIG. 10A shows an example of multiple PHP source code files excerpted from the CRM (Customer Relationship Management) application.

The PHP source code files include the following files: index.php (1001); entryPoint.php (1002); utils.php (1003); Application.php (1004); Controller.php (1005); ControllerFactory.php (1006); and Employees/Controller.php (1007).

Figure 10B:
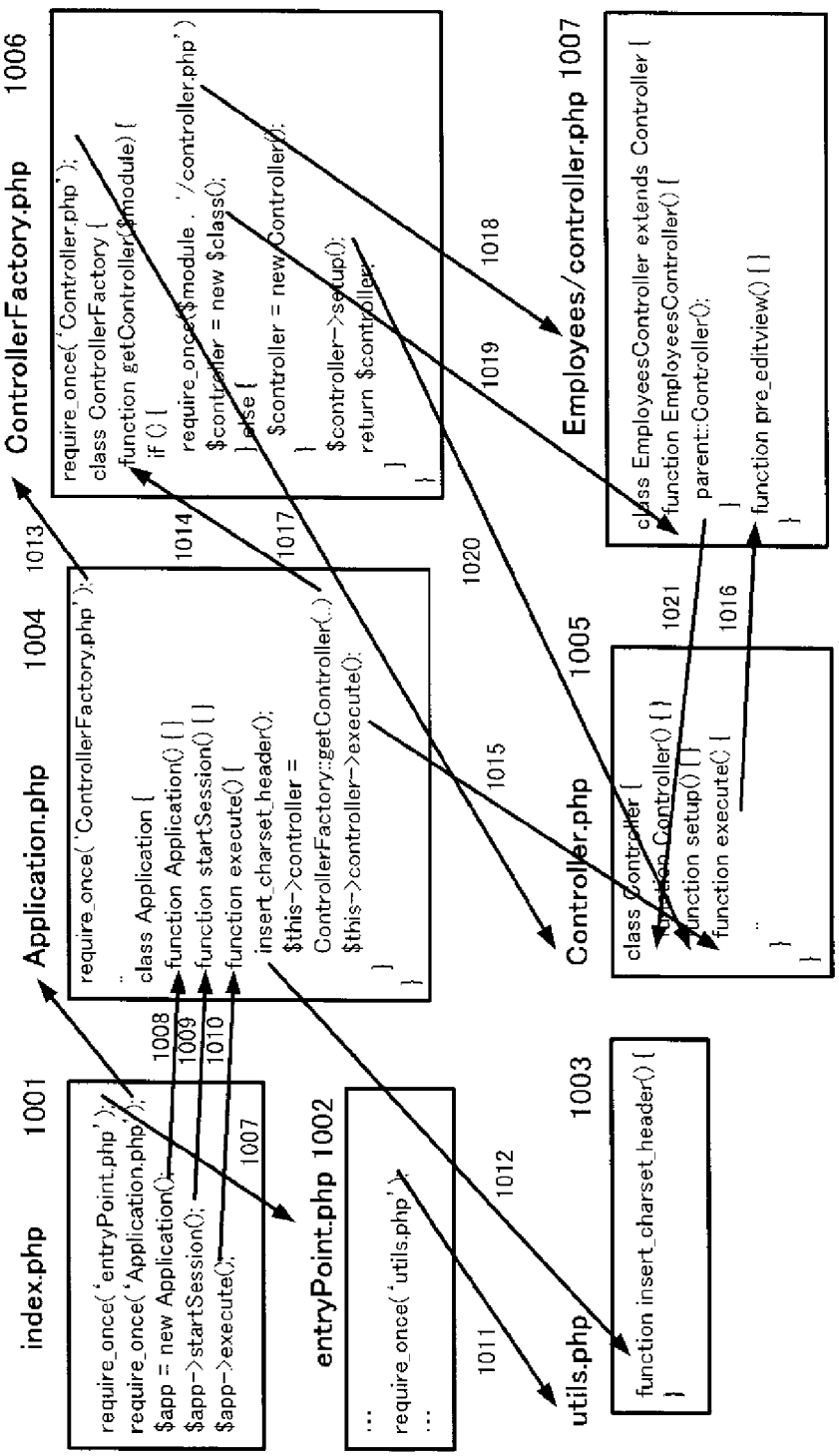
FIG. 10B shows a relation between a caller and callee of each function/method and a relation between each file inclusion command and the file specified by the command, in the PHP source code files shown in FIG. 10A.

FIG. 10B shows a relation between a caller and callee of each function/method and a relation between each file inclusion command and the file specified by the command, in the PHP source code tiles shown in FIG. 10A.

The arrow 1007 indicates that a file entryPoint.php specified by an inclusion command require_once shown in line 1 of the PHP script file index.php (1001) indicates the file entryPoint.php (1002).

The arrow 1008 indicates that a function Application( ) in a command newApplication( ) to generate an object shown in the PHP script file index.php (1001) corresponds to a function declaration functionApplication( ){ } in the file Application.php (1004).

The same goes for the other arrows (1009 to 1021), and thus a description thereof is omitted herein.

Figure 10C:
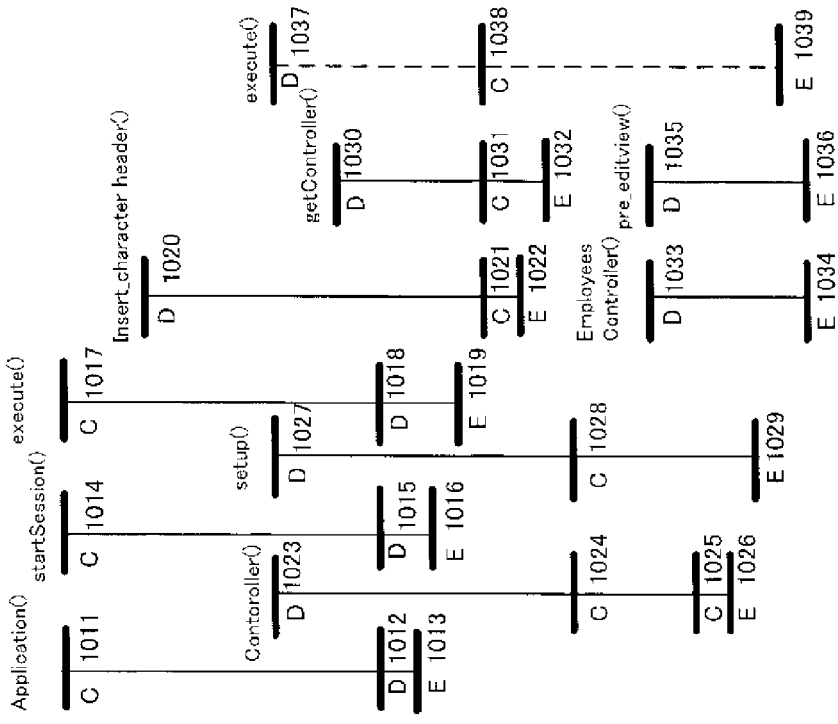
FIG. 10C shows steps of converting the PHP source code shown in FIG. 10A into JAVA bytecode and executing the bytecode.

FIG. 10C shows steps of converting the PHP source code shown in FIG. 10A into JAVA bytecode and executing the bytecode. FIG. 10C also shows the generation, declaration, call/execution of each function/method in chronological order.

In FIG. 10C, the left-hand side shows the steps of conversion and execution (P01 to P30). The right-hand side (note reference numerals 1011-1039) shows, in chronological order, timings of the call, declaration, and execution of each function of the PHP source code shown in FIG. 10A in a way that these timings are associated with the steps (P01 to P30). For example, a function Application( ) is called in line 2 (P02), declared in line 14 (P14), and executed in line 15 (P15). The same goes for other functions startSession( ), execute( ), Insert_charset_header( ), Controller( ), setup( ), getController( ), EmployeesController( ), pre_editview( ), and execute( ), and thus a description thereof is omitted herein. The line labeled "Application( )" with marks C1011-D1012-E1013 in FIG. 10C indicates:

the first caller-side code generation (C1011),
code generation/loading for the function body and its registration in a symbol table with the function name ("Application") in its execution context (D1012), and
the first execution of the code (E1013).

Figure 10D:
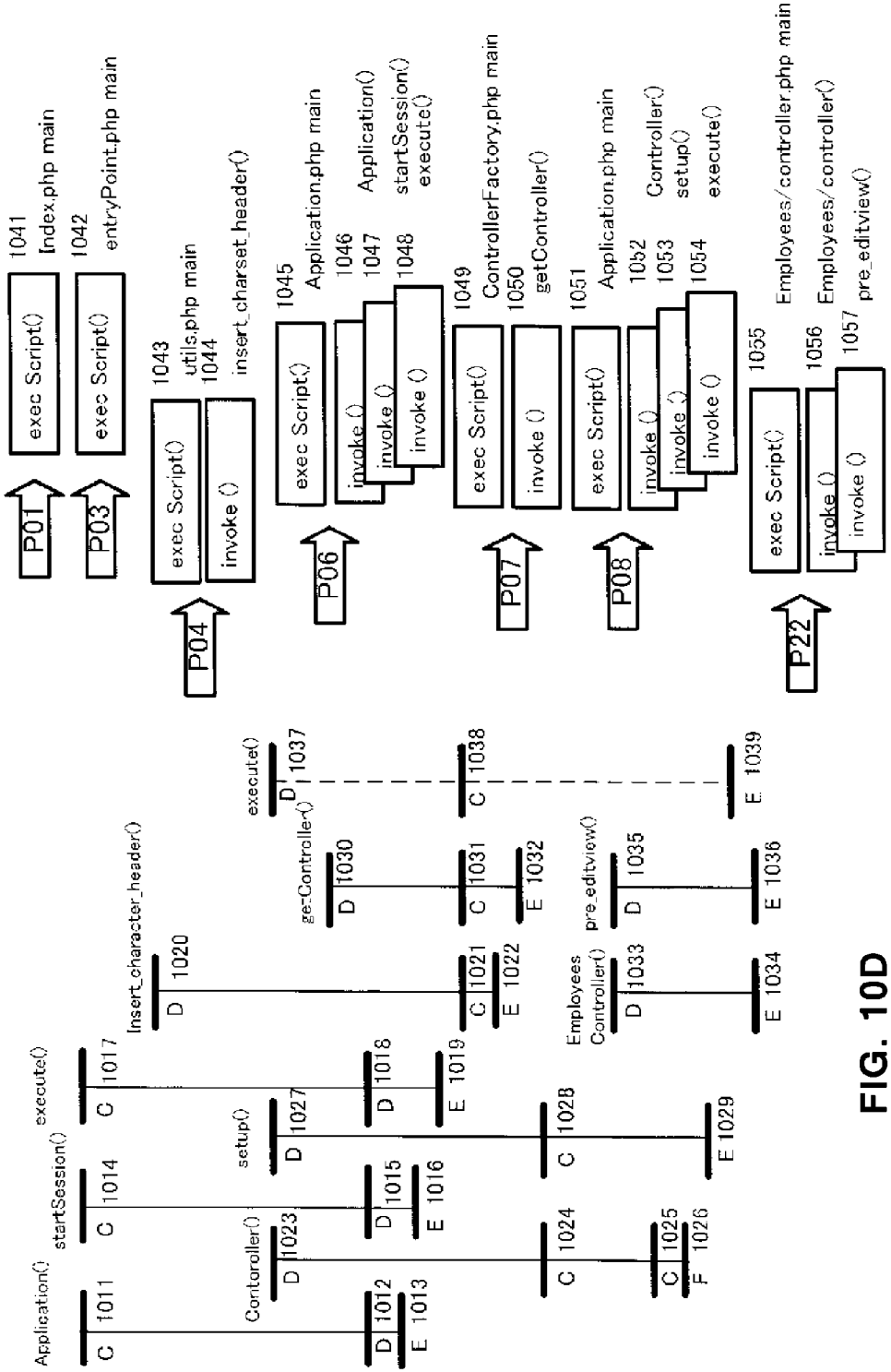
FIG. 10D shows implementation classes generated when the PHP source code shown in FIG. 10A is converted through the one function-to-one class method, with the chronological diagram shown in FIG. 10C.

FIG. 10D shows implementation classes generated when the PHP source code shown in FIG. 10A is converted through the one function-to-one class method, with the chronological diagram shown in FIG. 10C.

Implementation classes (1041 to 1057) are generated in bytecode to correspond to the PHP files (1001 to 1007) shown in FIG. 10A. The numbers (P01, P03, P04, P06, P07, P08, and P22) in arrows given on the left-hand side of the implementation classes correspond respectively to the step numbers of the conversion and execution steps shown in FIG. 10C.

Figure 10E:
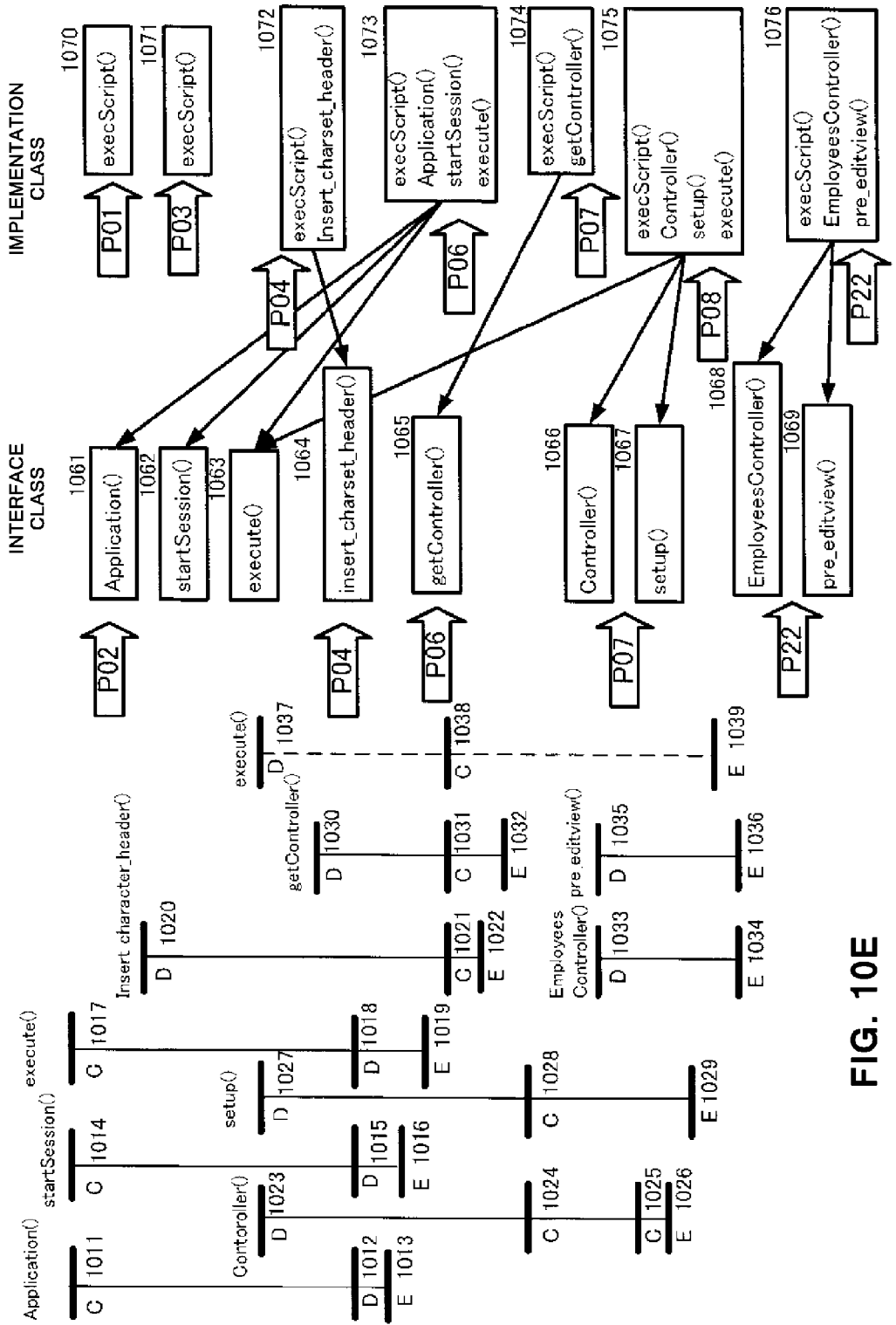
FIG. 10E shows implementation classes generated when the PHP source code shown in FIG. 10A is converted through the one function-to-one interface method, with the chronological diagram shown in FIG. 10C.

FIG. 10E shows implementation classes generated when the PHP source code shown in FIG. 10A is converted through the one function-to-one interface method, with the chronological diagram shown in FIG. 10C.

Implementation classes (1070 to 1076) and interface classes (1061 to 1069) are generated in bytecode by converting the PHP source code shown in FIG. 10A through the one function-to-one interface method. The numbers (P01, P02, P03, P04, P06, P07, P08, and P22) in arrows given on the left-hand side of the implementation classes and interface classes correspond respectively to the step numbers of the conversion and execution steps shown in FIG. 10C.

Figure 10F:
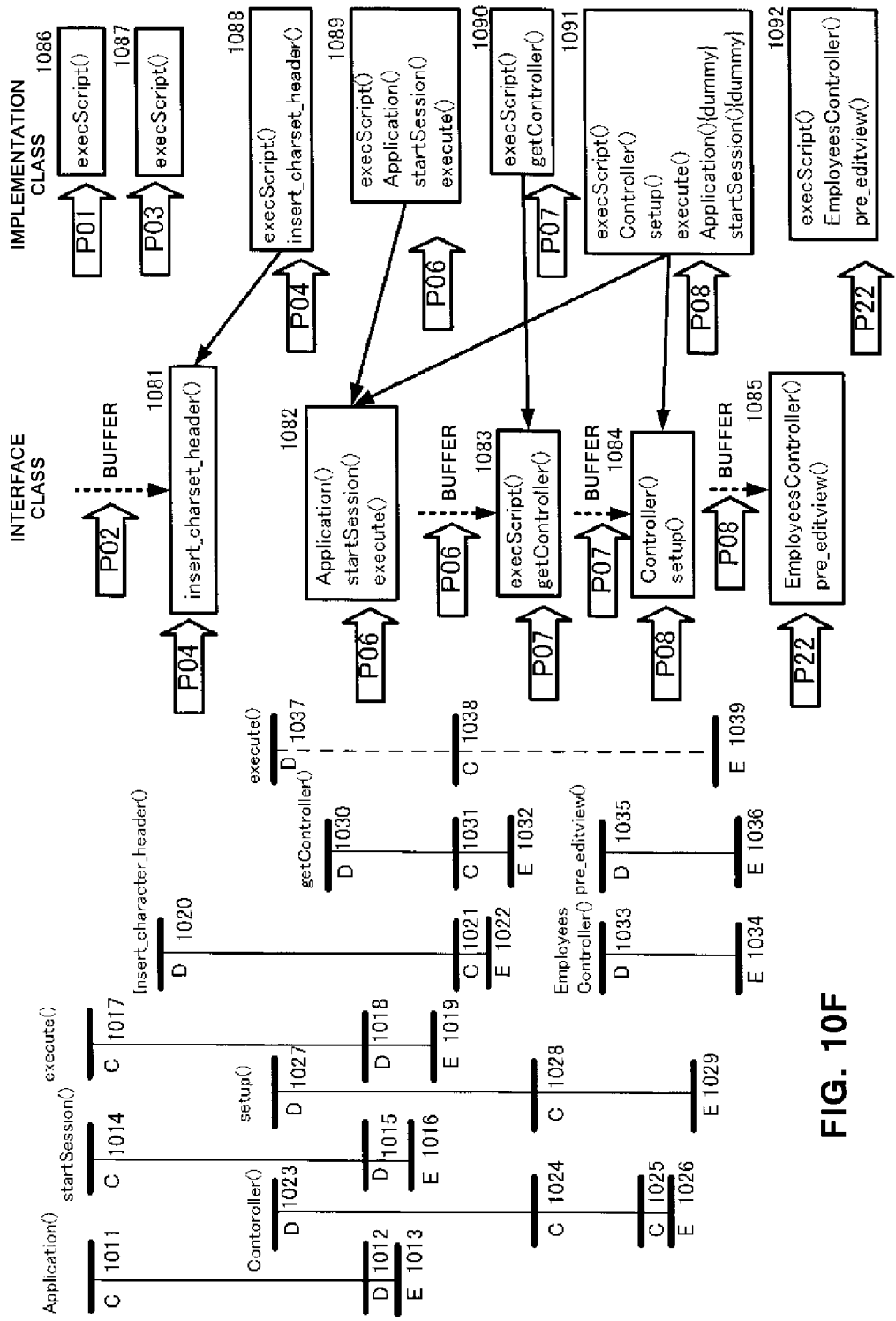
FIG. 10F shows implementation classes generated when the PHP source code shown in FIG. 10A is converted through the multiple functions-to-one interface method, with the chronological diagram shown in FIG. 10C.

FIG. 10F shows implementation classes generated when the PHP source code shown in FIG. 10A is converted through the multiple functions-to-one interface method, with the chronological diagram shown in FIG. 10C.

Implementation classes (1081 to 1085) and interface classes (1086 to 1092) are generated in bytecode by converting the PHP source code shown in FIG. 10A through the multiple functions-to-one interface method. The numbers (P01, P02, P03, P04, P06, P07, P08, and P22) in arrows given on the left-hand side of the implementation classes, interface classes, and buffer processes correspond respectively to the step numbers of the conversion and execution steps shown in FIG. 10C.

A description is now given of a difference between the one function-to-one interface method shown in FIG. 10E and the multiple functions-to-one interface method shown in FIG. 10F. In FIG. 10E, three interface classes (1061, 1062, and 1063) are generated in the process of the arrow (P02), for example. On the other hand, in FIG. 10F, one consolidated interface class (1082) is generated in the process of the arrow (P06). The consolidated interface class (1082) corresponds to the three interface classes (1061, 1062, and 1063) in the one function-to-one interface method. Thus, this shows that the three interface classes (1061, 1062, and 1063) are consolidated into the one consolidated interface class (1082).

Likewise, in FIG. 10E, two interface classes (1066 and 1067) are generated in the process of the arrow (P07), and two interface classes (1068 and 1069) are generated in the process of the arrow (P22). On the other hand, in FIG. 10F, one consolidated interface class (1084) obtained by consolidating the two interface classes (1066 and 1067) in FIG. 10F is generated in the process of the arrow (P08) corresponding to the arrow (P07) of FIG. 10E. In the same manner, one consolidated interface class (1085) obtained by consolidating the two interface classes (1068 and 1069) in FIG. 10E is generated in the process of the arrow (P22) corresponding to the arrow (P22) of FIG. 10E.

As can be seen from above, the number of interface classes generated through the multiple functions-to-one interface method in FIG. 10F is reduced to five from nine generated through the one function-to-one interface method in FIG. 10E.

FIG. 11A is a diagram showing a system 1100 for converting source code written in a dynamically typed language into target code written in a statically typed language, according to an embodiment of the invention.

As shown in FIG. 11A, the system includes the memory (1101) and the storage device (1102). The storage device (1102) can be a hard disk drive or silicon disk drive. The JAVA virtual machine (1103) can be implemented in the memory (1101). The storage device (1102) stores therein PHP script files (1104). In the JAVA virtual machine (1103), the PHP runtime helper (1105), the bytecode generator (1106), the class loader (1107), a table of executable objects (1108), and the symbol table (1109) are implemented.

The system converts source code, which is stored in the storage device (1102) and written in a dynamically typed language such as a PHP language (PHP script files, for example) (1104), into target code, which is written in a statically typed language such as JAVA (JAVA class files (1112 of FIG. 11A), for example), loads the target code, and executes the target code in the JAVA virtual machine.

The operation of the system is now described in accordance with FIG. 11A.

The bytecode generator (1106) reads, from the storage device (1102), a PHP script file (1104) as source code, and parses the read file (1110).

The bytecode generator (1106) converts the source code into bytecode in accordance with the process flows shown in FIGS. 6C and 6I) (1111) to generate a JAVA class file (1112).

Subsequently, the class loader (1107) loads (1113) the generated JAVA class file (1112), and obtains classes (1115) (1114). Each class (1115) thus obtained is either an interface class or an implementation class. While executing a specified script written in PHP or any other language, the language execution system of this system further executes another script.

For example, the language execution system operates in accordance with a web server, and executes a script corresponding to an accessed URL. To enable fast execution, the script is compiled into bytecode which runs directly on the JAVA virtual machine, and the bytecode is loaded and executed. Typically, the compiled result is represented as a JAVA class, and the script is executed as a method call for an object (executable object) created from this class. Since such compilation or loading requires large cost, an executable object or class which has been loaded once is usually cached, and reused when accessed again.

The operation of the PHP runtime helper (1105) is now described in accordance with steps 1 to 4 of FIG. 11A.

In step 1, the PHP runtime helper (1105) checks whether or not the cached executable object or class corresponding to the PHP script file (1104) in the storage device (1102) is valid. Whether the cached data is valid or not is determined by checking, for example, if the last updated time of a PHP script file to be processed is the same as that registered in the cache. When the cached data is valid, bytecode for the file is not generated since the program execution unit (1118) uses the cached data to execute the script in this case. The process moves to step 2 only when the cached data is not valid. The process moves to step 3 without passing through step 2 when the cached data is valid.

In step 2, the PHP runtime helper (1105) requests the bytecode generator (1106) to process the script (i.e., processes shown in steps 641 to 646 of FIG. 6C). According to the request, the bytecode generator (1106) gives the PHP runtime helper (1105) a class obtained by generating and loading bytecode corresponding to the requested script file. The PHP runtime helper (1105) instantiates the obtained class to create an executable object, and puts the executable object in the cache.

In step 3, the PHP runtime helper (1105) registers the executable object in the symbol table (1109) valid within the current execution scope (e.g., during a process of one request by a web server).

In step 4, the PHP runtime helper (1105) finds the executable object from the symbol table (1109) and executes the object thus found. Specifically, the PHP runtime helper (1105) calls a method, such as executeScript( ), of the executable object, and requests the JAVA virtual machine (1103) to execute the called method.

FIG. 11B is a diagram showing a relation between an execution helper and an executable object created as a result of conversion, according to an embodiment of the invention.

The execution helper (1121) is a PHP runtime helper, for example. There are many common processes among processes related to script execution. The execution helper (1121) is a module for helping the execution of such common processes. The common processes include, for example, a basic calculation process such as addition of values, and the process of include( ) which has been noted above.

The execution helper (1121) calls (1123) the executable object (1122), and receives an instruction from the executable object (1122) to activate a PHP command (1124), and helps the activation. The program execution unit (1118) executes bytecode, which is converted from a PHP script by the bytecode generator (1106), while letting the PHP runtime helper perform a part of the execution process. The program execution unit (1118) is an ordinary JAVA program execution unit, and includes an interpreter (1119) and a JIT compiler (1120). Code generated by the interpreter (1119) or the JIT compiler (1120) is executed by a CPU (1202 of FIG. 12). Note also call 1125.

FIG. 11C is a diagram showing the bytecode generator and the signature-interface registration unit, according to an embodiment of the invention.

The JAVA virtual machine (1103) includes the signature-interface registration unit (1131) and the bytecode generator (1106).

The signature-interface registration unit (1131) is a storage device for storing therein the data structure of FIG. 7 in which signatures and interface classes are registered.

The bytecode generator (1106) includes the interface class generator (1132), the buffer (1133), and an implementation class generator (1134).

The interface class generator (1132) generates a consolidated interface class (step 688 of FIG. 6E, and step 694 of FIG. 6F).

The buffer (1134) is a place to store signatures.

The implementation class generator (1134) includes the declaration interface list (1135), the declaration function list (1136), and the call function list (1137). The declaration interface list (1135) indicates a data structure in which the name of a caller interface class corresponding to the declared function/method is held in a list format, and is a list to which an interface class name is added in step 634 of FIG. 6B or in step 674 of FIG. 6D, for example. The declaration function list (1136) is used for the process of clearing the buffer (1133) performed only in a case where the generated implementation class includes a declaration of a function corresponding to any one of signatures in the buffer (1133). The call function list (1137) indicates a data structure in which the signature of a function (to be called) which appears in a caller is held in a list format.

Figure 12:
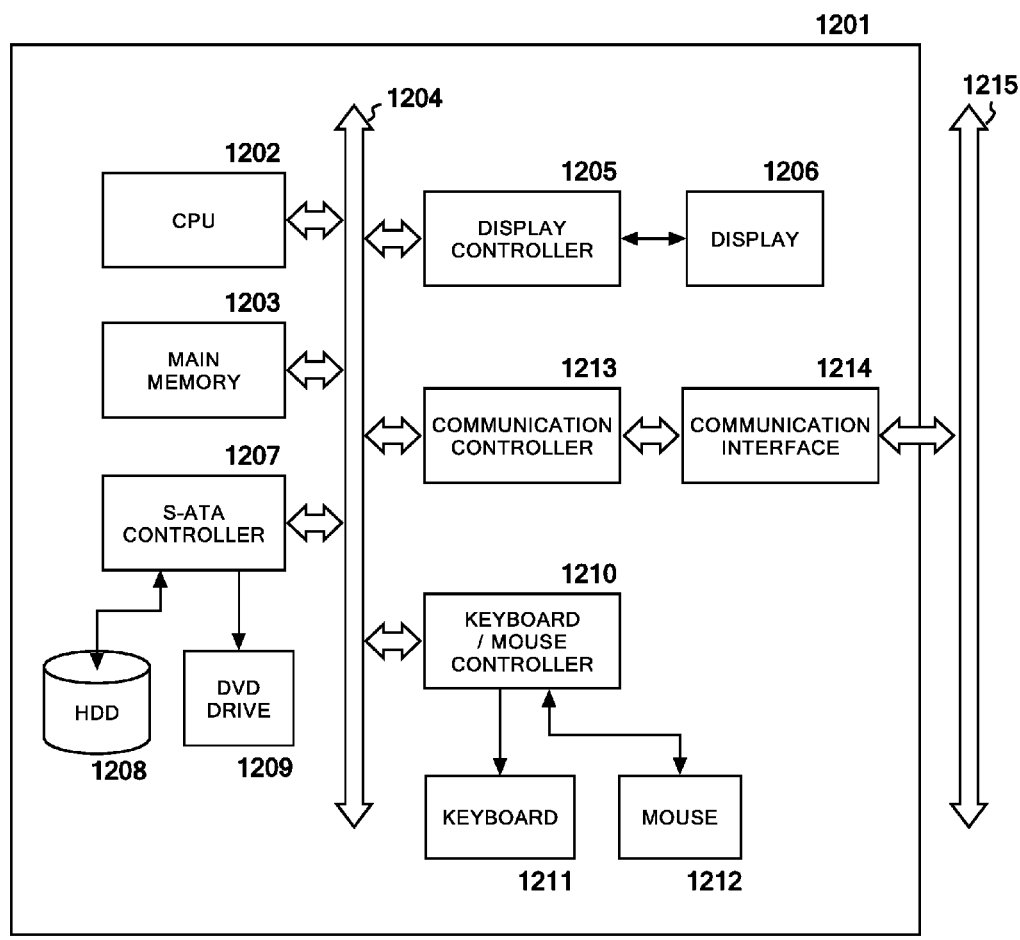
FIG. 12 is a block diagram showing computer hardware included in the system of FIG. 11A according to an embodiment of the invention.

FIG. 12 is a block diagram showing computer hardware included in the system of FIG. 11A according to an embodiment of the invention.

A computer system (1201) includes the CPU (1202) and a main memory (1203) which are connected to a bus (1204). The CPU (1202) is preferably based on 32-bit or 64-bit architecture. Examples usable as the CPU (1202) include the XEON series, CORE series, ATOM series, PENTIUM series, and CELERON series of Intel Corporation, and the PHENOM series, ATHLON series, TURION series, and SEMPRON series of Advanced Micro Devices, Inc. A display (1206) such as a TFT monitor is connected to the bus (1204) through a display controller (1205). The display (1206) is used to display, on a proper graphic interface, information on the computer system connected to a network via a communication line (1215) and information on software running on the computer system, for the purpose of managing the computer system. Also, a hard disk or a silicon disk (1208), and a CD-ROM drive, a DVD drive, or a BD drive (1209) are connected to the bus (1204) through an IDE or S-ATA controller (1207).

An operating system, an application program, and data are stored in the hard disk (1208) to be loadable in the main memory (1203).

The CD-ROM drive, the DVD drive, or the BD drive (1209) is used to additionally load a program as needed from a CD-ROM, a DVD-ROM or a BD into the hard disk (1208). A keyboard (1211) and a mouse (1212) are also connected to the bus (1204) through a keyboard/mouse controller (1210).

A communication interface (1214) is compliant with an Ethernet protocol, for example. The communication interface (1214) is connected to the bus (1204) through a communication controller (1213) and functions to physically connect the computer system and the communication line (1215). The communication interface (1214) also provides a network interface layer to a TCP/IP communication protocol which is a communication function of the operating system of the computer system. Here, the communication line (1215) may be a wired LAN environment, or a wireless LAN environment based on a wireless LAN connection standard such as IEEE 802.11a/b/g/n.

Having reviewed the disclosure herein, including FIG. 12, the skilled artisan will appreciate that aspects of the present invention may take the form of a computer program product embodied in one or more computer readable medium(s) having computer readable program code embodied thereon. Any combination of one or more computer readable medium(s) may be utilized. The computer readable medium may be a computer readable signal medium (e.g., signals on line 1215) or a computer readable storage medium (e.g., HDD 1208, DVD in drive 1209). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Distinct software modules for carrying aspects of embodiments of the invention can be, in at least some cases, embodied on a computer readable storage medium FIGS. 13A to 13E show inclusion relations among the processes in the steps of conversion and execution shown in FIGS. 2C, 3A, 4A, 8B, and 9B.

In each of these drawings, each inclusion relation is shown by an indent, and also by a frame for easier understanding.

Figure 13A:
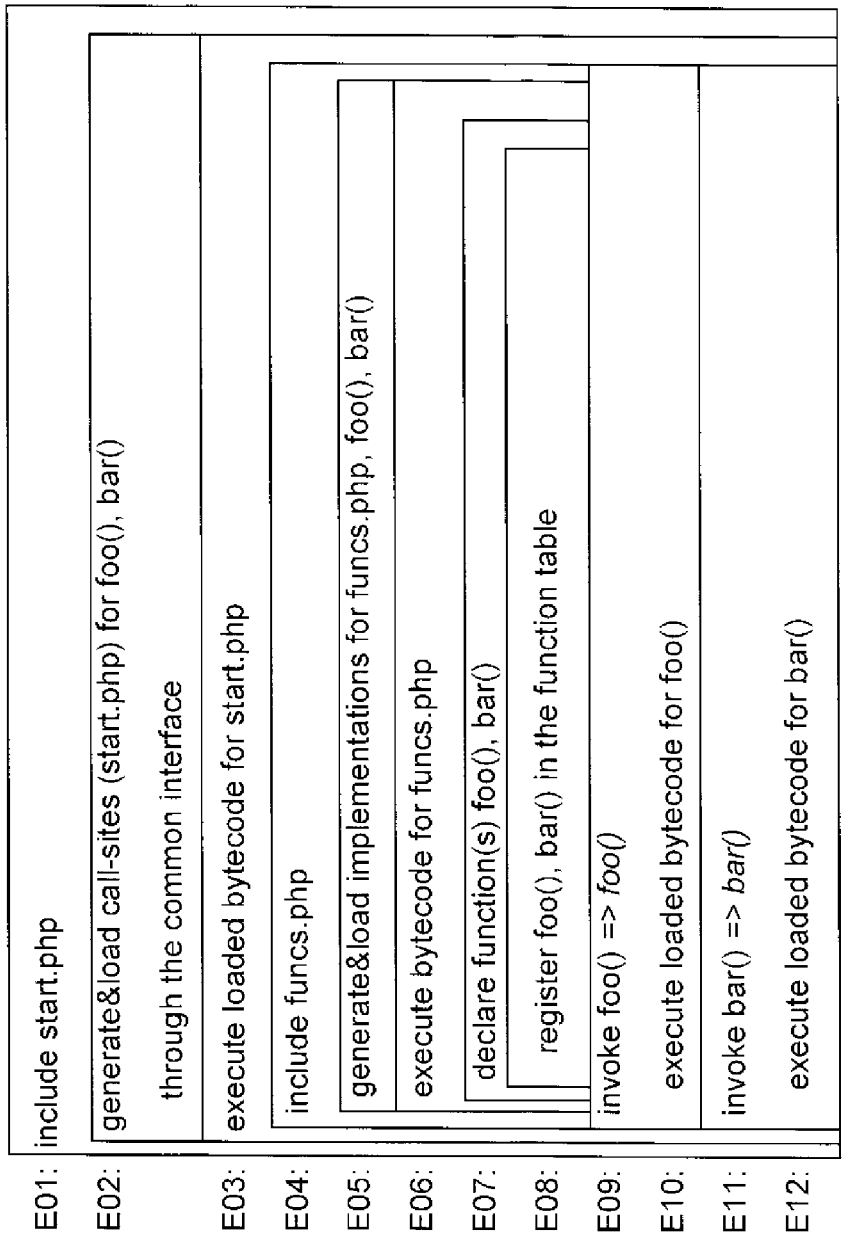
FIG. 13A shows inclusion relations among the processes in the steps of conversion and execution in FIG. 2C.

FIG. 13A shows inclusion relations among the processes in the steps of conversion and execution in FIG. 2C.

It can be seen from this drawing that an inclusion command include is directed in line 1 (E01), and that the steps in lines 2 to 12 (E02 to E12) are executed as sub-steps of E01. Each inclusion relation among the processes of lines 2 to 12 (E02 to E12) is shown in the same manner as above.

Figure 13B:
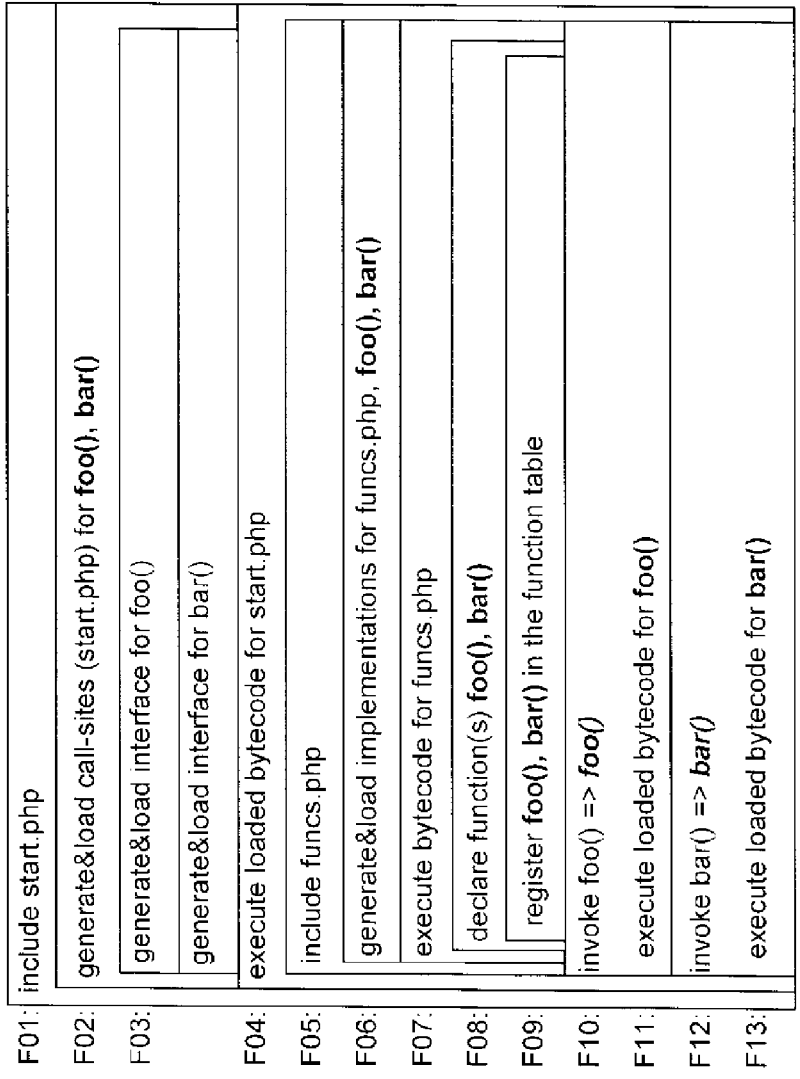
FIG. 13B shows inclusion relations among the processes in the steps of conversion and execution in FIG. 3A.

FIG. 13B shows inclusion relations among the processes in the steps of conversion and execution in FIG. 3A.

It can be seen from this drawing that an inclusion command include is directed in line 1 (F01), and that the steps in lines 2 to 13 (F02 to F13) are executed as sub-steps of F01. Each inclusion relation among the processes of lines 2 to 13 (F02 to F13) is shown in the same manner as above.

FIG. 13C shows inclusion relations among the processes in the steps of conversion and execution in FIG. 4A.

It can be seen from this drawing that an inclusion command include is directed in line 1 (J01), and that the steps in lines 2 to 18 (J02 to J18) are executed as sub-steps of J01. Each inclusion relation among the processes of lines 2 to 18 (J02 to J18) is shown in the same manner as above.

Figure 13D:
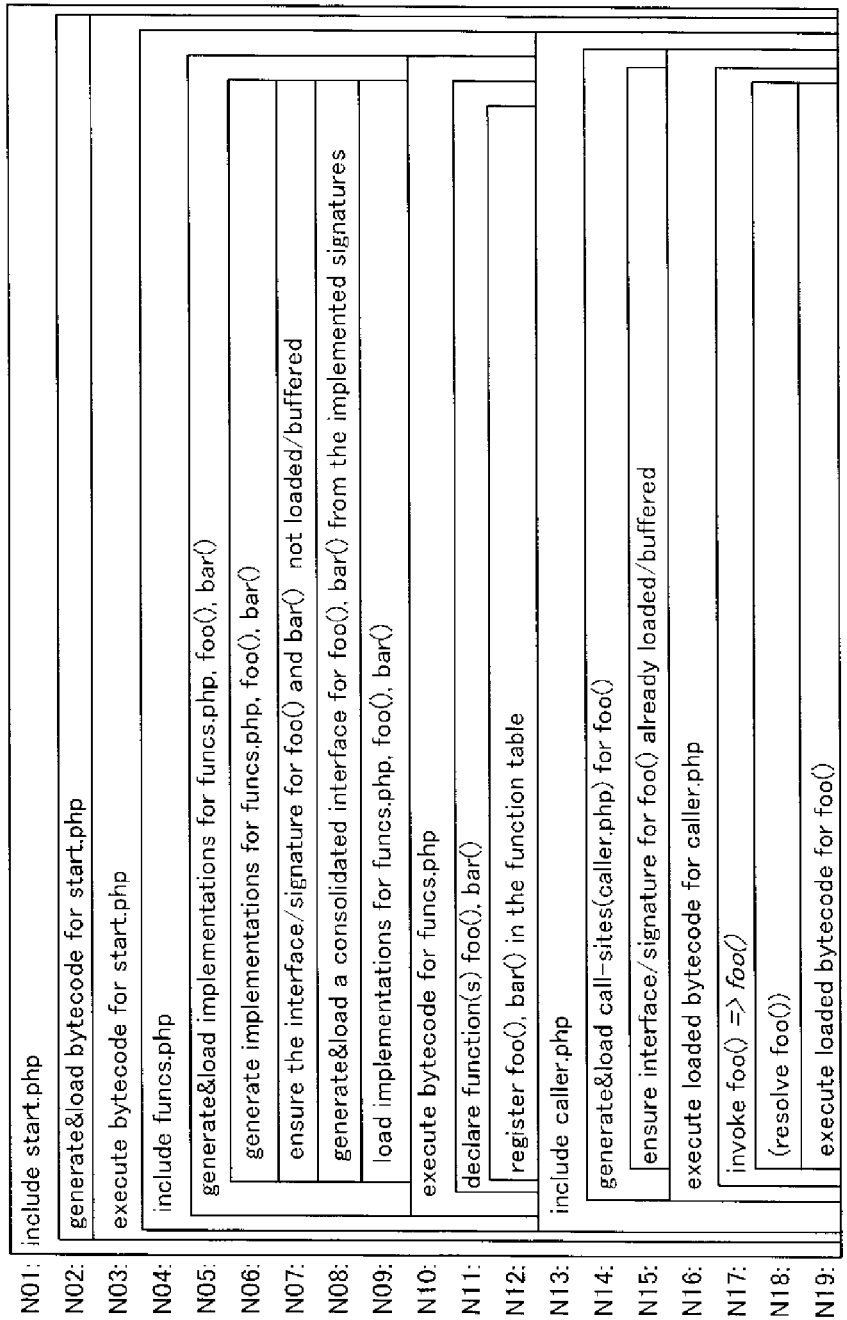
FIG. 13D shows inclusion relations among the processes in the steps of conversion and execution in FIG. 8B.

FIG. 13D shows inclusion relations among the processes in the steps of conversion and execution in FIG. 8B.

It can be seen from this drawing that an inclusion command include is directed in line 1 (N01), and that the steps in lines 2 to 19 (N02 to N19) are executed as sub-steps of N01. Each inclusion relation among the processes of lines 2 to 19 (N02 to N19) is shown in the same manner as above.

Figure 13E:
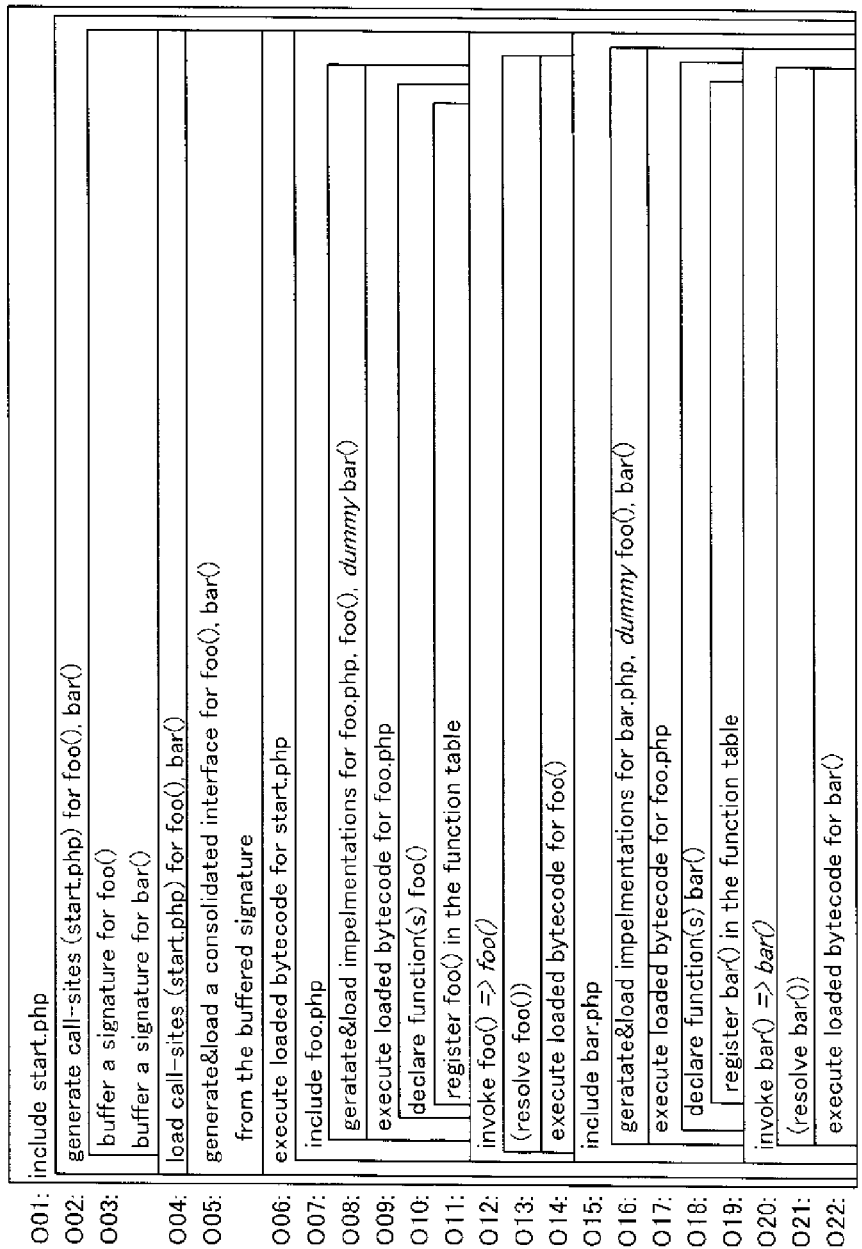
FIG. 13E shows inclusion relations among the processes in the steps of conversion and execution in FIG. 9B.

FIG. 13E shows inclusion relations among the processes in the steps of conversion and execution in FIG. 9B.

It can be seen from this drawing that an inclusion command include is directed in line 1 (O01), and that the steps in lines 2 to 22 (O02 to 022) are executed as sub-steps of O01. Each inclusion relation among the processes of lines 2 to 22 (O02 to 022) is shown in the same manner as above.

Example 1

In the case of SugarCRM 5.0.0c which is an open source CRM application, 2686 interface classes were generated through the one function-to-one class method while 941 interface classes were generated through the multiple functions-to-one interface method being an embodiment of the invention. Thus, the number of interface classes generated through the multiple functions-to-one interface method was less by 1923 than that generated through the one function-to-one class method.

As can be seen from the above result, the multiple functions-to-one interface method which is an embodiment of the invention is capable of reducing the number of interface classes to be generated as compared to that in the conventional compilation method, without using the slow reflection mechanism. In particular, the larger the number of functions/methods declared on a per-compilation basis (on a file basis, for example) in a source program, the larger number of interface classes the multiple functions-to-one interface method which is an embodiment of the invention is capable of reducing, i.e., the more remarkably the effects of the invention are exhibited.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for converting source code written in a dynamically typed language into target code written in a statically typed language, the method comprising the steps, executed by a computer, of:
   generating in a storage device the target code from the source code, the step of generating the target code in turn comprising storing in a buffer a signature of a function/method used by a caller in the source code, wherein generation of an interface class is delayed to a time point immediately before execution of a part of the target code corresponding to the function/method call by the caller, the interface class being needed to generate the caller and serving as an interface in the statically typed language; and
   generating in the storage device a consolidated interface class for all signatures stored in the buffer, and loading the generated consolidated interface class from the storage device, wherein all the signatures in the buffer are deleted upon generation of the consolidated interface class;
   wherein the step of generating the target code from the source code includes generating a function/method declaration corresponding to the caller in the source code.

2. The method according to claim 1, wherein the generating of the function/method declaration includes the steps of:
   checking whether a signature of a declared function/method is in the buffer, and whether an interface class corresponding to the declared function/method has already been generated; and
   adding the signature of the declared function/method to a declaration function list in a case where the signature of the declared function/method is not in the buffer and where the interface class corresponding to the declared function/method has not been generated yet.

3. The method according to claim 1, wherein the generating of the function/method declaration includes the steps of:
   checking whether a signature of a declared function/method is in the buffer, and whether an interface class corresponding to the declared function/method has already been generated; and
   adding a corresponding interface class name to a declaration interface list in either of cases where the signature of the declared function/method is not in the buffer and where the interface class corresponding to the declared function/method has not been generated yet.

4. The method according to claim 3, wherein the generating of the function/method declaration further includes:
   generating in the storage device bytecode of a script for a process of the declared function/method; and
   generating in the storage device code for associating the generated bytecode with the declared function/method.

5. The method according to claim 4, wherein the step of generating and loading an interface class further includes:
   checking whether the declaration function list is empty;
   if the declaration function list is not empty, checking whether an interface class name associated with the buffer exists in the declaration interface list; and
   if the interface class name associated with the buffer exists, adding to the buffer the signature in the declaration function list and a signature in a call function list.

6. The method according to claim 5, wherein the step of generating and loading an interface class further includes the steps of:
   generating in the storage device one interface class from the added signature, and loading the generated interface class from the storage device; and
   adding a name of the loaded interface class to the declaration interface list.

7. The method according to claim 4, wherein the step of generating and loading an interface class further includes the steps of:
   checking whether the declaration function list is empty;
   if the declaration function list is not empty, checking whether an interface class name associated with the buffer exists in the declaration interface list; and
   if no interface class name associated with the buffer exists, generating, from the signature in the declaration function list, the consolidated interface class independent of the buffer, and loading the generated consolidated interface class; and
   adding a name of the loaded interface class to the declaration interface list.

8. The method according to claim 4, wherein the step of generating and loading an interface class further includes the steps of:
   checking whether the declaration function list is empty; and
   if the declaration function list is empty, adding to the buffer a signature in a call function list.

9. The method according to claim 1, further comprising the step, executed by the computer, of executing the target code obtained by the conversion.

10. A computer for converting source code written in a dynamically typed language into target code written in a statically typed language, the computer comprising:
- a generator which generates in a storage device the target code from the source code, and stores in a buffer a signature of a function/method used by a caller in the source code, wherein generation of an interface class is delayed to a time point immediately before execution of a part of the target code corresponding to the function/method call by the caller, the interface class being needed to generate the caller and serving as an interface in the statically typed language; and
- a first processor which generates in the storage device a consolidated interface class for all signatures stored in the buffer, and loads the generated consolidated interface class from the storage device, wherein all the signatures in the buffer are deleted upon generation of the consolidated interface class;
- wherein the generator generates the target code from the source code by generating a function/method declaration corresponding to the caller in the source code.

11. A computer program product for converting source code written in a dynamically typed language into target code written in a statically typed language, the computer program product comprising:
- a non-transitory computer readable storage medium having computer readable program code embodied therewith, the computer readable program code comprising:
  - computer readable program code configured to generate in a storage device the target code from the source code, by storing in a buffer a signature of a function/method used by a caller in the source code, wherein generation of an interface class is delayed to a time point immediately before execution of a part of the target code corresponding to the function/method call by the caller, the interface class being needed to generate the caller and serving as an interface in the statically typed language; and
  - computer readable program code configured to generate in the storage device a consolidated interface class for all signatures stored in the buffer, and load the generated consolidated interface class from the storage device, wherein all the signatures in the buffer are deleted upon generation of the interface class;
- wherein the computer readable program code configured to generate the target code from the source code generates the target code from the source code by generating a function/method declaration corresponding to the caller in the source code.

* * * * *